US011410191B2

(12) United States Patent
Andon et al.

(10) Patent No.: US 11,410,191 B2
(45) Date of Patent: Aug. 9, 2022

(54) APPARATUS, SYSTEM, AND METHOD FOR TARGET SEARCH AND USING GEOCACHING

(71) Applicant: NIKE, Inc., Beaverton, OR (US)

(72) Inventors: Christopher Andon, Portland, OR (US); Ron G. Faris, Brooklyn, NY (US); Jett House, New York City, NY (US); Aaron L. Uhrmacher, New York City, NY (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 17/195,248

(22) Filed: Mar. 8, 2021

(65) Prior Publication Data

US 2021/0192558 A1    Jun. 24, 2021

Related U.S. Application Data

(60) Division of application No. 16/352,360, filed on Mar. 13, 2019, now Pat. No. 10,949,867, which is a
(Continued)

(51) Int. Cl.
*G06Q 30/00* (2012.01)
*G06Q 30/02* (2012.01)
(Continued)

(52) U.S. Cl.
CPC ....... *G06Q 30/0207* (2013.01); *A63F 13/216* (2014.09); *A63F 13/69* (2014.09);
(Continued)

(58) Field of Classification Search
CPC .......... G06Q 30/0207; G06Q 30/0209; G06Q 50/01; A63F 13/216; A63F 13/69;
(Continued)

(56) References Cited

U.S. PATENT DOCUMENTS 6,585,622 B1    7/2003  Shum et al.
6,932,698 B2    8/2005  Sprogis
(Continued)

FOREIGN PATENT DOCUMENTS

JP    2008046806 A    2/2008
JP    2012-212225 A    11/2012
(Continued)

OTHER PUBLICATIONS

Hugo, Martin, Cache Prizes; With a Receiver in Hand and lots of Containers Cleverly Hidden in the Outdoors, Geocachers go Wherever the Growing Sport's GPS Coordinates Take Them, Feb. 16, 2006, LA Times (Year: 2006).*
(Continued)

*Primary Examiner* — Matthew L Hamilton
(74) *Attorney, Agent, or Firm* — Banner & Witcoff, Ltd.

(57) ABSTRACT

A method of locating a target in a geographical space includes providing information to searcher users searching for the target, and potentially selecting among multiple targets for location, and providing rewards to the searchers after locating the target. The target may be a virtual object, and the method may use augmented reality features in locating the virtual object. The method may also provide for participating users who are not actively searching for the target, but may team with a searcher to receive a reward if the searcher locates the target, and who may potentially assist the user in locating the target. Participating users may be eligible if they are located in a designated participation area. The method may further provide for observing users who can observe progress of searchers in searching for the target but are not involved in the search or reward.

16 Claims, 51 Drawing Sheets

Related U.S. Application Data continuation of application No. 16/128,155, filed on Sep. 11, 2018, now Pat. No. 10,726,435.

(60) Provisional application No. 62/557,565, filed on Sep. 12, 2017, provisional application No. 62/557,102, filed on Sep. 11, 2017.

(51) Int. Cl.
    *G06Q 50/00* (2012.01)
    *H04L 67/131* (2022.01)
    *A63F 13/216* (2014.01)
    *A63F 13/69* (2014.01)
    *H04W 4/021* (2018.01)
    *H04W 4/21* (2018.01)
    *H04W 4/029* (2018.01)

(52) U.S. Cl.
    CPC ......... *G06Q 30/0209* (2013.01); *G06Q 50/01* (2013.01); *H04L 67/38* (2013.01); *H04W 4/021* (2013.01); *H04W 4/029* (2018.02); *H04W 4/21* (2018.02)

(58) Field of Classification Search
    CPC ....... H04W 4/029; H04W 4/21; H04W 4/021; H04L 67/38
    See application file for complete search history.

(56) References Cited

U.S. PATENT DOCUMENTS

| | | |
|---|---|---|
| 7,171,331 B2 | 1/2007 | Vock et al. |
| 8,428,614 B2 | 4/2013 | Wolfe |
| 8,606,645 B1 | 12/2013 | Applefeld |
| 9,058,764 B1 | 6/2015 | Persson et al. |
| 9,131,339 B1 | 9/2015 | Kulfan et al. |
| 9,142,038 B2 | 9/2015 | Lotto et al. |
| 10,127,725 B2 | 11/2018 | Kohler et al. |
| 10,201,939 B1 | 2/2019 | Pare et al. |
| 10,706,459 B2 | 7/2020 | Faris et al. |
| 2002/0111201 A1 | 8/2002 | Lang |
| 2003/0107178 A1 | 6/2003 | Weston |
| 2004/0024850 A1 | 2/2004 | Miyake |
| 2004/0079797 A1 | 4/2004 | Wadley |
| 2005/0265345 A1 | 12/2005 | Chen et al. |
| 2006/0097847 A1 | 5/2006 | Bervoets et al. |
| 2006/0230640 A1 | 10/2006 | Chen |
| 2006/0293103 A1 | 12/2006 | Mendelsohn |
| 2007/0242066 A1 | 10/2007 | Levy Rosenthal |
| 2008/0009349 A1 | 1/2008 | Wolfe |
| 2008/0167129 A1 | 7/2008 | Aaron et al. |
| 2009/0018911 A1 | 1/2009 | An Chang et al. |
| 2009/0227374 A1 | 9/2009 | Tirpak et al. |
| 2010/0079338 A1 | 4/2010 | Wooden et al. |
| 2011/0105092 A1 | 5/2011 | Felt et al. |
| 2011/0313779 A1 | 12/2011 | Herzog et al. |
| 2012/0010995 A1 | 1/2012 | Skirpa et al. |
| 2012/0136998 A1 | 5/2012 | Hough et al. |
| 2012/0180084 A1 | 7/2012 | Huang et al. |
| 2012/0202600 A1 | 8/2012 | Jalili |
| 2012/0212505 A1 | 8/2012 | Burroughs et al. |
| 2012/0225705 A1* | 9/2012 | Rhodes, Jr. ............... A63F 9/24 463/9 |
| 2012/0233076 A1 | 9/2012 | Sutcliffe et al. |
| 2012/0320216 A1 | 12/2012 | Mkrtchyan et al. |
| 2013/0178257 A1 | 7/2013 | Langseth |
| 2013/0260727 A1 | 10/2013 | Knudson et al. |
| 2013/0293584 A1 | 11/2013 | Anderson |
| 2014/0025481 A1 | 1/2014 | Kang et al. |
| 2014/0129949 A1 | 5/2014 | Singer |
| 2014/0172640 A1 | 6/2014 | Argue et al. |
| 2014/0176565 A1 | 6/2014 | Adeyoola et al. |
| 2014/0237578 A1 | 8/2014 | Bryant et al. |
| 2014/0253743 A1 | 9/2014 | Loxam et al. |
| 2014/0282974 A1 | 9/2014 | Maher et al. |
| 2015/0105153 A1 | 4/2015 | Xu |
| 2015/0106195 A1 | 4/2015 | Holman et al. |
| 2015/0109338 A1 | 4/2015 | McKinnon et al. |
| 2015/0140982 A1 | 5/2015 | Postrel |
| 2015/0205894 A1 | 7/2015 | Faris et al. |
| 2015/0206349 A1 | 7/2015 | Rosenthal et al. |
| 2015/0235267 A1 | 8/2015 | Steube et al. |
| 2015/0286897 A1 | 10/2015 | Spaith |
| 2015/0324850 A1 | 11/2015 | Rivera |
| 2015/0348329 A1 | 12/2015 | Carre et al. |
| 2016/0012498 A1 | 1/2016 | Prasad |
| 2016/0070809 A1 | 3/2016 | Rathus |
| 2016/0117061 A1 | 4/2016 | Hodgart et al. |
| 2016/0292926 A1 | 10/2016 | Rosenthal et al. |
| 2016/0337580 A1 | 11/2016 | Kwon et al. |
| 2016/0367896 A1 | 12/2016 | Lee et al. |
| 2017/0032382 A1 | 2/2017 | Shulman et al. |
| 2017/0124434 A1 | 5/2017 | Goodwin et al. |
| 2017/0364925 A1 | 12/2017 | Wilkinson et al. |
| 2018/0021671 A1 | 1/2018 | Liesenfelt et al. |
| 2018/0041545 A1 | 2/2018 | Chakra et al. |
| 2018/0089709 A1 | 3/2018 | Rousseau-Villella |
| 2018/0190033 A1 | 7/2018 | Barnett et al. |
| 2018/0190324 A1 | 7/2018 | Paul et al. |
| 2018/0350148 A1 | 12/2018 | George |
| 2019/0015747 A1 | 1/2019 | Thompson et al. |
| 2019/0342249 A1* | 11/2019 | Holmes .................. H04L 51/32 |
| 2019/0362153 A1 | 11/2019 | Badalamenti et al. |
| 2020/0175140 A1* | 6/2020 | Steele .................... G06F 21/44 |
| 2021/0097761 A1* | 4/2021 | Rizvi .................... A63F 13/218 |

FOREIGN PATENT DOCUMENTS

| | | |
|---|---|---|
| JP | 2013210783 A | 10/2013 |
| JP | 2014215929 A | 11/2014 |
| JP | 2015041126 A | 3/2015 |
| JP | 2016529581 A | 9/2016 |
| WO | 2013187130 A1 | 12/2013 |
| WO | 2014107681 A1 | 7/2014 |
| WO | 2014194419 A1 | 12/2014 |
| WO | 2016043663 A1 | 3/2016 |

OTHER PUBLICATIONS

Aug. 28, 2018—(WO) ISR & WO—App. No. PCT/US18/038473.
TheHoYiu: "Nike Augmented reality Case Study", You Tube, May 6, 2011 (May 6, 2011), p. 1, CP054978581, Retrieved from the Internet: URL:https://www.youtube.com/watch?v=BoawN6hVB4c [retrieved on Aug. 14, 2018], the whole document.
Adrianrdzv: Nike AR shoe demo:, You Tube, Mar. 5, 2012 (Mar. 5, 2012), p. 1, XP054978582, Retrieved from the Internet: URL:https://www.youtube.com/watch?v=WjN3CSXF9x0 [retrieved on Aug. 19, 2018], the whole document.
Nov. 30, 2018—(WO) ISR & WO—App. No. PCT/US18/050594.
Nov. 30, 2018—(WO) ISR & WO—App. No. PCT/US18/050599.
Nov. 30, 2018—(WO) ISR & WO—App. No. PCT/US18/050497.
Firefly1, "Amazon Firefly Hands-On—What is it?", video accessible at https://www.youtube.com/watch?v=oVb_5YYXJgg, Dated Jul. 23, 2014. (Year: 2014).
Firefly2, "Firefly FAQ", Amazon.com.Help, dated Jun. 9, 2014 (Year 2014).
Firefly3, Perez, "Amazon's Fire Phone Introduces Firefly, A Feature That Lets You Identify (and Buy) Things You See in The Real World", Techcrunch.com, dated Jun. 18, 2014. (Year: 2014).
Targetinasnap1, Nguyen, Nicole, "Buy target items immediately by snapping a photo", Popsugartech, dated Jul. 23, 2014. (Year: 2014).
Targetinasnap2, Aheard, Brianna, Target's In a Snap App: Mobile Shopping Via Image Recognition, Innovative Retail Technologies, dated Jul. 25, 2014. (Year: 2014).
Targetinasnap3, Bourne, Leah, "Now You Can Shop Target Ads On Your iPhone!", Stylecaster, Jul. 22, 2014. (Year 2014).
Mahmood, Zahid; Ali, Tauseef; Muhammed, Nazeer; Bibi, Nargis; Shahzad, Imran; Azmat, Shoaib; EAR: Enhanced Augmented Real-

(56) References Cited

OTHER PUBLICATIONS ity System for Sports Entertainment Application, KSII Transaction on Internet and Informationan System, Dec. 2017 (Year: 2017).

* cited by examiner

APPARATUS, SYSTEM, AND METHOD FOR TARGET SEARCH AND USING GEOCACHING

CROSS-REFERENCE TO RELATED APPLICATIONS

This application is a divisional of U.S. patent application Ser. No. 16/352,360, filed Mar. 13, 2019, now U.S. Pat. No. 10,949,867, which is a continuation of U.S. patent application Ser. No. 16/128,155, filed Sep. 11, 2018, now U.S. Pat. No. 10,726,435, which is a non-provisional of, and claims priority to, U.S. Provisional Application No. 62/557,565, filed Sep. 12, 2017, and U.S. Provisional Application No. 62/557,102, filed Sep. 11, 2017, all of which prior applications are incorporated by reference herein in their entireties and made part hereof.

TECHNICAL FIELD

The present disclosure relates to apparatuses, systems, methods, and computer generated user interfaces for using augmented reality features to unlock selective access for purchasing consumer products, such as articles of footwear, articles of apparel, athletic equipment, or any other type of consumer product.

BACKGROUND

Recent years have ushered in dramatic advancements in electronic computing devices and their capabilities, including advances in augmented reality. Augmented reality may include image-recognition devices capable of receiving instructions and inputs from recognition of captured images. The present disclosure provides for an apparatus and system for unlocking selective access for purchasing consumer products through augmented reality features. While there are systems for limited releases of consumer products, or unlocking selectively access for purchasing consumer products, these systems usually require consumers be ready at a release time, waiting in long lines, or meeting some requirement to be able to purchase the desired product. These systems encourage competition between consumers to gain access, and limits the number of consumers willing to pursue this access.

As social media continues to grow, the influence of individuals with large social media connections expands. Certain individuals have a large number of followers, and have a large influence over the activity of their followers. Endorsement of a particular brand or product by these individuals can greatly increase the popularity and demand of the brand or product. Relatedly, individuals looking to expand their recognition and increase their personal brand often seek to do so by increasing their social media presence. Aspects discussed herein relate to granting certain influential individuals images to share through their social media accounts. A first user may then use a mobile device to view the image on social media. While displayed on the first user's mobile device, a second user may user another mobile device to capture the image as displayed on the first user's mobile device. Upon recognizing the image, the second user's mobile device may unlock the second user selective access to purchase a consumer product or otherwise grant a desired output.

The current disclosure is directed towards systems and methods to overcome one or more of the deficiencies above as well as others in the art.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Various aspects of this disclosure relate to systems and methods for unlocking selective access for purchasing consumer products through augmented reality. In certain embodiments, a user's mobile device may use augmented reality to capture an image and recognize a target in the image. Upon recognition of a target in the image, the device may overlay a three-dimensional model of a consumer product, and unlock the user access to purchase the consumer product shown. In some aspects, this image may be recognized from a second user's mobile device. As one example, a user may find an image on social media, and show that image to a friend. The friend may then capture the image using a mobile device, and upon recognizing the image as a predetermined target, the device may communicate with a system and unlock the access for the user to purchase a consumer product. Through these features, consumers are encouraged to share images and view shared images through augmented reality software to determine if the image is a target image that will unlock access for consumer products or other desirable outcomes. In certain aspects a user will only be able to determine if an image contains a target by viewing the image through a specific program. As such, users are encouraged to share images and view the images through augmented reality programs to determine whether images are target images that will be recognized by the program. Further, in some aspects the program may only recognize targets when capturing images shown on another user's device, such that each user may only gain access to the consumer product by capturing images from the other's device. In certain embodiments an individual may be granted a first opportunity to share the image through an online platform, such as social media. Each individual who views the image through augmented reality software may be granted access to purchase a product.

Aspects of the disclosure also relate to a method that includes determining whether a geographic position of a mobile device of a user is located within a search area, providing information regarding a plurality of targets located at a plurality of different target locations within the search area, receiving a user selection of a first target from the plurality of targets located at a first target location, monitoring the geographic position of the mobile device, providing information to the user to assist the user in locating the first target, and providing a reward to the user after the mobile device reaches the first target location. The reward may include access to purchase a tangible consumer product or a voucher to purchase the product. The tangible consumer product may be an article of apparel, such as footwear. At least some of these actions may be performed by the mobile device, and in one embodiment, the geographic position is determined and monitored by the mobile device in conjunction with an external device.

According to one aspect, the mobile device also receives user input to activate the first target when the mobile device reaches the first target location. The user input may include capturing (using a camera) an image of a physical object proximate the first target location.

According to another aspect, the target is a virtual object, and the device displays images captured by a camera and modifies the images to include a depiction of the virtual object, when the mobile device reaches the first target location.

According to a further aspect, a limited inventory of the tangible consumer product may be associated with each of the plurality of targets, and the information regarding the plurality of targets includes information indicating an amount of the limited inventory available for each of the plurality of targets.

Further aspects of the disclosure relate to a method that includes determining that a geographic position of a mobile device of a user is not located within a search area and that the geographic position of the mobile device is located within a separate participation area, providing information regarding a plurality of primary users located within the search area who are searching for a first target located at a first target location within the search area, receiving a user selection of a first primary user from the plurality of primary users, providing information to the user about the first primary user, and providing a reward to the user after the first primary user reaches the first target location. The reward may include access to purchase a tangible consumer product or a voucher to purchase the tangible consumer product. The tangible consumer product may be an article of apparel, such as footwear. At least some of these actions may be performed by the mobile device, and in one embodiment, the geographic position is determined by the mobile device in conjunction with an external device.

According to one aspect, the method also includes receiving user input to provide assistance to the first primary user in searching for the first target.

According to another aspect, the method also includes displaying images captured by a first primary user device of the first primary user during searching for the first target.

According to a further aspect, the method also includes providing information regarding a plurality of targets, including the first target, located at a plurality of different target locations within the search area, receiving a user selection of the first target from the plurality of targets, providing information regarding a plurality of primary users, including the first primary user, searching for the first target, and receiving a user selection of the first primary user from the plurality of primary users. In one configuration, a limited inventory of the tangible consumer product is associated with each of the plurality of targets, and the information regarding the plurality of targets includes information indicating an amount of the limited inventory available for each of the plurality of targets. In this configuration, the method may also include receiving an indication that the limited inventory for all of the plurality of targets has been exhausted, and providing the reward to the user after all of the limited inventory for all of the plurality of targets has been exhausted. In another configuration, the information regarding the plurality of primary users includes information indicating a proximity of each of the primary users to the first target.

The method may further provide for use as an observer if the position of the mobile device is not located in the search area or the participation area. An observing user may be provided with information regarding a plurality of targets located at a plurality of different target locations within the search area, and information regarding a plurality of primary users searching for one or more of the targets. The observing user may further be provided with the results of the search.

Other aspects of the disclosure relate to an apparatus, e.g., a mobile device, a server, or other computer device, that includes one or more processors and memory storing computer-readable instructions that, when executed by the one or more processors, cause the apparatus to perform (or assist in performing) part or all of any of the methods described herein.

While described above in conjunction with offering access to purchase a consumer product, aspects of this disclosure also may be practiced in conjunction with other features or functions upon recognition of a target within in image. In some aspects the augmented reality program may alter the display of the device upon recognition of a target in an image. Certain features may include altering the display to play a video, to overlay a three-dimensional image, to alter the view of the capture device, such as by changing certain aspects of the images captured by the image capturing device. Indeed, the scope of this disclosure is not limited to unlocking access to purchasing a consumer product.

DETAILED DESCRIPTION

Aspects of this disclosure relate to searching for a target in a physical and/or geographic space and providing rewards based on locating and/or activating the target, which may be a virtual target or a physical, tangible target. Some aspects involve using augmented reality features to unlock selective access for purchasing consumer products, such as articles of footwear, articles of apparel, athletic equipment, or any other type of consumer product. The augmented reality features may be given instructions to execute upon recognizing a target image. In some aspects the target image may be shared through a platform, such as a social media platform. Users may use augmented reality features to search for images that are target images that will unlock access to purchase consumer products. Further aspects relate to using augmented reality features to generate an output, such as for example, altering the output display of a mobile device based on recognizing a target images. Still further aspects relate to using information such as location information and user information for facilitating engagement and/or cooperation between users in searches and rewards, as well as observation of users in such a search. These and other aspects will be discussed in the context of the following illustrative examples of an augmented reality program and a system for implementing.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope and spirit of the present disclosure. Further, headings within this disclosure should not be considered as limiting aspects of the disclosure and the example embodiments are not limited to the example headings.

I. Example Personal Training System

A. Illustrative Networks

Figure 1:
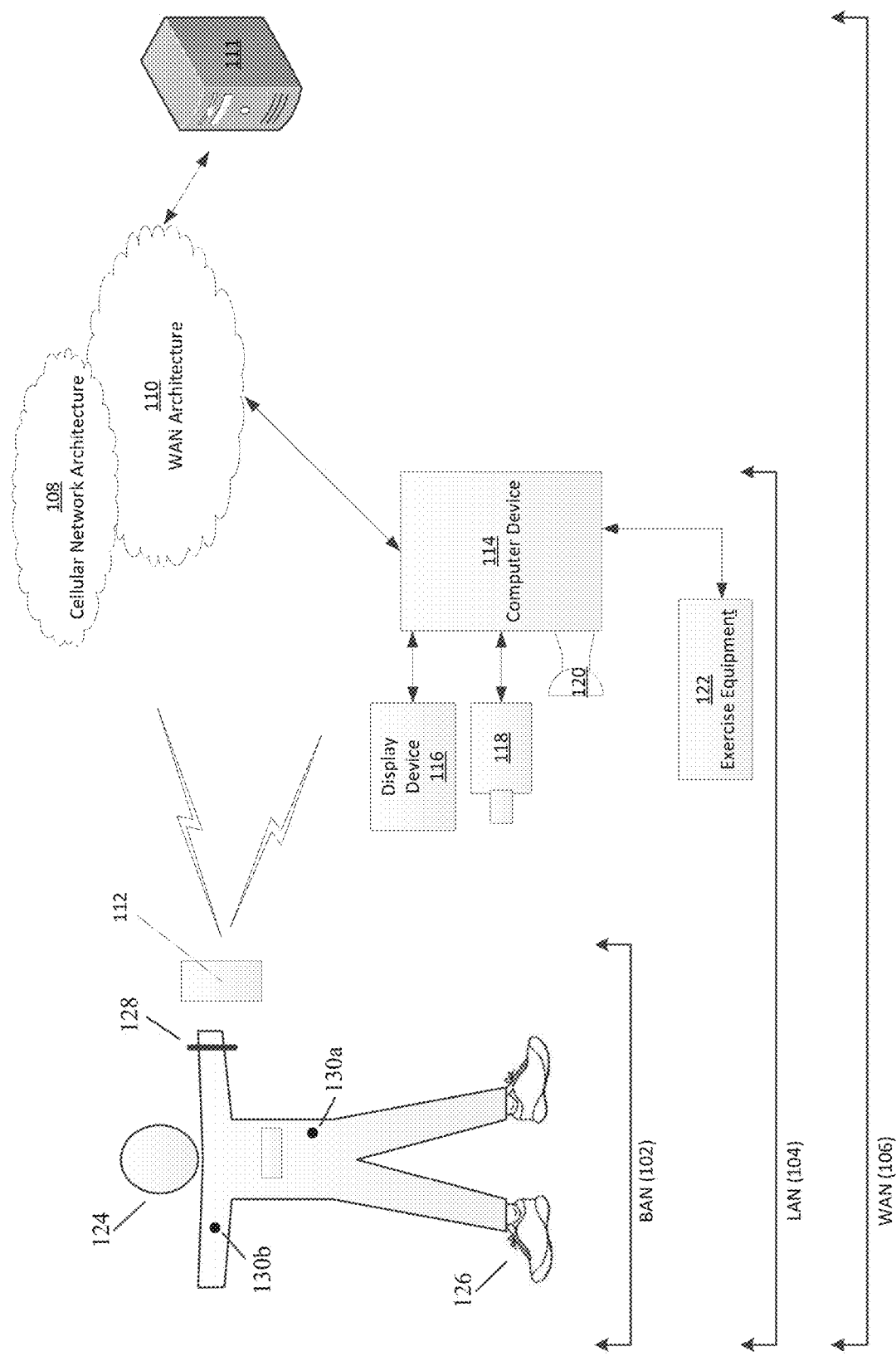
FIG. 1 illustrates an example system that may be configured to provide personal training and/or obtain data from the physical movements of a user in accordance with example embodiments.

Aspects of this disclosure relate to systems and methods that may be utilized across a plurality of networks. In this regard, certain embodiments may be configured to adapt to dynamic network environments. Further embodiments may be operable in differing discrete network environments. FIG. 1 illustrates an example of a personal training system 100 in accordance with example embodiments. Example system 100 may include one or more interconnected networks, such as the illustrative body area network (BAN) 102, local area network (LAN) 104, and wide area network (WAN) 106. As shown in FIG. 1 (and described throughout this disclosure), one or more networks (e.g., BAN 102, LAN 104, and/or WAN 106), may overlap or otherwise be inclusive of each other. Those skilled in the art will appreciate that the illustrative networks 102-106 are logical networks that may each comprise one or more different communication protocols and/or network architectures and yet may be configured to have gateways to each other or other networks. For example, each of BAN 102, LAN 104 and/or WAN 106 may be operatively connected to the same physical network architecture, such as cellular network architecture 108 and/or WAN architecture 110. For example, portable electronic device 112, which may be considered a component of both BAN 102 and LAN 104, may comprise a network adapter or network interface card (NIC) configured to translate data and control signals into and from network messages according to one or more communication protocols, such as the Transmission Control Protocol (TCP), the Internet Protocol (IP), and the User Datagram Protocol (UDP) through one or more of architectures 108 and/or 110. These protocols are well known in the art, and thus will not be discussed here in more detail.

Network architectures 108 and 110 may include one or more information distribution network(s), of any type(s) or topology(s), alone or in combination(s), such as for example, cable, fiber, satellite, telephone, cellular, wireless, etc. and as such, may be variously configured such as having one or more wired or wireless communication channels (including but not limited to: WiFi®, Bluetooth®, Near-Field Communication (NFC) and/or ANT technologies). Thus, any device within a network of FIG. 1, (such as portable electronic device 112 or any other device described herein) may be considered inclusive to one or more of the different logical networks 102-106. With the foregoing in mind, example components of an illustrative BAN and LAN (which may be coupled to WAN 106) will be described.

1. Example Local Area Network

LAN 104 may include one or more electronic devices, such as for example, computer device 114. Computer device 114, or any other component of system 100, may comprise a mobile terminal, such as a telephone, music player, tablet, netbook or any portable device. In other embodiments, computer device 114 may comprise a media player or recorder, desktop computer, server(s), a gaming console, such as for example, a Microsoft® XBOX, Sony® Playstation, and/or a Nintendo® Wii gaming consoles. Those skilled in the art will appreciate that these are merely example devices for descriptive purposes and this disclosure is not limited to any console or computing device.

Figure 2:
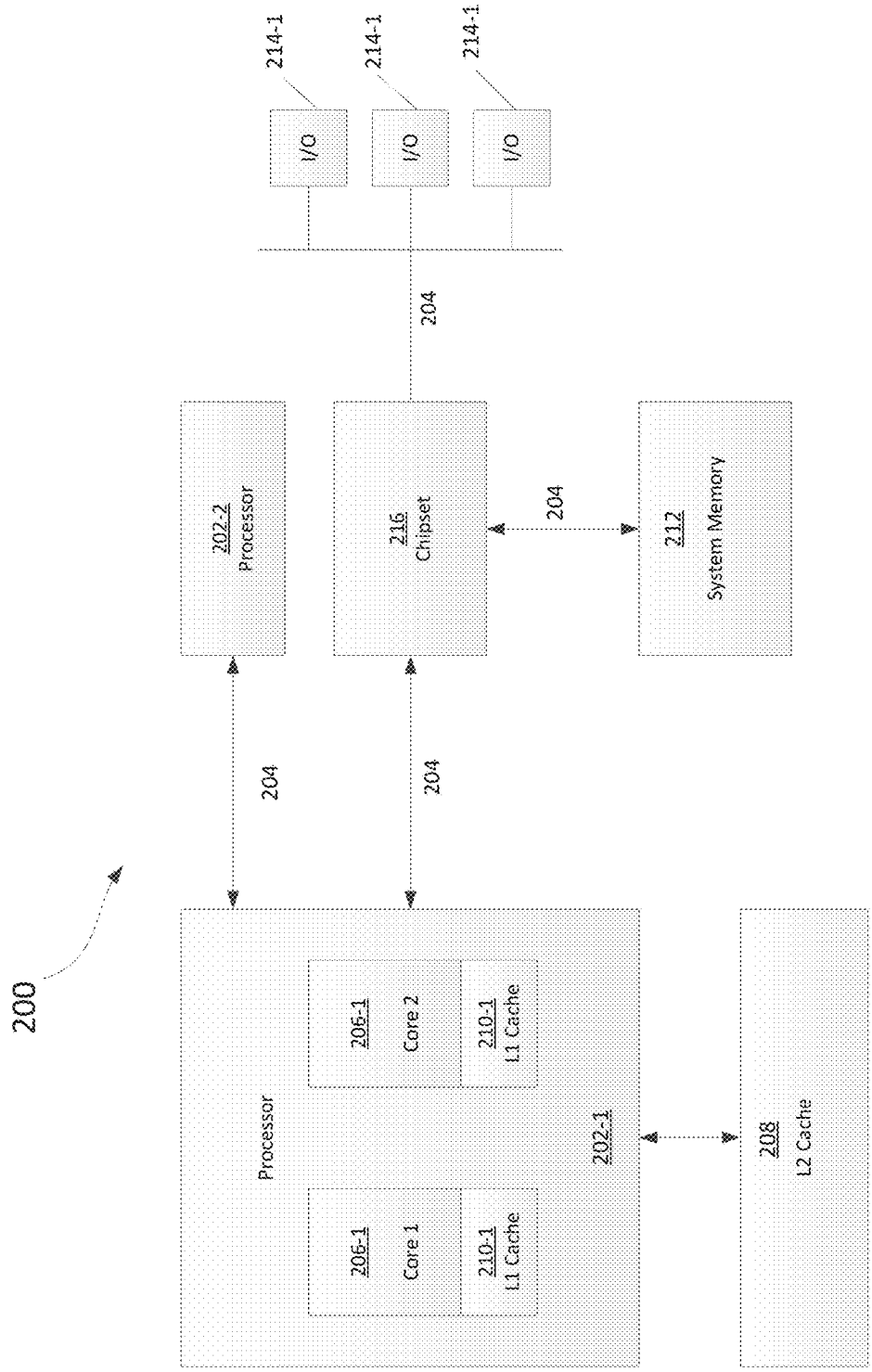
FIG. 2 illustrates an example computer device that may be part of or in communication with the system of FIG. 1.

Those skilled in the art will appreciate that the design and structure of computer device 114 may vary depending on several factors, such as its intended purpose. One example implementation of computer device 114 is provided in FIG. 2, which illustrates a block diagram of computing device 200. Those skilled in the art will appreciate that the disclosure of FIG. 2 may be applicable to any device disclosed herein. Device 200 may include one or more processors, such as processor 202-1 and 202-2 (generally referred to herein as "processors 202" or "processor 202"). Processors 202 may communicate with each other or other components via an interconnection network or bus 204. Processor 202 may include one or more processing cores, such as cores 206-1 and 206-2 (referred to herein as "cores 206" or more generally as "core 206"), which may be implemented on a single integrated circuit (IC) chip.

Cores 206 may comprise a shared cache 208 and/or a private cache (e.g., caches 210-1 and 210-2, respectively). One or more caches 208/210 may locally cache data stored in a system memory, such as memory 212, for faster access by components of the processor 202. Memory 212 may be in communication with the processors 202 via a chipset 216. Cache 208 may be part of system memory 212 in certain embodiments. Memory 212 may include, but is not limited to, random access memory (RAM), read only memory (ROM), and include one or more of solid-state memory, optical or magnetic storage, and/or any other medium that can be used to store electronic information. Yet other embodiments may omit system memory 212.

System 200 may include one or more I/O devices (e.g., I/O devices 214-1 through 214-3, each generally referred to as I/O device 214). I/O data from one or more I/O devices 214 may be stored at one or more caches 208, 210 and/or system memory 212. Each of I/O devices 214 may be permanently or temporarily configured to be in operative communication with a component of system 100 using any physical or wireless communication protocol.

Returning to FIG. 1, four example I/O devices (shown as elements 116-122) are shown as being in communication with computer device 114. Those skilled in the art will appreciate that one or more of devices 116-122 may be stand-alone devices or may be associated with another device besides computer device 114. For example, one or more I/O devices may be associated with or interact with a component of BAN 102 and/or WAN 106. I/O devices 116-122 may include, but are not limited to athletic data acquisition units, such as for example, sensors. One or more I/O devices may be configured to sense, detect, and/or measure an athletic parameter from a user, such as user 124. Examples include, but are not limited to: an accelerometer, a gyroscope, a location-determining device (e.g., GPS), light (including non-visible light) sensor, temperature sensor (including ambient temperature and/or body temperature), sleep pattern sensors, heart rate monitor, image-capturing sensor, moisture sensor, force sensor, compass, angular rate sensor, and/or combinations thereof among others.

In further embodiments, I/O devices 116-122 may be used to provide an output (e.g., audible, visual, or tactile cue) and/or receive an input, such as a user input from athlete 124. Example uses for these illustrative I/O devices are provided below, however, those skilled in the art will appreciate that such discussions are merely descriptive of some of the many options within the scope of this disclosure. Further, reference to any data acquisition unit, I/O device, or sensor is to be interpreted disclosing an embodiment that may have one or more I/O device, data acquisition unit, and/or sensor disclosed herein or known in the art (either individually or in combination).

Information from one or more devices (across one or more networks) may be used to provide (or be utilized in the formation of) a variety of different parameters, metrics or physiological characteristics including but not limited to: motion parameters, such as speed, acceleration, distance, steps taken, direction, relative movement of certain body portions or objects to others, or other motion parameters which may be expressed as angular rates, rectilinear rates or combinations thereof, physiological parameters, such as calories, heart rate, sweat detection, effort, oxygen consumed, oxygen kinetics, and other metrics which may fall within one or more categories, such as: pressure, impact forces, information regarding the athlete, such as height, weight, age, demographic information and combinations thereof.

System 100 may be configured to transmit and/or receive athletic data, including the parameters, metrics, or physiological characteristics collected within system 100 or otherwise provided to system 100. As one example, WAN 106 may comprise server 111. Server 111 may have one or more components of system 200 of FIG. 2. In one embodiment, server 111 comprises at least a processor and a memory, such as processor 206 and memory 212. Server 111 may be configured to store computer-executable instructions on a non-transitory computer-readable medium. The instructions may comprise athletic data, such as raw or processed data collected within system 100. System 100 may be configured to transmit data, such as energy expenditure points, to a social networking website or host such a site. Server 111 may be utilized to permit one or more users to access and/or compare athletic data. As such, server 111 may be configured to transmit and/or receive notifications based upon athletic data or other information.

Returning to LAN 104, computer device 114 is shown in operative communication with a display device 116, an image-capturing device 118, sensor 120 and exercise device 122, which are discussed in turn below with reference to example embodiments. In one embodiment, display device 116 may provide audio-visual cues to athlete 124 to perform a specific athletic movement. The audio-visual cues may be provided in response to computer-executable instruction executed on computer device 114 or any other device, including a device of BAN 102 and/or WAN. Display device 116 may be a touchscreen device or otherwise configured to receive a user-input.

In one embodiment, data may be obtained from image-capturing device 118 and/or other sensors, such as sensor 120, which may be used to detect (and/or measure) athletic parameters, either alone or in combination with other devices, or stored information. Image-capturing device 118 and/or sensor 120 may comprise a transceiver device. In one embodiment sensor 128 may comprise an infrared (IR), electromagnetic (EM) or acoustic transceiver. For example, image-capturing device 118, and/or sensor 120 may transmit waveforms into the environment, including towards the direction of athlete 124 and receive a "reflection" or otherwise detect alterations of those released waveforms. Those skilled in the art will readily appreciate that signals corresponding to a multitude of different data spectrums may be utilized in accordance with various embodiments. In this regard, devices 118 and/or 120 may detect waveforms emitted from external sources (e.g., not system 100). For example, devices 118 and/or 120 may detect heat being emitted from user 124 and/or the surrounding environment. Thus, image-capturing device 126 and/or sensor 128 may comprise one or more thermal imaging devices. In one embodiment, image-capturing device 126 and/or sensor 128 may comprise an IR device configured to perform range phenomenology.

In one embodiment, exercise device 122 may be any device configurable to permit or facilitate the athlete 124 performing a physical movement, such as for example a treadmill, step machine, etc. There is no requirement that the device be stationary. In this regard, wireless technologies permit portable devices to be utilized, thus a bicycle or other mobile exercising device may be utilized in accordance with certain embodiments. Those skilled in the art will appreciate that equipment 122 may be or comprise an interface for receiving an electronic device containing athletic data performed remotely from computer device 114. For example, a user may use a sporting device (described below in relation to BAN 102) and upon returning home or the location of equipment 122, download athletic data into element 122 or any other device of system 100. Any I/O device disclosed herein may be configured to receive activity data.

2. Body Area Network

BAN 102 may include two or more devices configured to receive, transmit, or otherwise facilitate the collection of athletic data (including passive devices). Exemplary devices may include one or more data acquisition units, sensors, or devices known in the art or disclosed herein, including but not limited to I/O devices 116-122. Two or more components of BAN 102 may communicate directly, yet in other embodiments, communication may be conducted via a third device, which may be part of BAN 102, LAN 104, and/or WAN 106. One or more components of LAN 104 or WAN 106 may form part of BAN 102. In certain implementations, whether a device, such as portable device 112, is part of BAN 102, LAN 104, and/or WAN 106, may depend on the athlete's proximity to an access point to permit communication with mobile cellular network architecture 108 and/or WAN architecture 110. User activity and/or preference may also influence whether one or more components are utilized as part of BAN 102. Example embodiments are provided below.

User 124 may be associated with (e.g., possess, carry, wear, and/or interact with) any number of devices, such as portable device 112, shoe-mounted device 126, wrist-worn device 128 and/or a sensing location, such as sensing location 130, which may comprise a physical device or a location that is used to collect information. One or more devices 112, 126, 128, and/or 130 may not be specially designed for fitness or athletic purposes. Indeed, aspects of this disclosure relate to utilizing data from a plurality of devices, some of which are not fitness devices, to collect, detect, and/or measure athletic data. In certain embodiments, one or more devices of BAN 102 (or any other network) may comprise a fitness or sporting device that is specifically designed for a particular sporting use. As used herein, the term "sporting device" includes any physical object that may be used or implicated during a specific sport or fitness activity. Exemplary sporting devices may include, but are not limited to: golf balls, basketballs, baseballs, soccer balls, footballs, powerballs, hockey pucks, weights, bats, clubs, sticks, paddles, mats, and combinations thereof. In further embodiments, exemplary fitness devices may include objects within a sporting environment where a specific sport occurs, including the environment itself, such as a goal net, hoop, backboard, portions of a field, such as a midline, outer boundary marker, base, and combinations thereof.

In this regard, those skilled in the art will appreciate that one or more sporting devices may also be part of (or form) a structure and vice-versa, a structure may comprise one or more sporting devices or be configured to interact with a sporting device. For example, a first structure may comprise a basketball hoop and a backboard, which may be removable and replaced with a goal post. In this regard, one or more sporting devices may comprise one or more sensors, such as one or more of the sensors discussed above in relation to FIGS. 1-3, that may provide information utilized, either independently or in conjunction with other sensors, such as one or more sensors associated with one or more structures. For example, a backboard may comprise a first sensor configured to measure a force and a direction of the force by a basketball upon the backboard and the hoop may comprise a second sensor to detect a force. Similarly, a golf club may comprise a first sensor configured to detect grip attributes on the shaft and a second sensor configured to measure impact with a golf ball.

Looking to the illustrative portable device 112, it may be a multi-purpose electronic device, that for example, includes a telephone or digital music player, including an IPOD®, IPAD®, or iPhone®, brand devices available from Apple, Inc. of Cupertino, Calif. or Zune® or Microsoft® Windows devices available from Microsoft of Redmond, Wash. As known in the art, digital media players can serve as an output device, input device, and/or storage device for a computer. Device 112 may be configured as an input device for receiving raw or processed data collected from one or more devices in BAN 102, LAN 104, or WAN 106. In one or more embodiments, portable device 112 may comprise one or more components of computer device 114. For example, portable device 112 may be include a display 116, image-capturing device 118, and/or one or more data acquisition devices, such as any of the I/O devices 116-122 discussed above, with or without additional components, so as to comprise a mobile terminal.

a. Illustrative Apparel/Accessory Sensors

In certain embodiments, I/O devices may be formed within or otherwise associated with user's 124 clothing or accessories, including a watch, armband, wristband, necklace, shirt, shoe, or the like. These devices may be configured to monitor athletic movements of a user. It is to be understood that they may detect athletic movement during user's 124 interactions with computer device 114 and/or operate independently of computer device 114 (or any other device disclosed herein). For example, one or more devices in BAN 102 may be configured to function as an all-day activity monitor that measures activity regardless of the user's proximity or interactions with computer device 114. It is to be further understood that the sensory system 302 shown in FIG. 3 and the device assembly 400 shown in FIG. 4, each of which are described in the following paragraphs, are merely illustrative examples.

i. Shoe-Mounted Device

Figure 3:
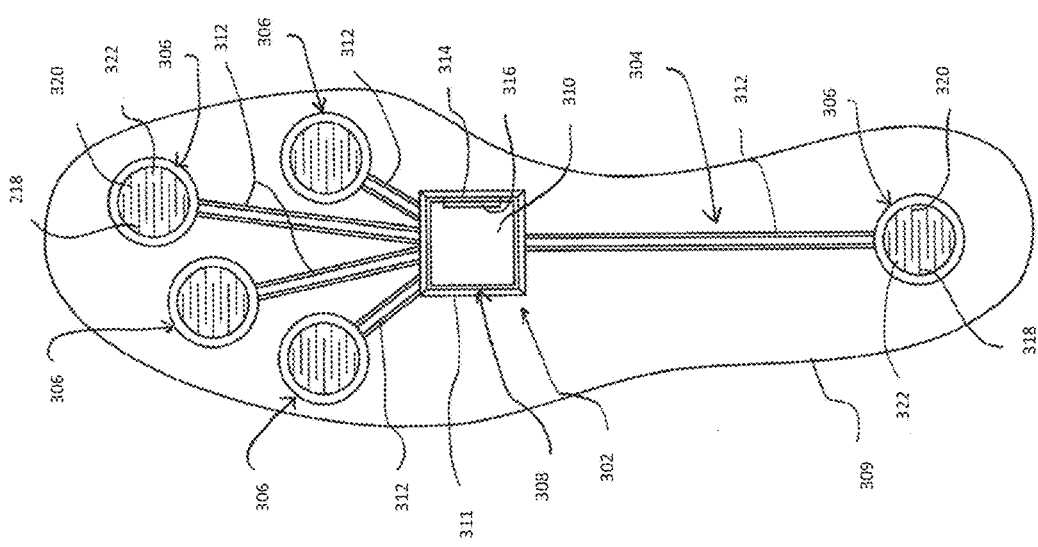
FIG. 3 shows an illustrative sensor assembly that may be worn by a user in accordance with example embodiments.

In certain embodiments, device 126 shown in FIG. 1, may comprise footwear which may include one or more sensors, including but not limited to those disclosed herein and/or known in the art. FIG. 3 illustrates one example embodiment of a sensor system 302 providing one or more sensor assemblies 304. Assembly 304 may comprise one or more sensors, such as for example, an accelerometer, gyroscope, location-determining components, force sensors and/or or any other sensor disclosed herein or known in the art. In the illustrated embodiment, assembly 304 incorporates a plurality of sensors, which may include force-sensitive resistor (FSR) sensors 306; however, other sensor(s) may be utilized. Port 308 may be positioned within a sole structure 309 of a shoe, and is generally configured for communication with one or more electronic devices. Port 308 may optionally be provided to be in communication with an electronic module 310, and the sole structure 309 may optionally include a housing 311 or other structure to receive the module 310. The sensor system 302 may also include a plurality of leads 312 connecting the FSR sensors 306 to the port 308, to enable communication with the module 310 and/or another electronic device through the port 308. Module 310 may be contained within a well or cavity in a sole structure of a shoe, and the housing 311 may be positioned within the well or cavity. In one embodiment, at least one gyroscope and at least one accelerometer are provided within a single housing, such as module 310 and/or housing 311. In at least a further embodiment, one or more sensors are provided that, when operational, are configured to provide directional information and angular rate data. The port 308 and the module 310 include complementary interfaces 314, 316 for connection and communication.

In certain embodiments, at least one force-sensitive resistor 306 shown in FIG. 3 may contain first and second electrodes or electrical contacts 318, 320 and a force-sensitive resistive material 322 disposed between the electrodes 318, 320 to electrically connect the electrodes 318, 320 together. When pressure is applied to the force-sensitive material 322, the resistivity and/or conductivity of the force-sensitive material 322 changes, which changes the electrical potential between the electrodes 318, 320. The change in resistance can be detected by the sensor system 302 to detect the force applied on the sensor 316. The force-sensitive resistive material 322 may change its resistance under pressure in a variety of ways. For example, the force-sensitive material 322 may have an internal resistance that decreases when the material is compressed. Further embodiments may utilize "volume-based resistance", which may be implemented through "smart materials." As another example, the material 322 may change the resistance by changing the degree of surface-to-surface contact, such as between two pieces of the force sensitive material 322 or between the force sensitive material 322 and one or both electrodes 318, 320. In some circumstances, this type of force-sensitive resistive behavior may be described as "contact-based resistance."

ii. Wrist-Worn Device

Figure 4:
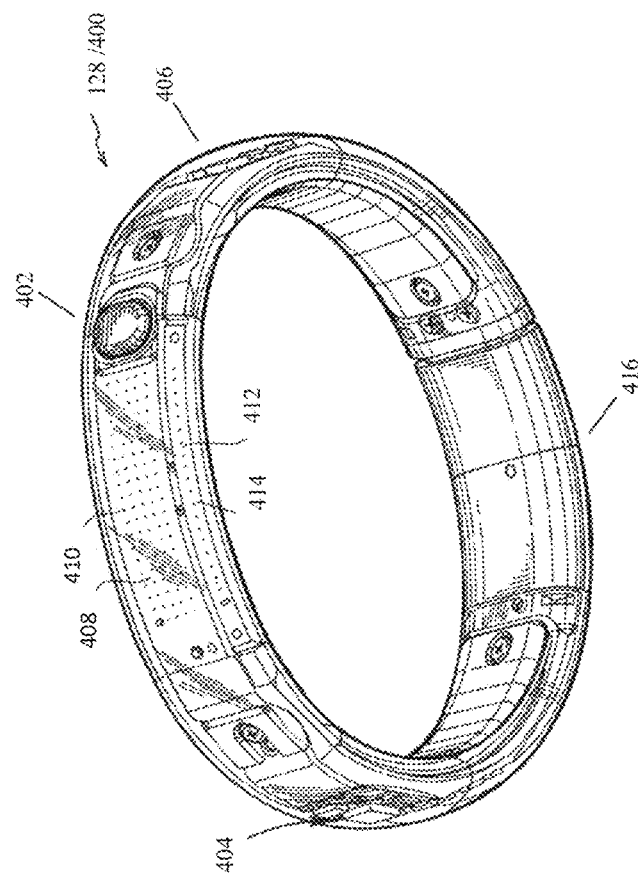
FIG. 4 shows another example sensor assembly that may be worn by a user in accordance with example embodiments.

As shown in FIG. 4, device 400 (which may resemble or comprise sensory device 128 shown in FIG. 1), may be configured to be worn by user 124, such as around a wrist, arm, ankle, neck or the like. Device 400 may include an input mechanism, such as a depressible input button 402 configured to be used during operation of the device 400. The input button 402 may be operably connected to a controller 404 and/or any other electronic components, such as one or more of the elements discussed in relation to computer device 114 shown in FIG. 1. Controller 404 may be embedded or otherwise part of housing 406. Housing 406 may be formed of one or more materials, including elastomeric components and comprise one or more displays, such as display 408. The display may be considered an illuminable portion of the device 400. The display 408 may include a series of individual lighting elements or light members such as LED lights 410. The lights may be formed in an array and operably connected to the controller 404. Device 400 may include an indicator system 412, which may also be considered a portion or component of the overall display 408. Indicator system 412 can operate and illuminate in conjunction with the display 408 (which may have pixel member 414) or completely separate from the display 408. The indicator system 412 may also include a plurality of additional lighting elements or light members, which may also take the form of LED lights in an exemplary embodiment. In certain embodiments, indicator system may provide a visual indication of goals, such as by illuminating a portion of lighting members of indicator system 412 to represent accomplishment towards one or more goals. Device 400 may be configured to display data expressed in terms of activity points or currency earned by the user based on the activity of the user, either through display 408 and/or indicator system 412.

A fastening mechanism 416 can be disengaged wherein the device 400 can be positioned around a wrist or portion of the user 124 and the fastening mechanism 416 can be subsequently placed in an engaged position. In one embodiment, fastening mechanism 416 may comprise an interface, including but not limited to a USB port, for operative interaction with computer device 114 and/or devices, such as devices 120 and/or 112. In certain embodiments, fastening member may comprise one or more magnets. In one embodiment, fastening member may be devoid of moving parts and rely entirely on magnetic forces.

In certain embodiments, device 400 may comprise a sensor assembly (not shown in FIG. 4). The sensor assembly may comprise a plurality of different sensors, including those disclosed herein and/or known in the art. In an example embodiment, the sensor assembly may comprise or permit operative connection to any sensor disclosed herein or known in the art. Device 400 and or its sensor assembly may be configured to receive data obtained from one or more external sensors.

iii. Apparel and/or Body Location Sensing

Element 130 of FIG. 1 shows an example sensory location which may be associated with a physical apparatus, such as a sensor, data acquisition unit, or other device. Yet in other embodiments, it may be a specific location of a body portion or region that is monitored, such as via an image capturing device (e.g., image capturing device 118). In certain embodiments, element 130 may comprise a sensor, such that elements 130a and 130b may be sensors integrated into apparel, such as athletic clothing. Such sensors may be placed at any desired location of the body of user 124. Sensors 130a/b may communicate (e.g., wirelessly) with one or more devices (including other sensors) of BAN 102, LAN 104, and/or WAN 106. In certain embodiments, passive sensing surfaces may reflect waveforms, such as infrared light, emitted by image-capturing device 118 and/or sensor 120. In one embodiment, passive sensors located on user's 124 apparel may comprise generally spherical structures made of glass or other transparent or translucent surfaces which may reflect waveforms. Different classes of apparel may be utilized in which a given class of apparel has specific sensors configured to be located proximate to a specific portion of the user's 124 body when properly worn. For example, golf apparel may include one or more sensors positioned on the apparel in a first configuration and yet soccer apparel may include one or more sensors positioned on apparel in a second configuration.

Figure 5:
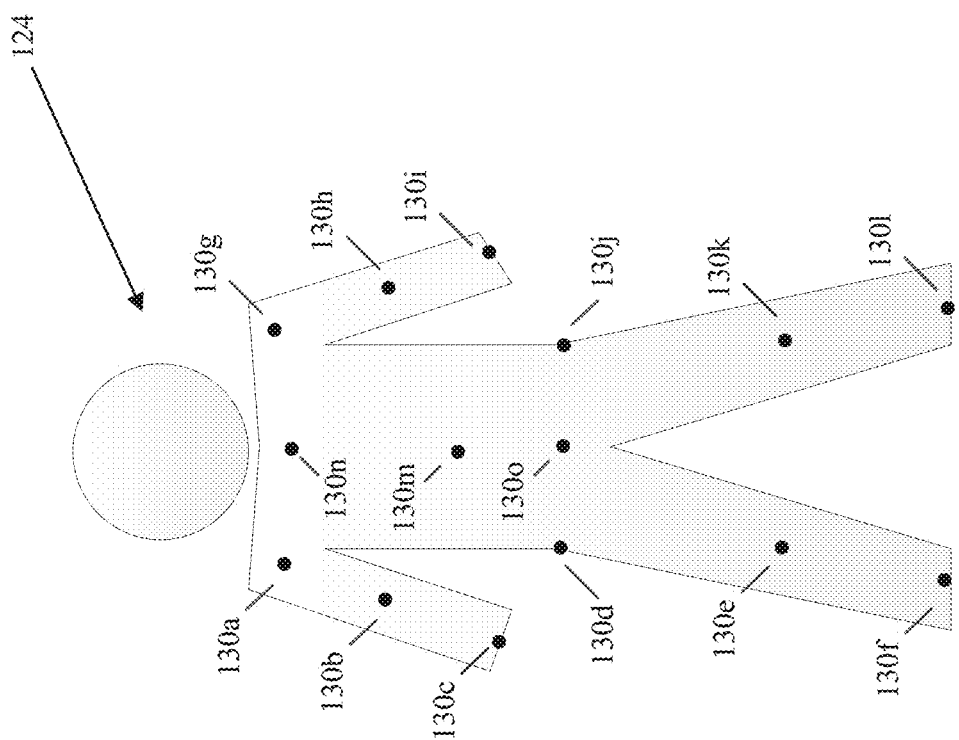
FIG. 5 shows illustrative locations for sensory input which may include physical sensors located on/in a user's clothing and/or be based upon identification of relationships between two moving body parts of the user.

FIG. 5 shows illustrative locations for sensory input (see, e.g., sensory locations 130a-130o). In this regard, sensors may be physical sensors located on/in a user's clothing, yet in other embodiments, sensor locations 130a-130o may be based upon identification of relationships between two moving body parts. For example, sensor location 130a may be determined by identifying motions of user 124 with an image-capturing device, such as image-capturing device 118. Thus, in certain embodiments, a sensor may not physically be located at a specific location (such as one or more of sensor locations 130a-130o), but is configured to sense properties of that location, such as with image-capturing device 118 or other sensor data gathered from other locations. In this regard, the overall shape or portion of a user's body may permit identification of certain body parts. Regardless of whether an image-capturing device is utilized and/or a physical sensor located on the user 124, and/or using data from other devices, (such as sensory system 302), device assembly 400 and/or any other device or sensor disclosed herein or known in the art is utilized, the sensors may sense a current location of a body part and/or track movement of the body part. In one embodiment, sensory data relating to location 130m may be utilized in a determination of the user's center of gravity (a.k.a, center of mass). For example, relationships between location 130a and location(s) 130f/130l with respect to one or more of location(s) 130m-130o may be utilized to determine if a user's center of gravity has been elevated along the vertical axis (such as during a jump) or if a user is attempting to "fake" a jump by bending and flexing their knees. In one embodiment, sensor location 1306n may be located at about the sternum of user 124. Likewise, sensor location 130o may be located approximate to the naval of user 124. In certain embodiments, data from sensor locations 130m-130o may be utilized (alone or in combination with other data) to determine the center of gravity for user 124. In further embodiments, relationships between multiple sensor locations, such as sensors 130m-130o, may be utilized in determining orientation of the user 124 and/or rotational forces, such as twisting of user's 124 torso. Further, one or more locations, such as location(s), may be utilized as (or approximate) a center of moment location. For example, in one embodiment, one or more of location(s) 130m-130o may serve as a point for a center of moment location of user 124. In another embodiment, one or more locations may serve as a center of moment of specific body parts or regions.

Figure 6A:
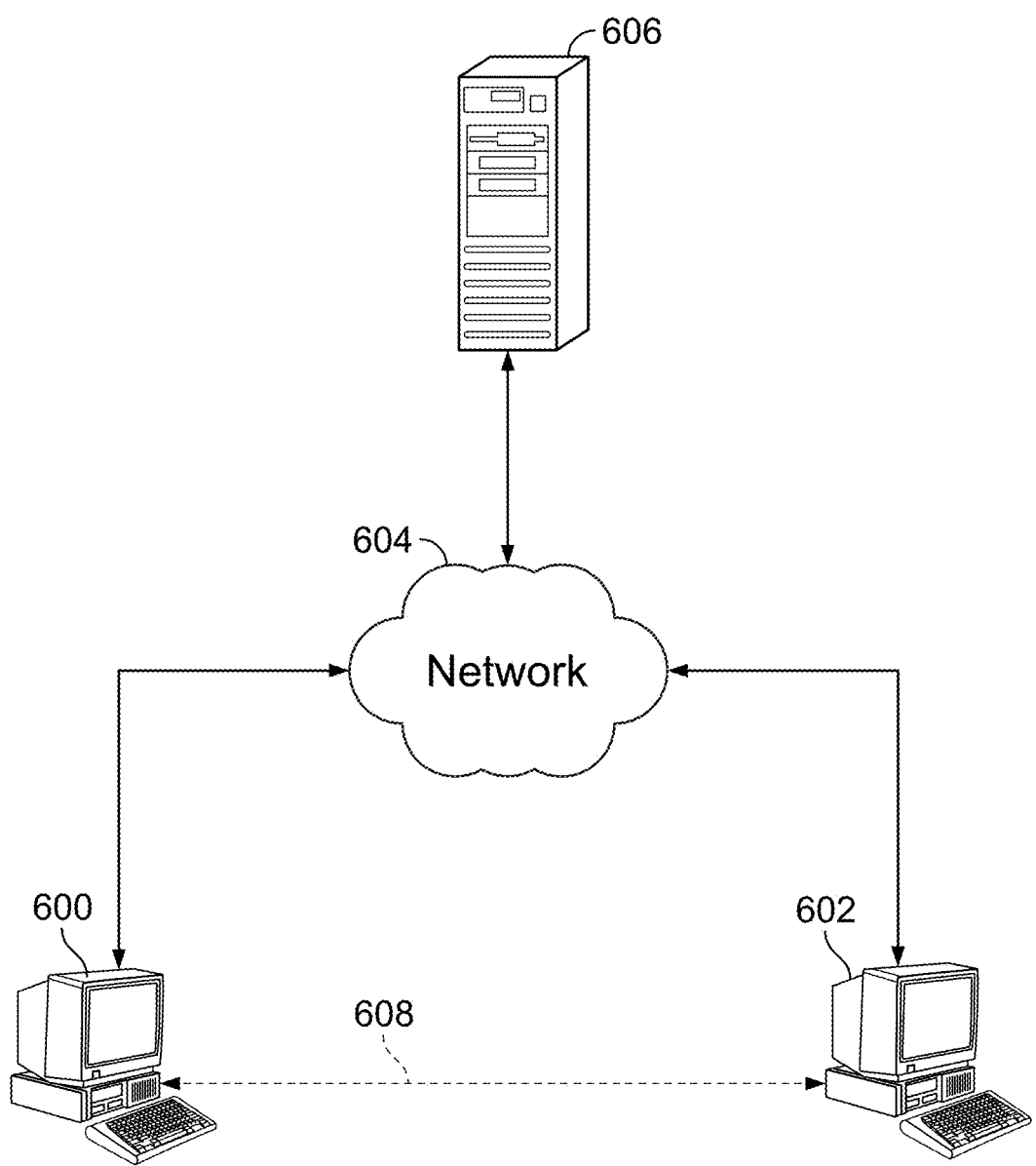
FIGS. 6A through 6C illustrate various examples of hardware and overall networking systems that may be used to implement various examples of the disclosure.
Figure 6B:
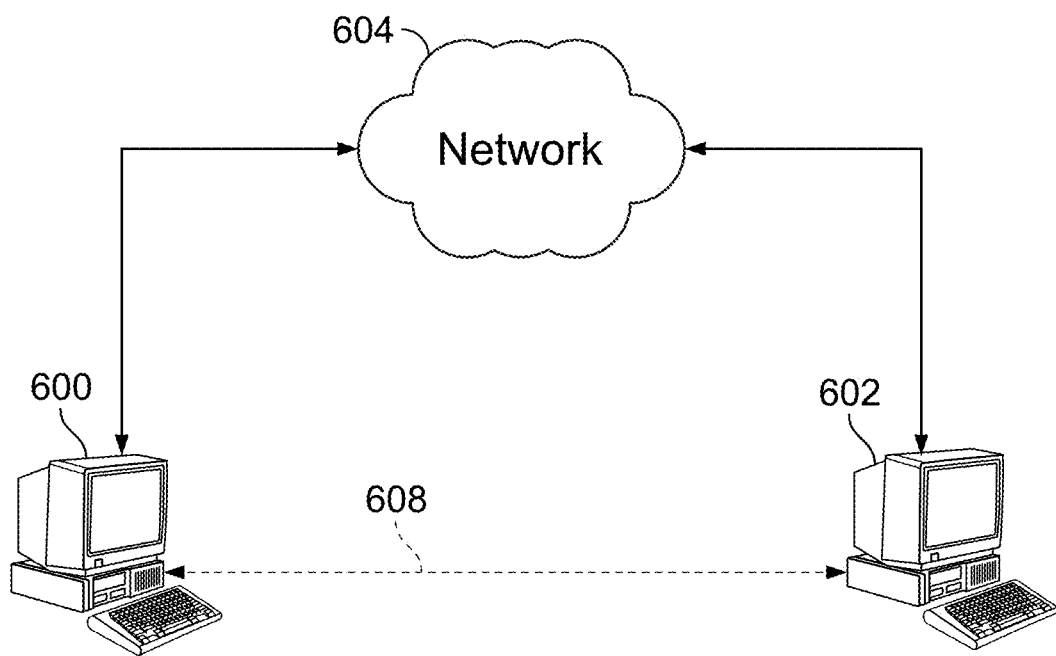
Figure 6C:
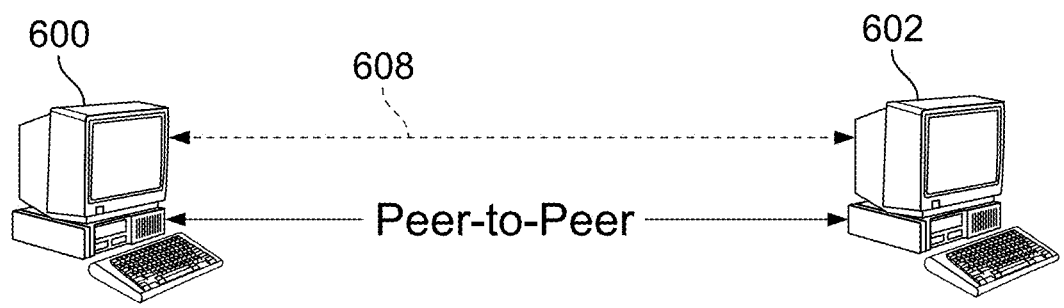

FIGS. 6A through 6C illustrate various examples of hardware systems on which systems and user interfaces according to this disclosure that may be implemented on and on which methods according to this disclosure may be practiced. In an embodiment, multiple users may work together share and capture target images using augmented reality programs.

FIG. 6A shows a first computing device 600 and a second computing device 602 connected and in communication with one another via a network 604, such as via an internet connection, via a local area network (LAN), via a wide area network (WAN), etc. The two computing devices 600 and 602 may be located remotely from one another. In some aspects the computing device 600 and 602 may be mobile devices, such as cell phones or tablets. As shown in FIG. 6A, the two computing devices 600 and 602 each establish a communication channel within the network 604 and communicate with a messaging server system 606 (comprising one or more server computers) that provide data or information about the target between the computing devices 600 and 602. Any desired communication link and communication protocol may be used to provide and control the data exchange between computing devices 600 and 602. If desired, this same server system 606 may provide communication data between the users on the computing devices 600 and 602 (such as textual message data, webcam data, etc.) as will be described in more detail below. Alternatively, if desired, a separate communication link 608 may be provided to support transfer of communication data between the computing devices 600 and 602.

Any desired types of computing devices 600 and 602 may be used without departing from this disclosure, such as any computing device capable of establishing a networked connection and/or a peer-to-peer connection and capable of providing the necessary display, user interface, and input capabilities, as will be described in more detail below. Some more specific examples of computing devices 600 and 602 that may be used in systems and methods in accordance with at least some examples of this disclosure include, but are not limited to: desktop computers, personal computers, laptop computers, palmtop computers, handheld computers, cellular telephones, personal digital assistants, computer workstations, televisions, and the like. Notably, the various computing devices 600, 602, etc. may be in communication with the network 604 and the server system 606 in the same or different manners without departing from this disclosure. Moreover, the communicating computing devices 600, 602, etc. used to display and capture the target image may be the same type or different types without departing from this disclosure (such as one desktop computer and one cellular telephone device), and the computing devices 600, 602, etc. may communicate with each other or with a system database 606 via the same communication channels or via different communication channels (e.g., both users may connect to the system database through Wi-Fi, or one may connect to the system database through Wi-Fi while the other connects through cellular data. In further aspects, computing devices may display target images via the same applications or via different applications (e.g., both users may display the target image through a single application, such as Instagram, or through different applications (such as one user through Instagram and another user through a Facebook application, etc.).

Computing devices 600 and 602 that may be used in systems and methods in accordance with examples of this disclosure may include one or more input devices and a data processing system (e.g., including one or more microprocessors). Examples of input devices that may be included with computing devices 600, 602 include, but are not limited to conventional input devices, such as: a keyboard (hard keyboard or soft keyboard); a mouse, trackball, rollerball, touchpad, or other pointing device; a stylus or other pen-type input device (e.g., for a tablet PC type computing device); a disk drive; a USB port; a network connection; a joystick type controller; a telephone connection; an Ethernet connection; voice recognition capabilities; etc. Also, any desired type of display device may be provided for use in conjunction with the computing devices 600, 602 of systems and methods according to this disclosure, including display devices integrated with the computing device 600, 602 itself or display devices separate from the computing devices 600, 602 but in communication therewith, such as projector displays, separate monitor displays, etc.

The computing devices 600 and 602 may be connected to the network 604 in any desired manner without departing from this disclosure, including in conventional manners that are known and used in the art, such as any conventional wired or wireless connection and using any network connection protocol. The communication channel connection 608 between the computing devices 600, 602 may be the same as or different from the system database connections without departing from this disclosure, and this connection 608 may include technology that is conventional and known in the art. In addition to various computer-to-computer communication links that are known and used in the art for providing live, real time communications between two (or more) computers, the communication channel connection 608 further may include other types of communication channels between computers or users, such as an instant messaging channel, a peer-to-peer messaging channel, a conventional telephone connection, etc. As another alternative, if desired, the users could be located in close proximity to one another and may be allowed to communicate directly, in a face-to-face conversation, without the need for a separate communication channel. The communication channel 608, when provided, may use all of the same hardware as involved in the target image data exchange, all different hardware, or a combination thereof (e.g., some users using the same hardware, others using different hardware, etc.).

As described above (and as will be described in more detail below), systems and methods in accordance with examples of this disclosure will provide a user interface display on the user's computing device 600, 602. This interface will allow the user to see the target image and will allow the user to display the target image for another user to capture. The user interfaces on the various devices will be provided and controlled by one or more of the computing devices 600, 602 and/or by the server system 606, and data for generating, maintaining, and receiving input through the user interfaces will be generated and provided via computer readable media included as part of or associated with one or more of the computing devices 600, 602 and/or the server system 606. Examples of such computer readable media include, but are not limited to: computer-readable memories, both internal to a computer (e.g., hard drives) or separable from the computer (such as disks, solid state or flash memory devices, data available over a networked connection, etc.), including any type of computer readable media that is conventionally known and used in the computer arts.

In the example overall system shown in FIG. 6A, the software for generating the user interface may reside on computer readable media present on or available to any one of computing device 600, computing device 602, or server system 606. Alternatively, if desired, the software, or at least some portion(s) thereof, may be reside on more than one of, or all of computing device 600, computing device 602, or server system 606. The sever system 606 may be operated and maintained by the same organization(s) or individual(s) that operate and maintain at least one of the computing devices 600 and 602 and/or network 604, or the server system 606 may be operated, controlled, and maintained by a party separate from any or all of these entities. As some more specific examples, server system 606 may be operated and maintained (and the user interface software also may be operated and maintained) by one or more entities whose products are being marketed and granted access through the augmented reality programs (e.g., a manufacturer, a retailer, a vendor selected by a manufacturer or retailer, etc.).

Another example overall system set up is illustrated in FIG. 6B. While the overall network features 604 may be the same as or similar to those described above in conjunction with FIG. 6A (e.g., LAN, WAN, internet, etc.), in this example set up, the separate and independent server system 606 is omitted. Rather, in the setup of FIG. 6B, at least one of the two computing devices 600, 602 (and optionally both computing devices 600, 602) drives the data exchange communications and includes the software for generating and controlling the user interface.

If desired, the networked communication between the users to exchange data may include features that allow the users to communicate with one another about the target image. Alternatively, as shown in FIG. 6B, a separate user communication link 608 is illustrated. In addition to various computer-to-computer communication links that are known and used in the art for providing live, real time communications between two (or more) computers, the communication channel connection 608 further may include other types of communication channels between computers or users, such as an instant messaging channel, a peer-to-peer messaging channel, a conventional telephone connection, etc. As another alternative, if desired, the users could be located in close proximity to one another and may be allowed to communicate directly, in a face-to-face conversation, without the need for a separate communication channel 608. The communication channel 608 may use the same or different hardware from that used in the target image data exchange.

Collaboration between users to display and capture the target images also may take place, in at least some systems and methods in accordance with this disclosure, via direct communication between computing devices in a peer-to-peer manner, as shown in FIG. 6C. Any desired hardware and/or protocols for this type of peer-to-peer communication may be used without departing from this disclosure, including conventional hardware and protocols as are known and used in the computer communications art. Also, as with the examples of FIGS. 6A and 6B described above, a separate user communication channel connection 608 may be provided (e.g., for instant messaging, additional peer-to-peer messaging, a conventional telephone connection (which may use different hardware from that involved in inputting or capturing the target image data), etc.). The various other alternatives as described above for FIGS. 6A and 6B also may be used in the setup of FIG. 6C without departing from this disclosure.

Figure 8:
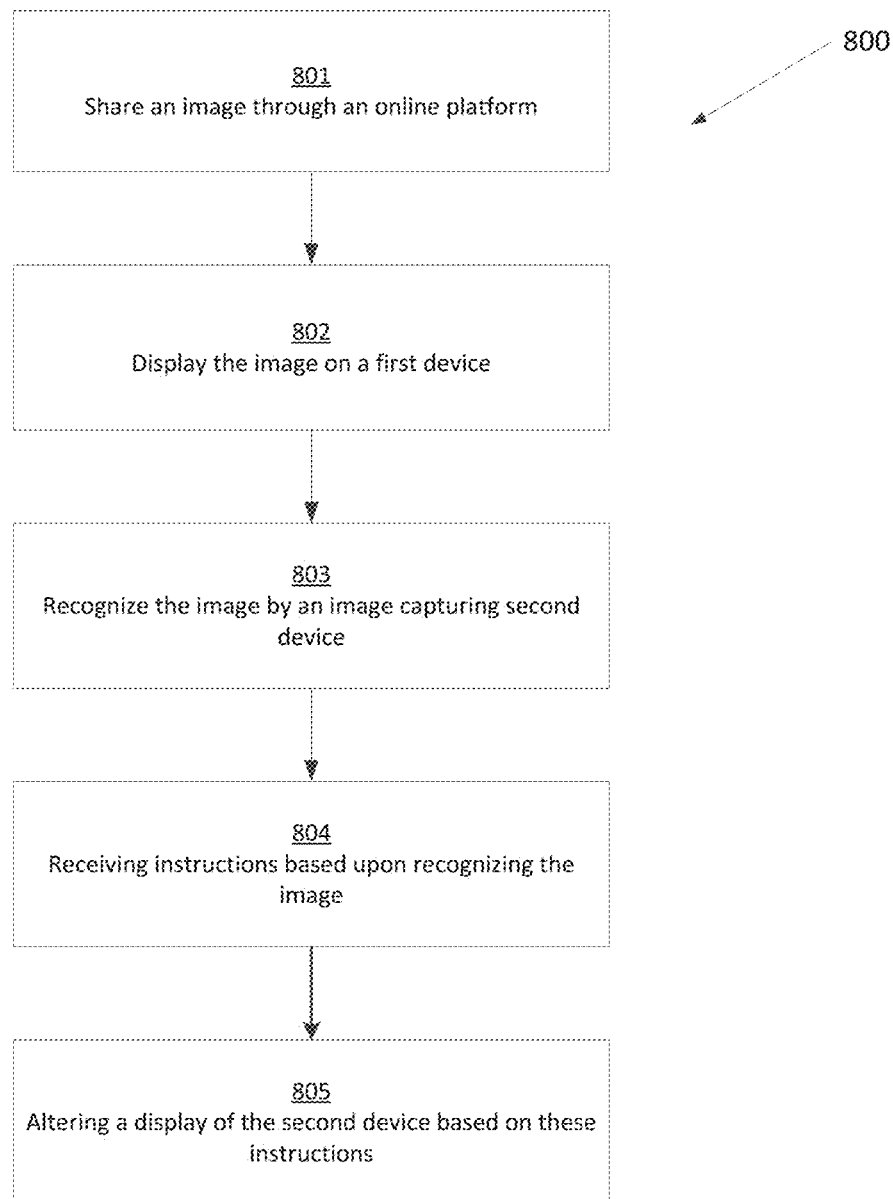
FIG. 8 illustrates a flowchart showing examples of performing steps discussed in the present disclosure.
Figure 9:
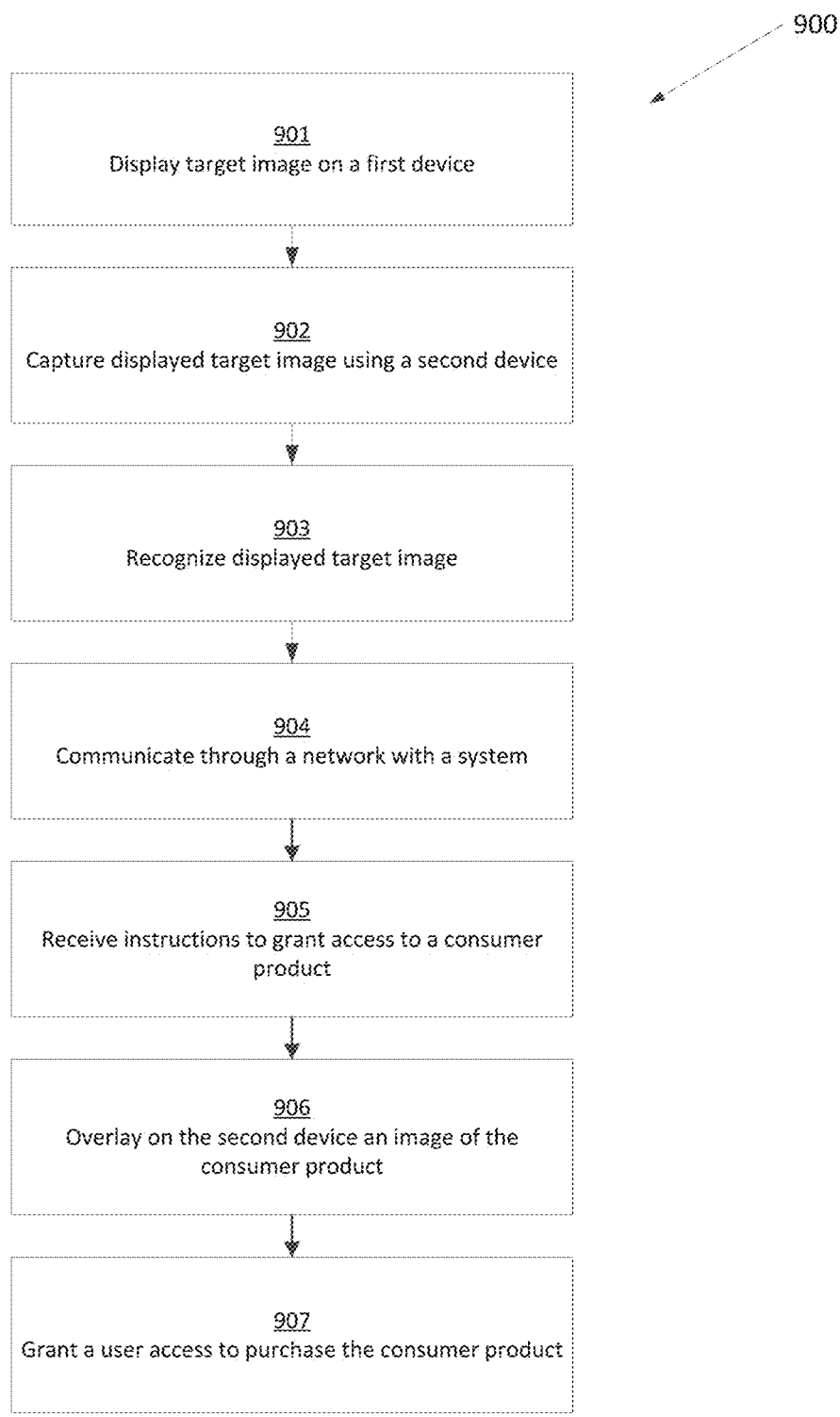
FIG. 9 illustrates another flowchart showing examples of performing steps discussed in the present disclosure.
Figure 10:
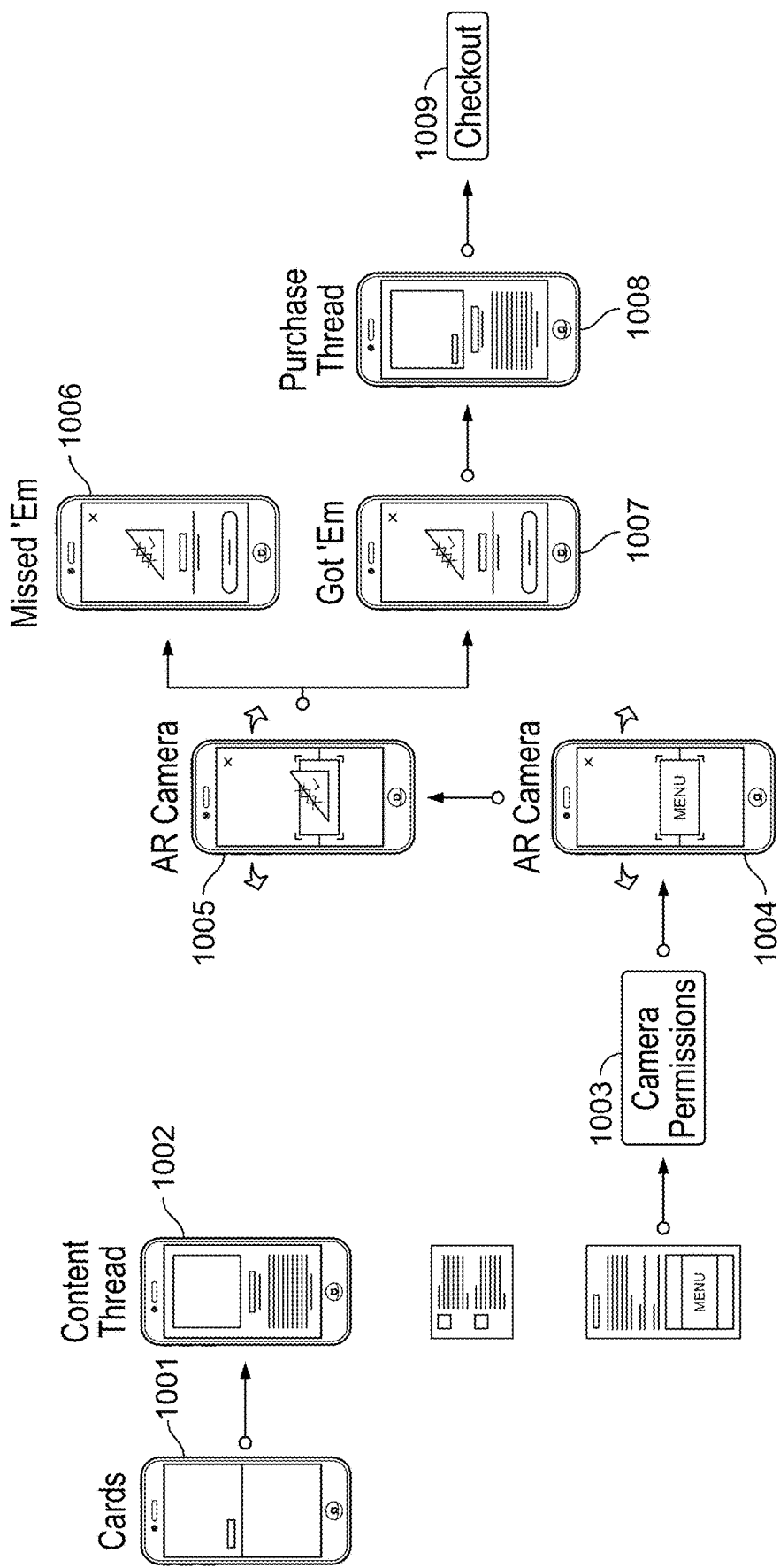
FIG. 10 illustrates another flowchart showing examples of performing steps disclosed in the present disclosure, including the displays associated with the mobile devices.

FIGS. 8-9 illustrate example embodiments for methods of using augmented reality programs to capture target images and upon verifying the captured image is a target image, performing a predefined output such as unlocking access to purchase a consumer product. The steps shown in these example flow charts may be executed by a single computing device, such as processors included in the first mobile device 705 or second mobile device 706. Alternatively, execution of the steps may occur through only one of the first mobile device or second mobile device, or in combination with a system database 707. In some aspects the steps will be performed in order, but in other aspects steps may be performed in a different order or concurrently. For example, in some embodiments, captures may be performed by either of the user device, that capture information communicated to a system database, where the system database then determines if the capture information is recognized as a target image and responding to the user device with instructions. However, in other embodiments, the system database may communicate target image information and instructions to the mobile device prior to the user device capturing an image. Therefore the capturing of the target image, recognition of the target image, and execution of the instructions may all be performed at either user device 705 or 706.

Figure 7:
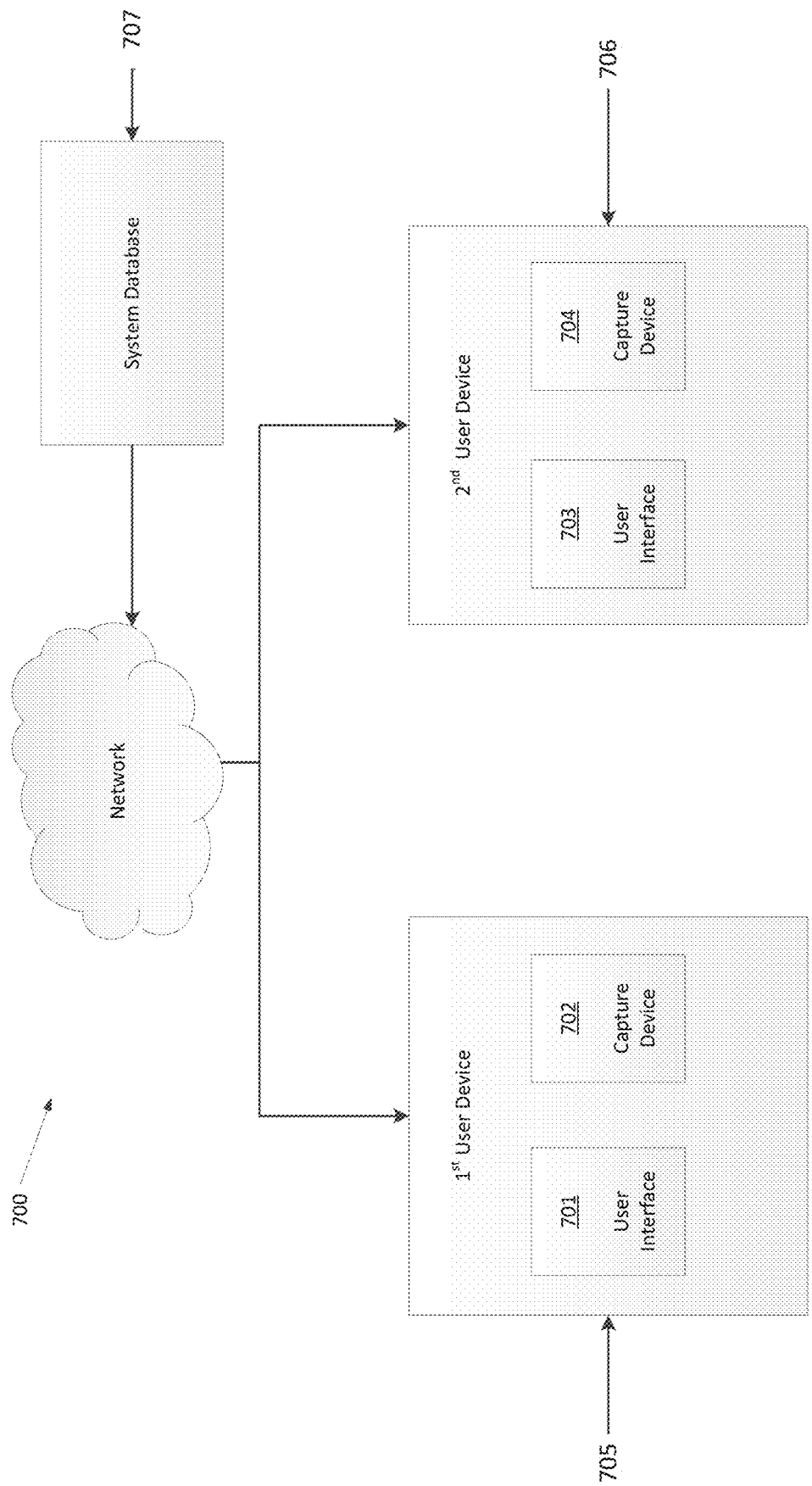
FIG. 7 illustrates an example of a hardware and networking system that may be used to implement various examples of the disclosure.

FIG. 7 illustrates an exemplary system for implementing the present disclosure. As shown in FIG. 7, two user devices may comprise a user interface and a capture device. The user interface may include both a display and an input mechanism, where the input mechanism may be a button, touchscreen, or other way to input information. The image capture devices, 702 and 704, may include one or more video cameras. The image capture devices may be configured to capture or record images or video, including recording or capturing the user interface display, 701 and 703, of the other user's device. The user devices may be connected through a network to a system database which can analyze the captured images or video to determine if a target image is recognized, and send further instructions to the user devices upon confirming recognition of the target image.

FIG. 8 illustrates an exemplary flowchart of steps that certain embodiments may take. First, at step 801, an image may be shared through an online platform. In some aspects this online platform may be a social media platform, such as Instagram, Twitter, Facebook, Google+, or any other social media platform. The image may include target information to be recognized by a capturing device. The image may be shared by a first user through their social media account. As a next step, at 802 the image may be displayed on a first device. This may include through a second user's social media account. In some aspects a first user may share an image through an online platform and a second user may view the image using the same social media platform or through a different social media platform.

At the next step 803, a second device may capture the image and determine whether it recognizes the image. In some aspects the second device may use a camera to take still images or record video of the image. Upon capturing the image, the second device may communicate with a database to determine whether it recognizes the image as a target. If the device confirms recognition of the target image it may receive instructions upon recognizing the image at step 804. The instructions may include unlocking access to allow the user of the second device to purchase a consumer product. In some aspects step 805 may involve altering a display of the second device based on the instructions. This may include overlaying a consumer product on the display, or changing the display such as by presenting a message or video to a consumer, or altering recognized and/or captured images.

FIG. 9 illustrates an exemplary flowchart showing steps that certain embodiments may take. First, at step 901, an image may be displayed on a first device. In some aspects this display may occur through an online platform, such as Instagram, Twitter, Facebook, Google+, or any other social media platform. The image may include target information to be recognized by a capturing device. At step 902, the image may then be captured using a second device, including through the second device's camera or image capturing device, or through sharing by a first user through their social media account. The device may then recognize the target image at step 903. Upon recognition of the target image, the device may communicate through a network with a system or a database at step 904. At step 905, the device may receive instructions from the system or database to grant the user access to purchase a consumer product. Upon receiving these instructions, at step 906 the second device may overlay an image of the consumer product on the display image. For example, the device may overlay a three-dimensional projected representation of the consumer product that will be unlocked. In this regard, the image may be overlaid on the recognized target, so that as the user moves the camera around, the projected representation will move, allowing the user to see different angles of the product. At a final step 907, the device may grant the user access to purchase the consumer product that has been unlocked.

In some aspects of the present disclosure, a first individual may share an image through a platform, where a second individual is able to view that image on a mobile device. In some aspects the platform may be a social media platform. By viewing the image on a display on their mobile device, the second individual is able to share the image with a third individual. The third individual may then use an image capture device to capture the image as it displayed on the second individual's mobile device. Upon recognition of the captured image, the third individual's device may grant the third individual access to purchase a consumer product.

In some aspects a user may use a mobile device to capture images, such as through a camera or other image capture means. In some aspects the images may be still images, or the device may be configured to capture videos. In certain embodiments the user may use a mobile device to capture images of the surrounding environment. The mobile device may also have a user interface including a display. In some aspects the user interface and camera may be configured to simultaneously display what the camera is recording on the user interface.

In some embodiments the mobile device may include augmented reality programs. In these embodiments a user may use the camera on their mobile device to capture images in their environment. The captured images may be simultaneously outputted on the user interface display. In some aspects the mobile device may be configured to recognize target images when captured by the mobile device camera. Upon recognition of these target images, the mobile device may communicate through a network with a system database and confirm recognition of the target image. The device may then receive instructions from the system database upon confirmation of the target image.

In different embodiments the instructions may instruct the mobile device through the augmented reality program to overlay a three-dimensional projection on top of the target image being displayed on the user interface. In certain aspects this projection may be a consumer product. The projection may represent a consumer product available for the user to purchase. In some aspects the user interface may allow the user to interact with the projected product. This interaction may include a user input such as a button or the user interface may be touch-screen and allow the user to click on the projected product by touching it. After interacting with the projected product the mobile device may grant the user access to purchase the projected product.

In some examples the system may offer other outcomes upon capturing and recognizing the target image. For example, in some aspects the user may capture an image through a camera, and after recognizing the image as containing a target, the mobile device may change the outputted display in response to recognizing the target image. As examples, the display may continue to output what is being captured by the camera, but may change the outputted display based on recognition of additional targets. In some aspects, the device may recognize a type of product, a brand logo, numbers, designs, letters, or any other target and replace that target on the outputted display. As an example, the user may be in a store, and using the camera to capture the inside of a store. The mobile device may be configured to recognize a particular logo on a product, and then output on the display the images captured by the camera but replace the recognized logos on the display with an image or message for the user.

In certain aspects users may share images through social media platforms. Individuals may then see the images on the social media through displays on their mobile device. An individual who sees the image may share it with a friend, who may look at it through an image capturing device having augmented reality capabilities. Upon recognizing the image, the software may display a three-dimensional product of a consumer product overlaid on the image. This would indicate that the user capturing the image has been granted access to purchase the consumer product shown. In this aspect the user may then choose to search for the image on their social media accounts and share it with their friends, who may use a mobile device with augmented reality capabilities to capture the image and gain access to purchase the product as well.

In some embodiments, a first individual may share an image through social media, where that image includes target information that unlocks access for purchasing consumer products. A second individual may view that image on a mobile device having a display. A third individual may capture that image on a mobile device having image capturing capabilities, where through capturing the image the device recognizes that image and unlocks access for the third individual to purchase a consumer product. In some aspects the system may recognize that the image has been shared and/or captured from another mobile device. In these aspects, the access may be limited to capture from another individual's phone, or from a certain social media application. The number of users who are granted to access to the product may be limited, such that only a certain number of user are granted access before the product is sold out. The system may limit the number of times an image can be shared and still unlock access to the product.

In some embodiments the target image may be shared through social media. Individuals may view the target image through social media accounts. Individuals who view the target image may share the images with friends, who may then capture the image using a camera on a mobile device. The camera may recognize the target image through an augmented reality program, and upon recognizing the target image receive instructions from a system database. These instructions may include overlaying a consumer product projection onto a user interface on the user's device, and unlocking access to the user to purchase the consumer product.

In some aspects the camera may only recognize the target image when it is displayed on another device's screen. In these aspects, access the consumer product will not be unlocked unless the target image is captured from another user's screen. In these examples individuals are encouraged to share the target image with each other. One user may bring the target image up on their mobile device so that another user may capture it and unlock the consumer product. The second user may open the target image on their mobile device so the first user may capture and unlock the consumer product.

In example embodiments, a user's computing device (which may be mobile, stationary, and/or located in a commercial or private setting) may comprise one or more non-transitory computer-readable mediums that comprise computer-executable instructions that when executed by a processor, cause the device to capture an image of a second mobile device, and upon capturing that image recognizing that image as an instruction. The mobile device may then communicate through a network with an external system. Upon verifying the captured image, the system may unlock the mobile device access to purchase a consumer product.

Granting access to consumer products through augmented reality encourages users to share images and be on the hunt for targets in nearly any image. For example, if a user knows that a certain influencer, such as a famous athlete, is releasing a product or endorses a product, that user may scan the athlete's social media accounts to see if any images shared by the athlete have a target that would unlock access to purchase the products. In different aspects this may be footwear, jerseys, apparel, sports equipment, or any other consumer product. It also encourages users to share images among their friends, in the hope that they're able to find target images and capture them using each other mobile device, such as smartphones.

In some embodiments product launches may be rolled out through social media. In these aspects, a product may be announced, but it there is not an announcement about when the product will be released. Rather, an image containing the target information that will unlock access to purchase the product may be given to an influencer, such as an athlete, chef, social media personality, business person, celebrity, etc. The augmented reality program may then be configured to recognize the target image when it is captured using a mobile device. The influencer may then share the product on social media. In some aspects the influencer may not announce that the image contains target data. Rather, consumers are encouraged to look at images using the augmented reality program to find images with target information. After discovering that an image contains target information that will unlock access to a new product or perform some other function, the user is encouraged to share the image with their friends, including through social media. In these aspects, the image will be shared organically through word of mouth as individuals discover that the image has unlock capabilities and share the image.

In some aspects the augmented reality program will be utilized to work on mobile devices, including smartphones, such as an Apple iPhone or an Android phone, tablets, laptops, computers, gaming systems, music players, e-readers, or any other mobile electronic device capable of capturing images.

Figure 11:
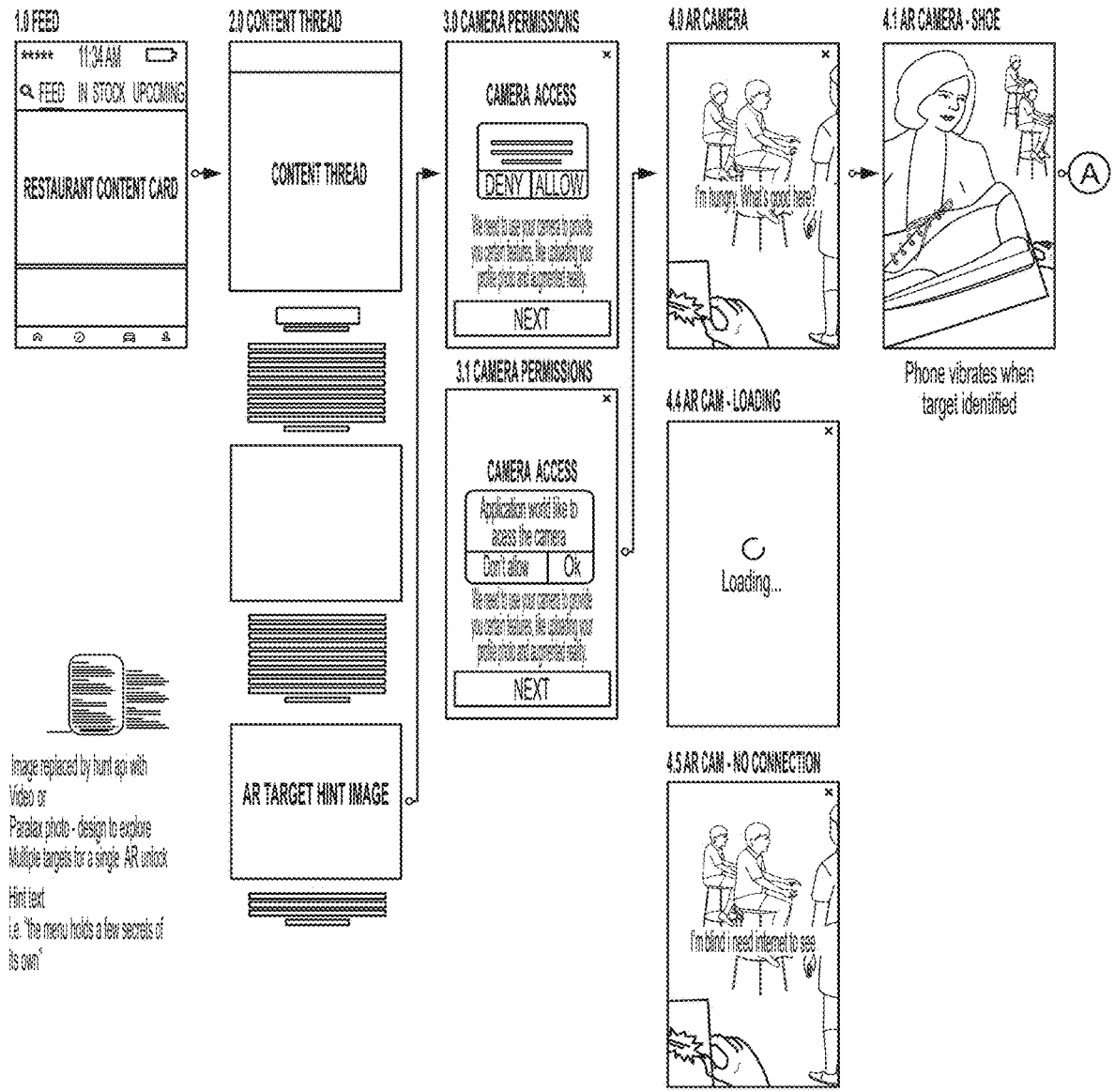
FIG. 11 illustrates another flowchart showing examples of performing steps disclosed in the present disclosure, including the displays associated with the mobile devices.
Figure 11:
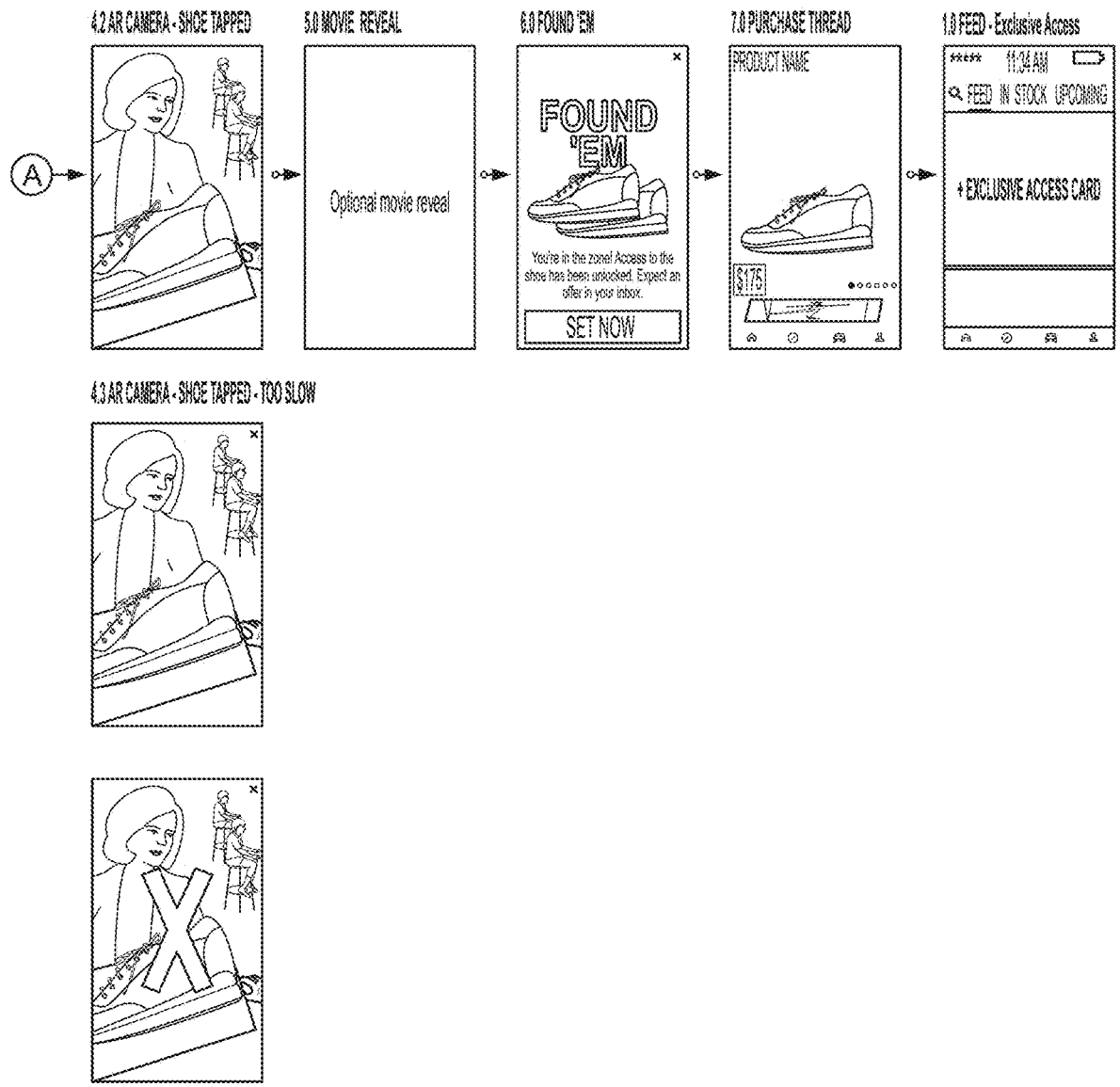
Figure 12:
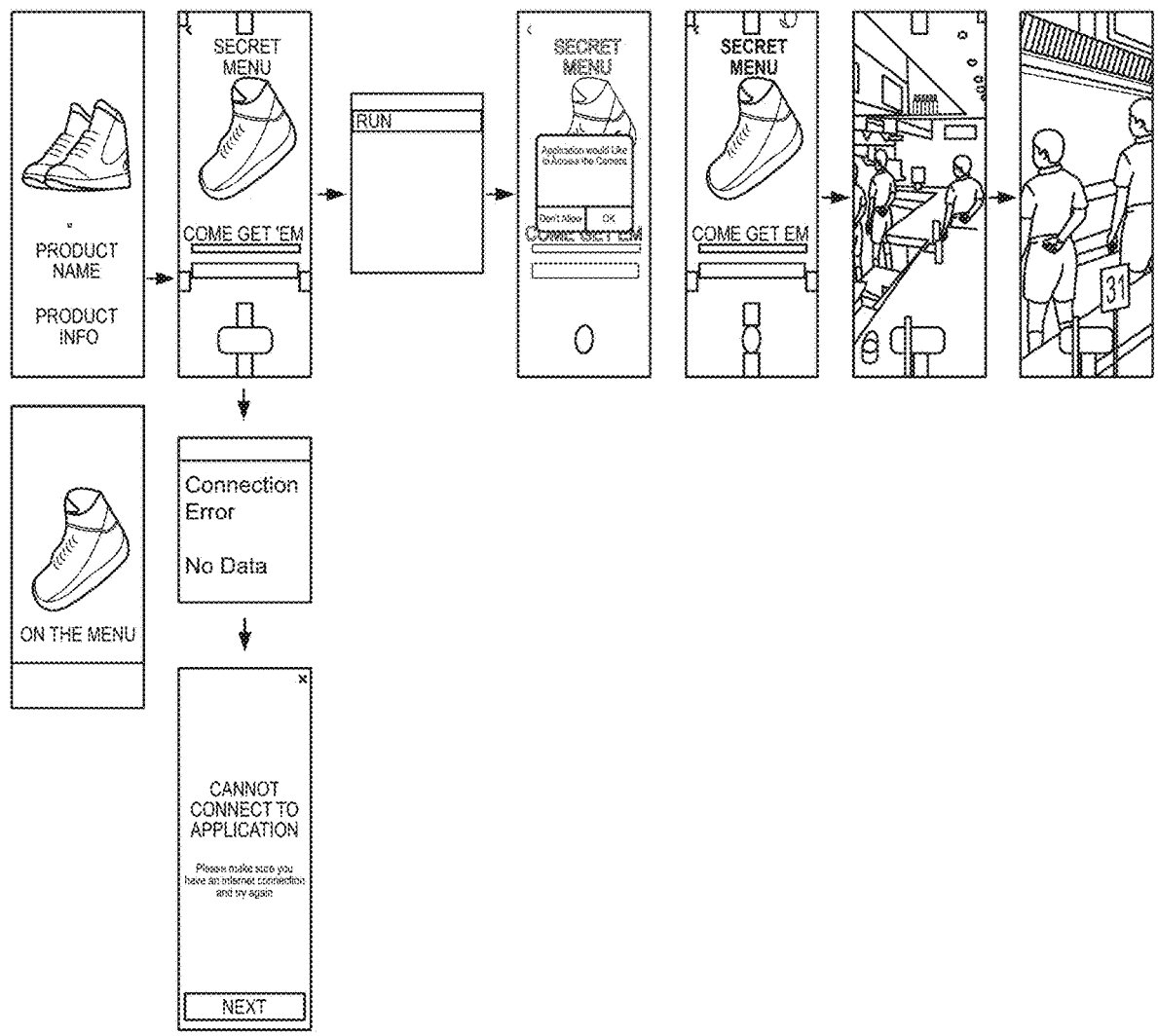
FIG. 12 illustrates an example of the displays that may be utilized by the augmented reality program.
Figure 12:
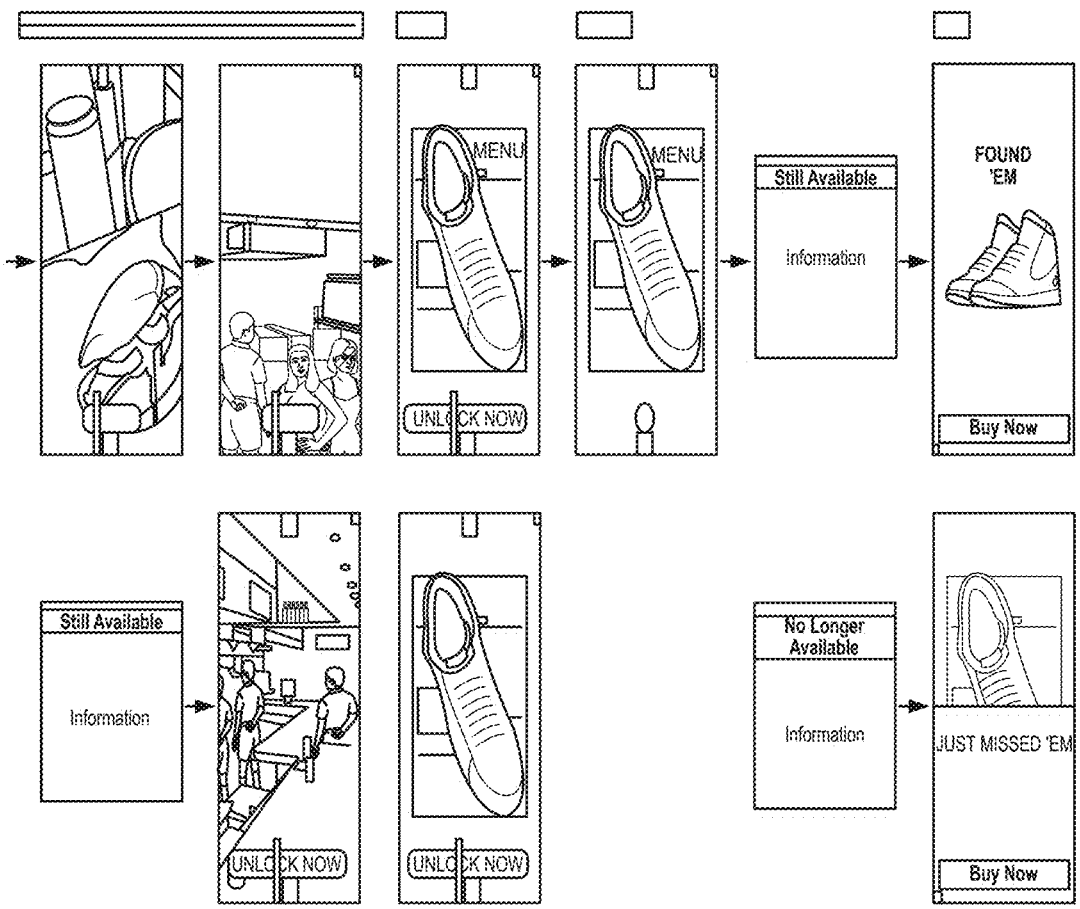

In certain aspects the target image may be a tangible item. As an example, the target image may be a restaurant menu. The augmented reality program may then be configured to recognize when the restaurant menu is captured by the mobile device, and unlock access to purchase a consumer product. In some aspects the mobile device may overlay a projected image on the display as it is capturing the target image. As shown in FIGS. 11 and 12, this projected image may be a shoe that will be unlocked for the user to purchase. Upon discovering that a tangible item is a target image recognized by the augmented reality program, a user may capture and share an image of the tangible item, including with their friends and through social media platforms. Other users who view the image may than capture the image using augmented reality programs on their mobile devices to unlock access to purchase the consumer item or receive whatever other output the mobile device is configured to perform upon capturing and recognizing the target image.

Through these features, users are encouraged to share target images upon discovering them. For example, if a target image is a menu for a restaurant with limited locations, consumers who do not visit one of the restaurant locations would be unable to capture the menu using augmented reality programs. As such, consumers would otherwise be denied access to purchase consumer products that are unlocked through capturing that menu. However, by encouraging users to share images of the target, users may unlock access to these products without viewing a tangible item that is the target image in real life.

Certain embodiments may also include features to encourage users to share target images with their friends and through social media. For example, users may be granted further access to specific products based on sharing target images a number of times, or having other individuals capture target images they have shared. As other examples, users may be granted sales offers, store credit, consumer products, reward points, or social media rewards.

In some aspects the user interface on the mobile device may include a user input option. When the target image is captured and recognized by the augmented reality program, the user interface display may prompt the user to provide an input to unlock the product. In some aspects after unlocking the product the mobile device may connect to an online store, whereby the user may purchase the unlocked product.

In different embodiments after unlocking and purchasing the product, the user may be encouraged to share information about their purchase, such as through social media. In some examples this may be a predetermined message that states which product the user purchased, and/or where the user found the target image. By sharing this information, the user may instruct other users to seek out the target image. In the example of a restaurant menu, the user's message that they purchased a product that they unlocked through capturing a target image that was a menu, other users interested in unlocking and purchasing the product are encouraged to visit the restaurant or view the menu through other means, such as online or social media. In different examples the user's message about purchasing a product may be shared through social media such as Instagram, Twitter, Facebook, Google+, or any other social media platform.

Further aspects of this disclosure may include communication between the personal device back to the system database. Upon unlocking access to a consumer product and/or finalizing the purchase of that product, the mobile device may communicate information to other mobile devices or to the system database. In some aspects this information may include demographic information about the user, information about the purchase, such as size, color, geographic location of the user, or any other information relating to the user or the purchase. This information may be shared with the seller of the product who may maintain an information database comprising information about the products and users that have successfully unlocked and purchased products through the augmented reality programs.

Aspects discussed in the present disclosure encourage collaboration between sellers and influencers. Influencers may be athletes, chefs, social media personalities, business people, celebrities, etc., that are looking to increase their personal brand, including through social media. As such, influencers who are known for releasing target images that unlock high-demand product are going to increase their followers and social interaction with fans and the public. Relatedly, sellers are able to spread their products, messages, and awareness more organically through influencer releasing target images.

Virtual Object Searching with Augmented Reality

The systems and methods described herein may further be used in connection with a system and method for hunting or searching for target in the form of a virtual object in a geographical space, which may also be known as geocaching. This system and method may use augmented reality as described herein, and may offer rewards for locating the object, which may vary or depend on the time taken to locate the object. The primary user or searcher physically travels to the location of the virtual object, assisted by GPS data and optionally, augmented reality (AR) and/or assistance from secondary users. FIGS. 13-30 illustrate exemplary embodiments of systems and methods for searching for a virtual object, and it is understood that these embodiments may be used in conjunction with any systems, architecture, methods, and/or features described herein and shown in FIGS. 1-12.

The virtual object may take nearly any desired form, and in one embodiment, may be a depiction of or related to the reward offered, such as a product related to the reward. The virtual object may be a target image as described herein. The virtual object may be located at the same or proximate location of a real object (e.g., landmark, statue, etc.) and may be related to the real object in one embodiment. The reward offered may be tied to the location of the virtual object, such that all users searching for that reward in the same area will be given the same location for the virtual object. The location of the virtual object may not be related to the reward in other embodiments, and may be unique to each search session, such as the location being assigned randomly or based on information about the users. For example, the location of the object may be based on preferences of one or more users, e.g., favorite locations, activities, products, colors, etc., or based on the locations of the user(s). In another embodiment, the target may not be a virtual object, and may be an actual object that the user may image capture or a specific geographic location that the user may need to reach, and augmented reality features may be used in locating and/or activating targets that are not in the form of virtual objects.

Completion of the search and locating the virtual object may result in rewards being made available to some or all users involved in the search. In one embodiment, the reward may be an unlocked ability, such as the ability to purchase a specific product, which may be a newly released or limited availability product. In other embodiment, the reward may be a real or virtual gift, such as a product, currency, credits, profile status changes, etc. The reward provided to each user teammate may be the same in one embodiment, or may vary based on different characteristics, such as user selection or preferences, team contribution, or other information.

Figure 13:
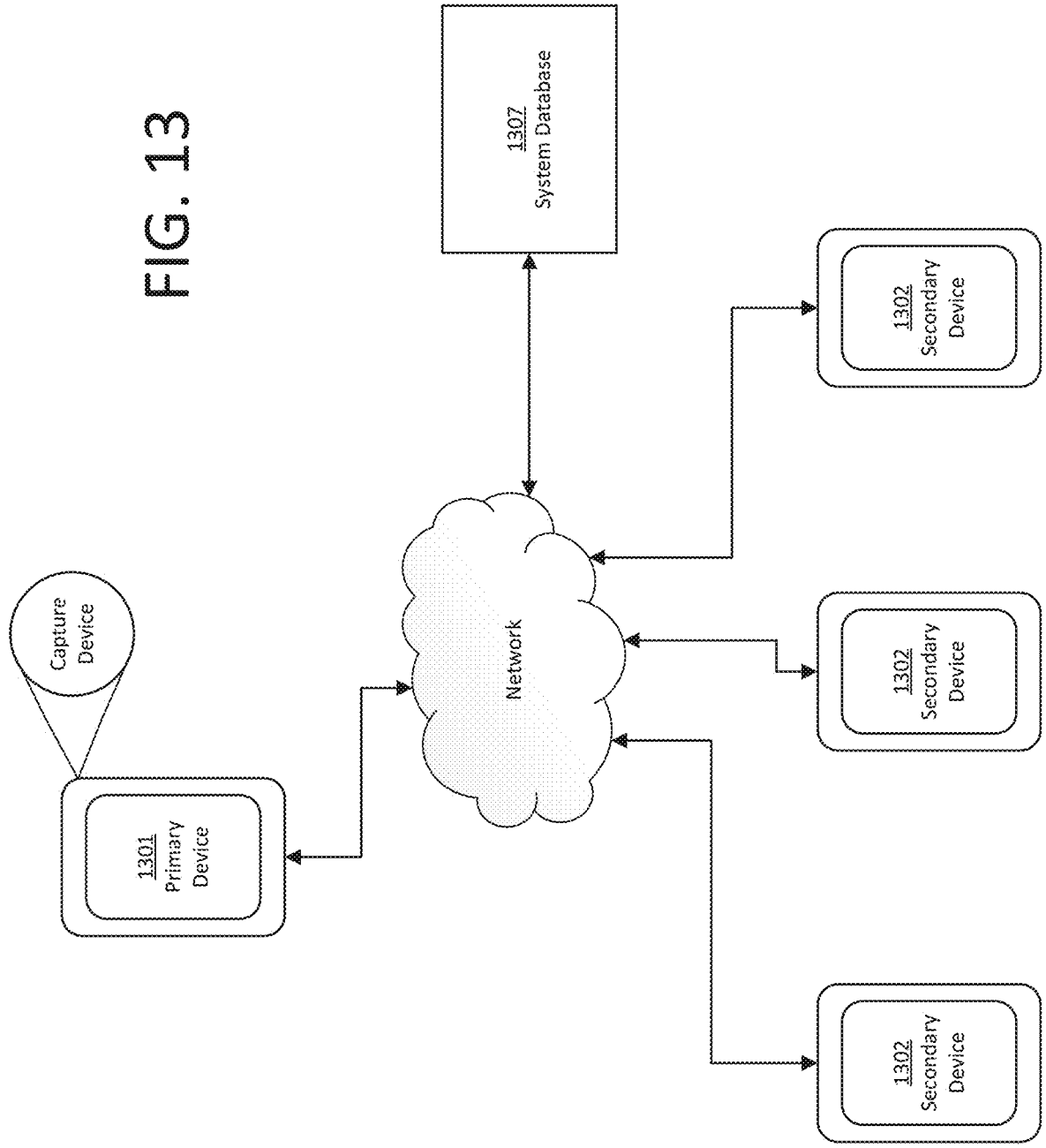
FIG. 13 illustrates an example of a system for team-based virtual searching using augmented reality in accordance with example embodiments.

FIG. 13 illustrates one embodiment of a system 1300 in which a primary user or "searcher" having a primary device 1301 cooperates in the search with one or more remote secondary users or "squad mates" each having a secondary device 1302. The primary user in this embodiment physically searches for the virtual object or other target in the geographical space by moving his/her location to the location of the virtual object. The secondary users can assist the primary user in the search by various techniques, as described in greater detail herein. The devices 1301, 1302, the Network, and the system database 1307 in this embodiment may utilize any of the components and features of devices, networks, and servers/databases described herein. For example, in one embodiment, the primary device 1301 may include at least a processor, a memory, a display, a capture device (e.g., a camera), a GPS sensor, a transceiver, and one or more I/O devices, as well as associated software to support the same. As another example, in one embodiment, each secondary device 1302 may include at least a processor, a memory, a display, a transceiver, and one or more I/O devices, as well as associated software to support the same. As a further example, various computer processing (analysis, determination, etc.) described herein may be conducted at the devices 1301, 1302, at the system database 1307 (which may be part of a server 111), or at other devices in communication with the devices 1301, 1302 and/or the system database 1307 or server 111. It is understood that the processor 202 of each computer device may be used for such processing, and that exchange of information may be performed by transmitting and receiving from such devices.

Figure 14:
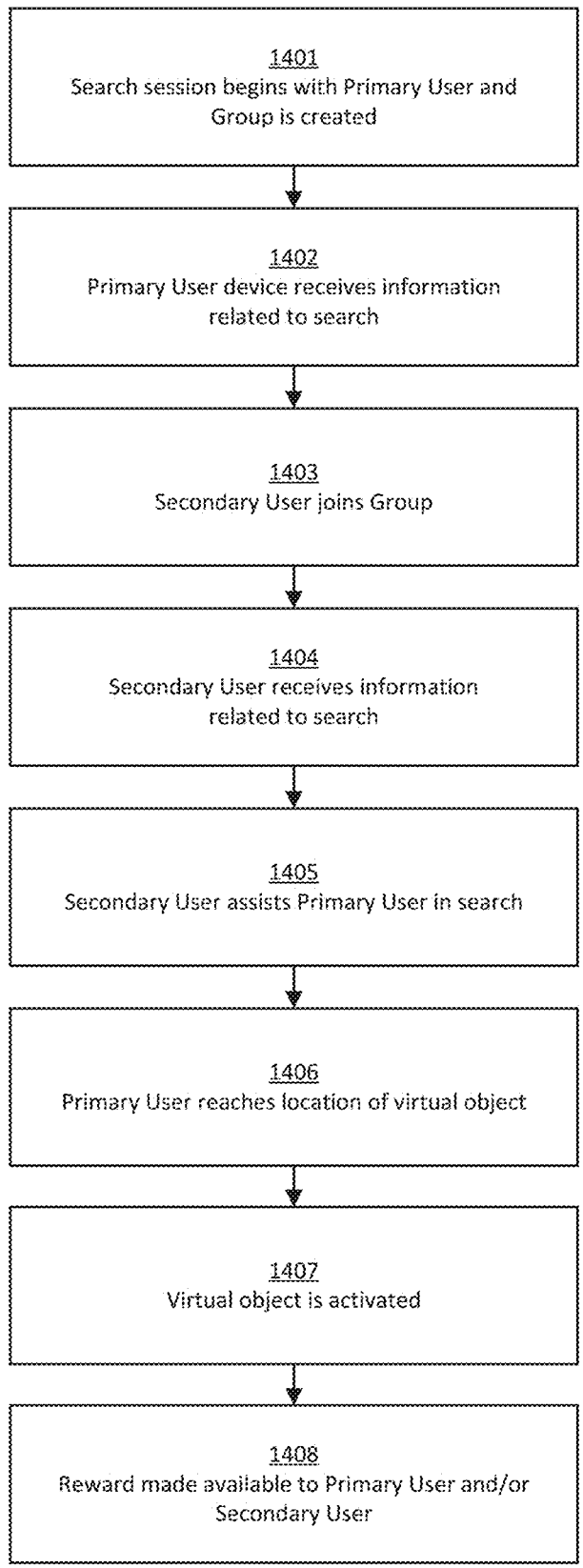
FIG. 14 illustrates a method of virtual searching using augmented reality using the system of FIG. 13, in accordance with example embodiments.
Figure 15:
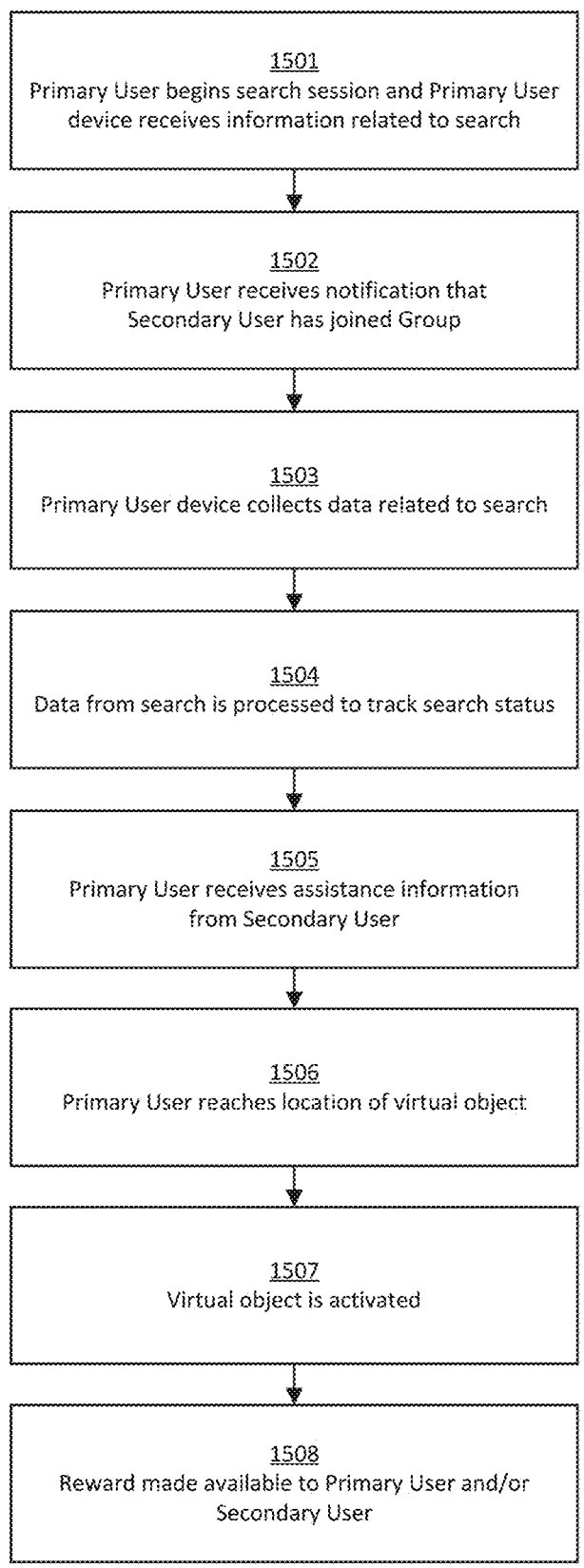
FIG. 15 illustrates a method of virtual searching using augmented reality using the system of FIG. 13 from the perspective of the primary user device, in accordance with example embodiments.
Figure 16:
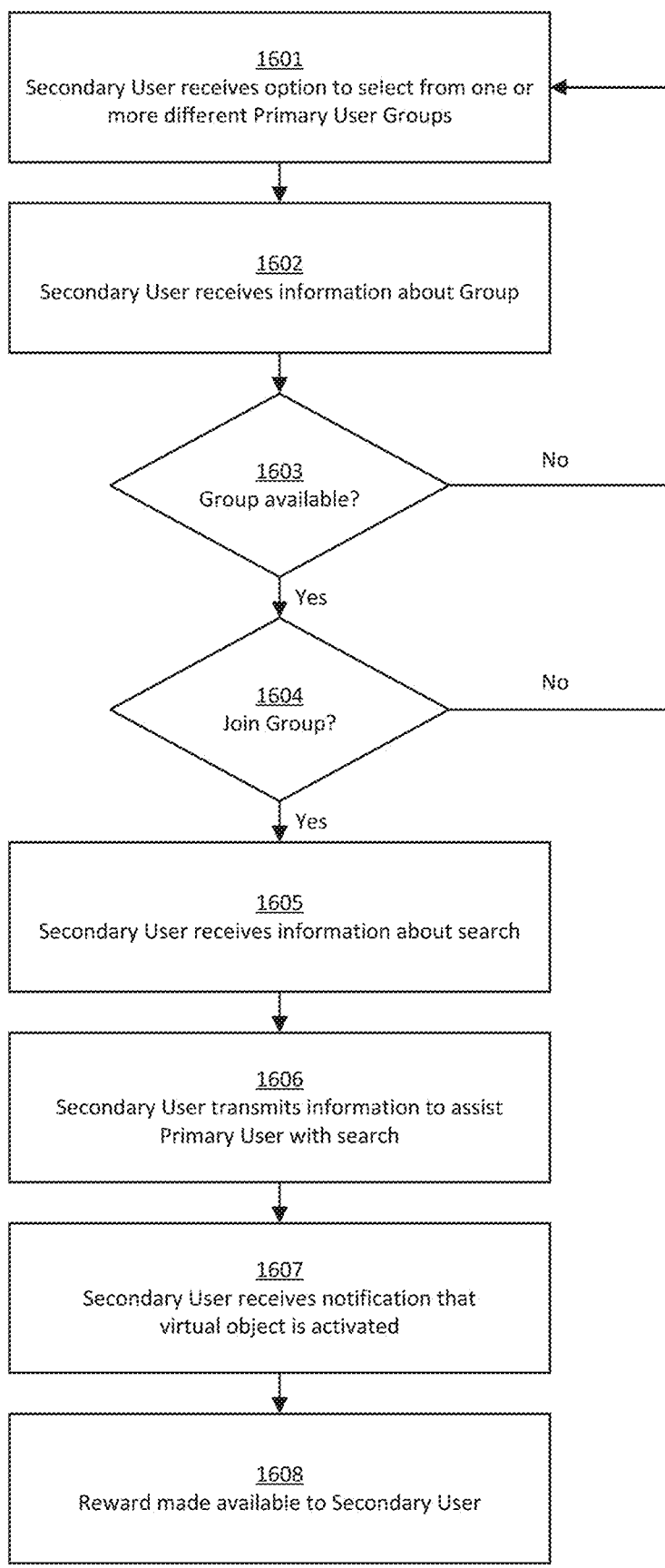
FIG. 16 illustrates a method of virtual searching using augmented reality using the system of FIG. 13 from the perspective of the secondary user device, in accordance with example embodiments.
Figure 17A:
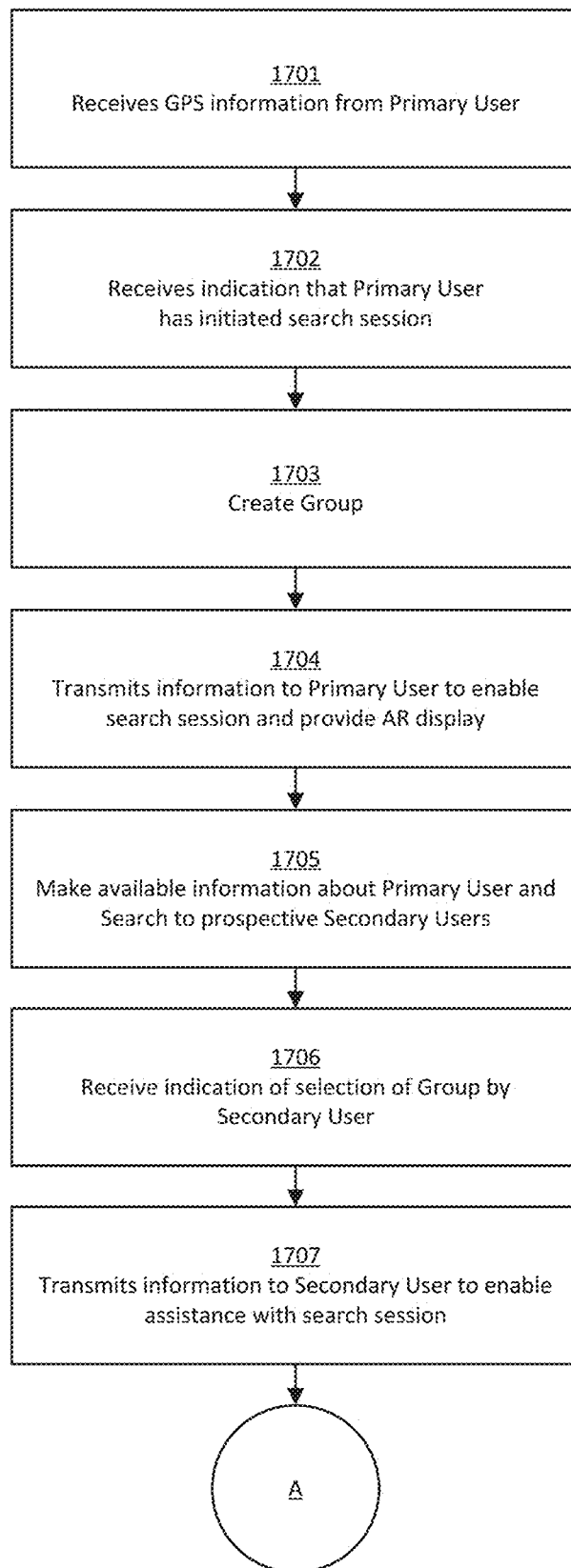
FIGS. 17A-B illustrate a method of virtual searching using augmented reality using the system of FIG. 13 from the perspective of an device such as a server, in accordance with example embodiments.
Figure 17B:
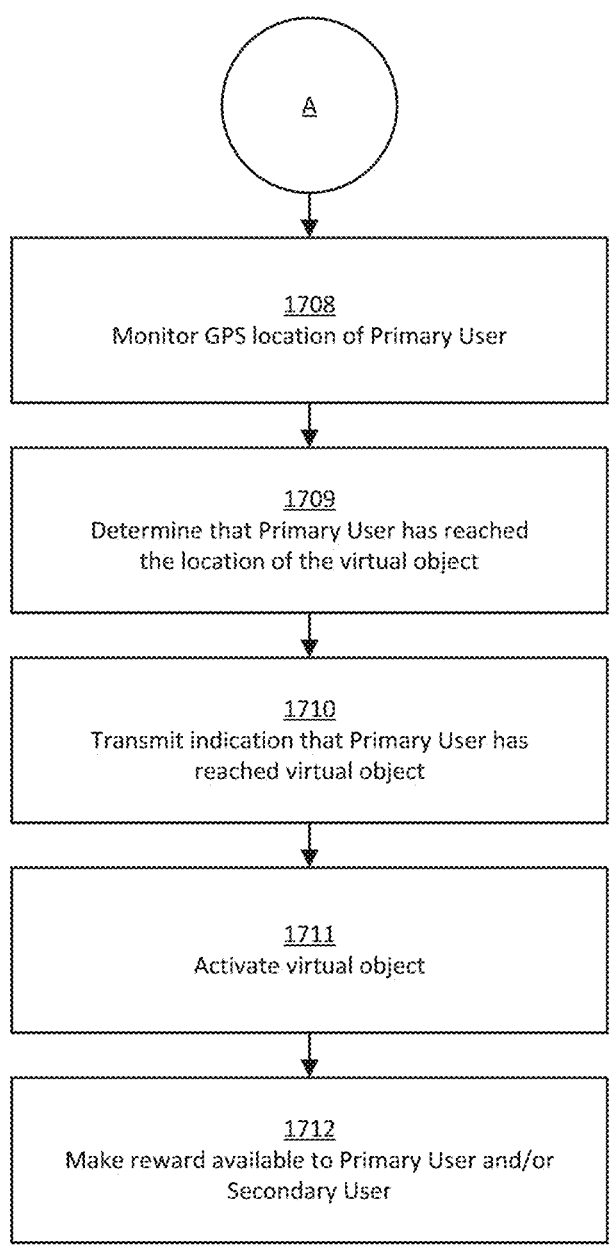
Figure 18A:
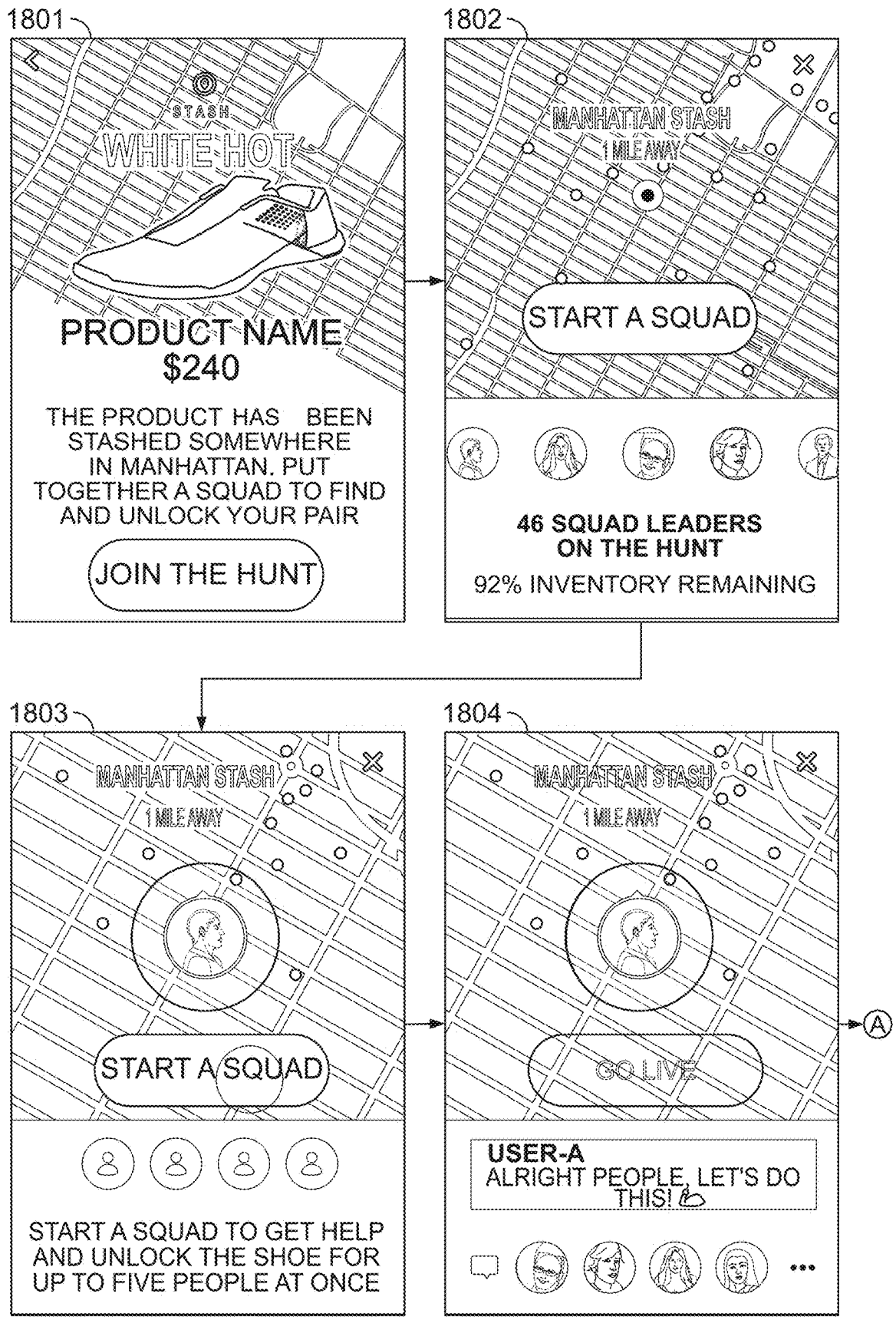
FIGS. 18A-C illustrate an example interface and user selection progression from the primary device in a method of virtual searching using augmented reality, in accordance with example embodiments.
Figure 18B:
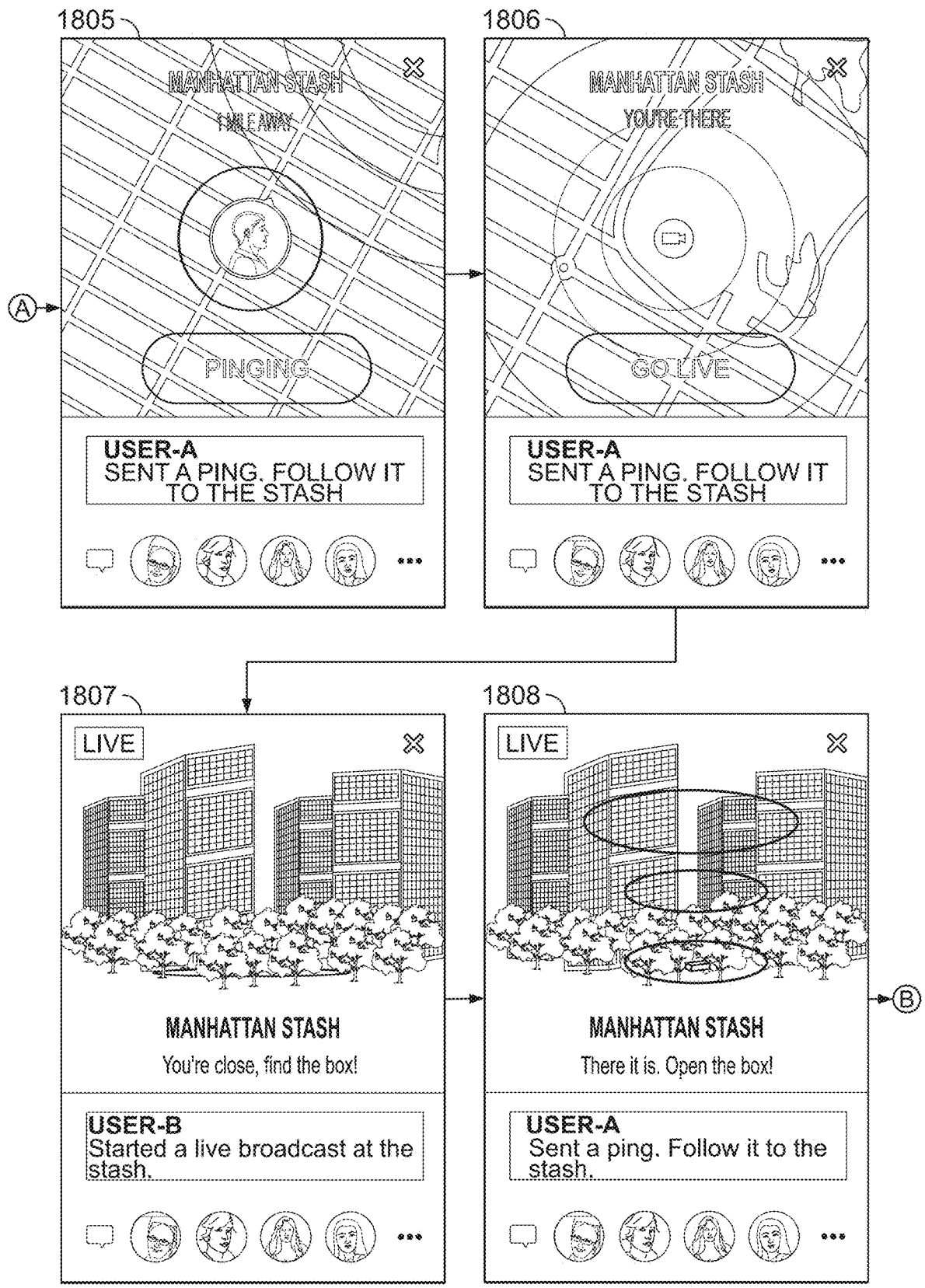
Figure 18C:
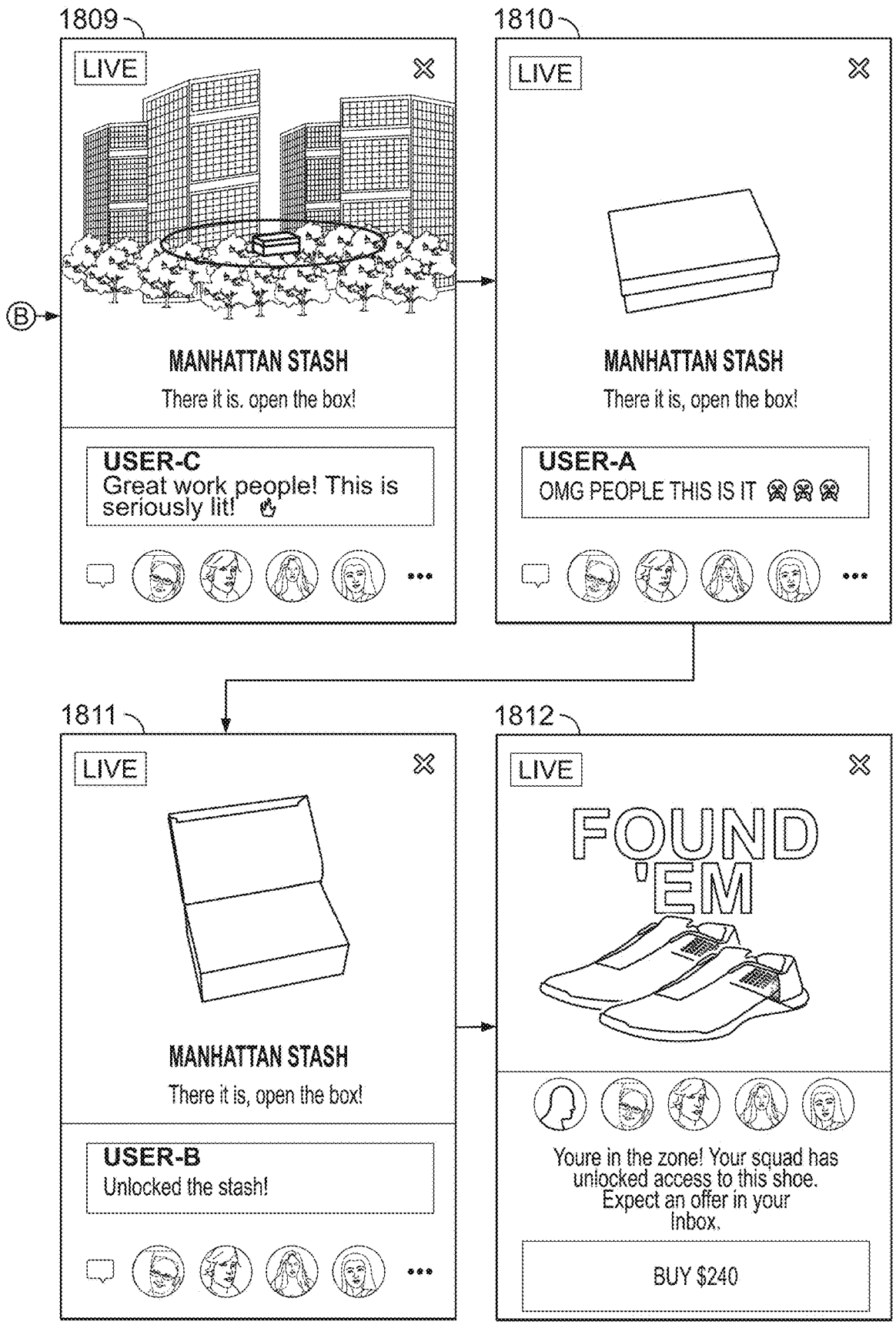
Figure 19:
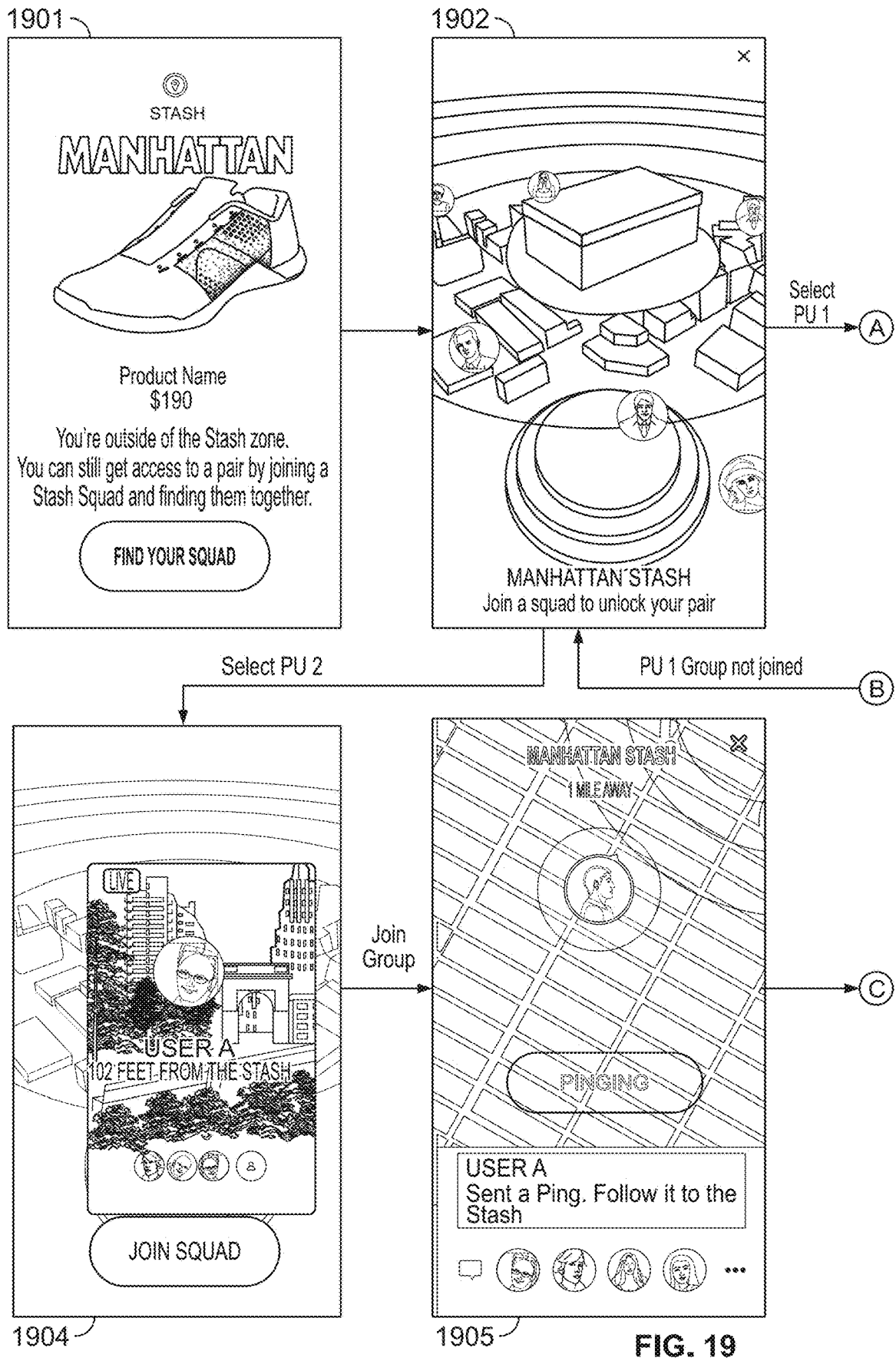
FIG. 19 illustrates an example interface and user selection progression from the secondary device in a method of virtual searching using augmented reality, in accordance with example embodiments.
Figure 19:
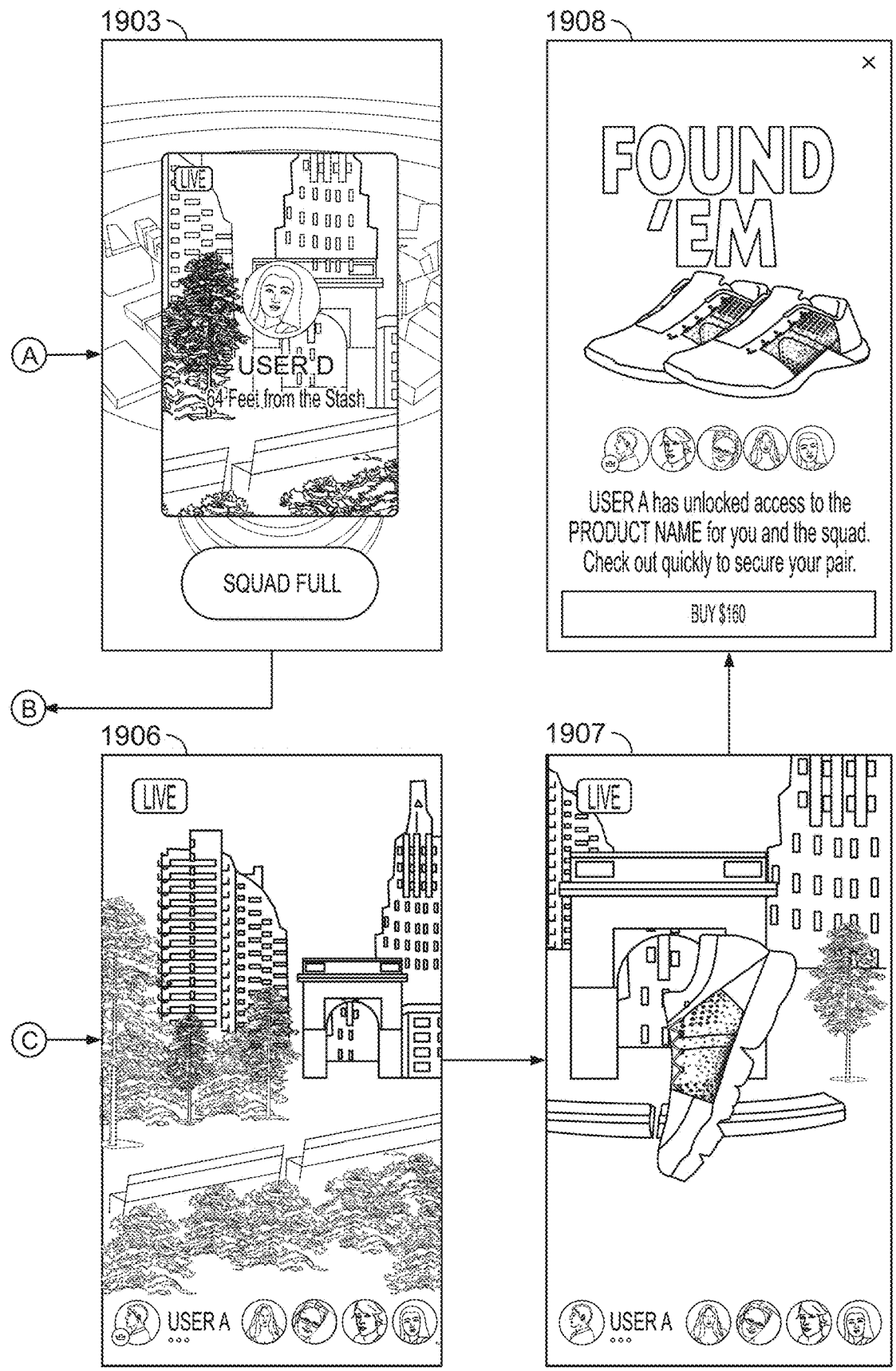

FIG. 14 illustrates one general embodiment of a method for searching for a virtual object using the system 1300 of FIG. 13. FIG. 15 illustrates one embodiment of this method from the perspective of the primary device 1301, and FIG. 18 illustrates an example interface and user selection progression from the primary device 1301. FIG. 16 illustrates one embodiment of this method from the perspective of the secondary device 1302, and FIG. 19 illustrates an example interface and user selection progression from the secondary device 1302. FIG. 19 illustrates one embodiment of this method from the perspective of the server or system database 1307.

In the embodiment of FIG. 14, the search session begins, for example with the primary user device 1301 initiating the session, and the searching group or team is created, at 1401. In one embodiment, the primary device 1301 may be near the geographical location of the object before the session is initiated or before the group is available for other users to join. For example, geographical restrictions may be placed on the primary user, such as minimum distance from the object location or presence within a select city or area of the city. Initiation of a session may also require selection of the virtual object and/or the reward for location of the object (e.g., selection of a product purchase to unlock), as multiple different searches may be made available with multiple different objects, locations, time limits, and rewards. Item 1801 in FIG. 18 illustrates an example of a screen for selection of a specific search, and items 1802 and 1803 illustrate examples of screens for initiating the session. The primary device 1301 receives and/or displays additional information related to the search (e.g., primary device 1301 GPS location, GPS location information for virtual object, proximity data, etc.), at 1402. Items 1802-1804 illustrate the screen displaying GPS location for the primary device 1301, as well as a map of the city and locations of other primary users, which can be zoomed in or out as desired.

One or more secondary users can join the group, using secondary devices 1302, at remote locations, at 1403. The primary device 1301 may receive a notification that the secondary user(s) have joined the group, such as by graphical depiction of the avatar(s) of the secondary user(s) as shown in item 1804 in FIG. 18. Each secondary device 1302 may receive and/or display information related to the search, before and/or after joining the group, at 1404, and the information may be different from the information received and/or displayed by the primary device 1301. Information that is valuable to the secondary user prior to joining the group may include nature of the reward, identity of the primary user, or status of the search (e.g., progress, proximity to object, or time remaining). After joining the group, the secondary user(s) can then assist the primary user in the search at 1405, offering various types of assistance as described herein. Once the primary user reaches the location of the virtual object, at 1406, the virtual object can be activated, at 1407. Activation of the virtual object may be automatic or may require actions on the part of the users, as described herein. Once the virtual object is activated, rewards may be made available to the users, at 1408, thereby completing the search session.

In one embodiment, the search may be provided in multiple segments, having sequential "checkpoints," eventually leading to the location of the virtual object. In one embodiment, reaching one checkpoint unlocks the location of the next sequential checkpoint and/or information about the next checkpoint, such that the checkpoints must be done in order. In another embodiment, the checkpoints can be reached in any order, but all checkpoints (or a minimum number of checkpoints) must be reached before the virtual object is located or activated. Reaching all checkpoints may unlock the location and/or information about the location of the virtual object. The secondary users may assist in finding the checkpoints, and in one embodiment, each checkpoint may rely on assistance from a different secondary user, e.g., clues provided exclusively to that user or information related to that user. Additionally, the checkpoints may be related to the secondary users, such as based on user preferences or characteristics.

Image Capture and Sharing

The primary user may have the ability to provide image capture to the secondary users during the search, and such image capture may be necessary to locating and/or activating the object in one embodiment. This ability may be selectable on the primary device 1301. The capture device on the primary device 1301 may capture point-of-view video or pictures, which are provided on the display of the primary device 1301 and/or the display of each secondary device 1302 for viewing by the secondary users. The primary device 1301 may also be configured to provide other images, such as "selfie" pictures, and the secondary device(s) 1302 may likewise be configured to provide images for viewing by the other devices. The images may be modified with augmented reality, such as showing the virtual object, assistance information, or various other images to assist with searching, entertain the users, and/or otherwise enhance the experience. Additionally, the images displayed on different devices 1301, 1302 may be the same in one embodiment, or may include different augmented reality in another embodiment. The images provided on the secondary devices 1302 may improve the ability of the secondary users to assist the primary user. In one embodiment, the primary device 1301 may only give the option to provide images in proximity to the object location, and in another embodiment, the primary device 1301 is required to provide images when in close proximity to the object location. Location of the object may be performed by depiction of the object in augmented reality on the display of the devices 1301, 1302, and unlocking the object may also require images from the primary device 1302.

Secondary User Assistance

The secondary user can assist the primary user using various techniques, both active and passive. The assistance provided by the secondary user(s) may be in locating the object and/or activating the object once located. As one example, the secondary user may have the ability to "ping" the object, briefly revealing the location to the primary user. Item 1905 in FIG. 19 illustrates the secondary user manually pinging the object, by using a button on the secondary device 1302. Item 1805 in FIG. 18 illustrates the depiction of the ping on the primary device 1301. The ping is depicted as a Doppler ping in FIGS. 18-19, but may be in a different form in another embodiment, such as an arrow or other directional indication, which may vary in precision. Secondary users may have a limited number of pings each and/or a "cooldown" between pings, such that a larger number of secondary users is more effective in locating the object. A final ping may be required to locate the object even when the user is in the vicinity of the object, as shown in item 1808 in FIG. 18. The secondary user may be able to provide different assistance to the primary user, such as text or audio information or directions to the object. For example, the secondary users may be individually and sequentially provided with information regarding the object's location for a limited time period, such that only a single secondary user is providing assistance at one time. As another example, each secondary user may be provided with different information related to the location, which may provide some information regarding the object location, such as clues. The clues may be provided to the secondary users and/or may relate to information about the secondary user, such as location, personal characteristics or preferences, etc. In one embodiment, the secondary user may need to perform an action in order to obtain a clue, such as providing information or answering a quiz question. In another embodiment, the number and/or quality of the clues provided may depend on information related to the reward, such as past product purchases, level of sport or other activity participation, or usage of specific product-related or fitness-related applications. Assistance by secondary users may be compulsory in one embodiment, such that a clue or other assistance must be given by each of the secondary users before the object can be located and/or unlocked.

Passive assistance may be provided in several ways. In one example, the number of the secondary users may affect the quality of the assistance provided. With additional secondary users, the visibility of the object may be improved, the preciseness of "pings" may be improved, and/or the required proximity to activate the object may be decreased. In another example, the characteristics of the secondary users may affect the quality of the assistance provided, or the assistance may be directly related to such characteristics. Secondary user assistance in activating the object is described elsewhere herein.

Group Creation and Assembly

Figure 20:
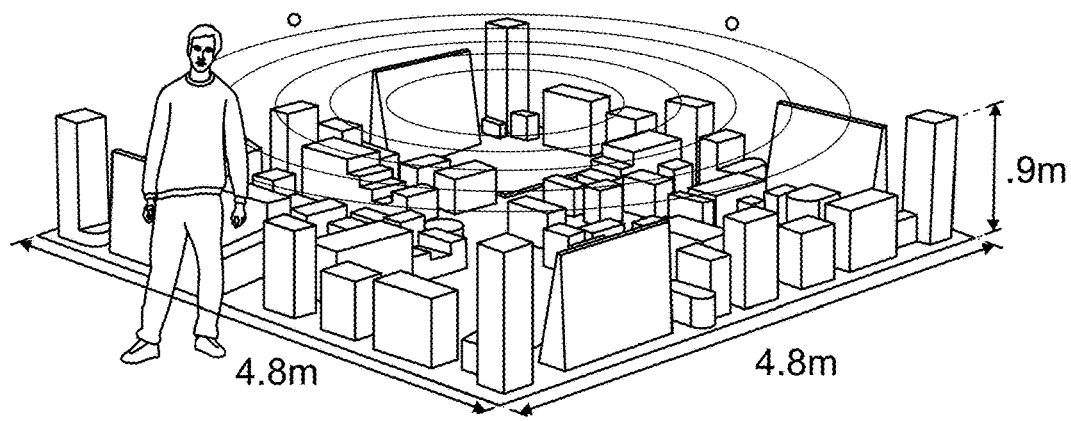
FIGS. 20-26 illustrate virtual depictions of a city in a system and method of virtual searching, in accordance with example embodiments.
Figure 21:
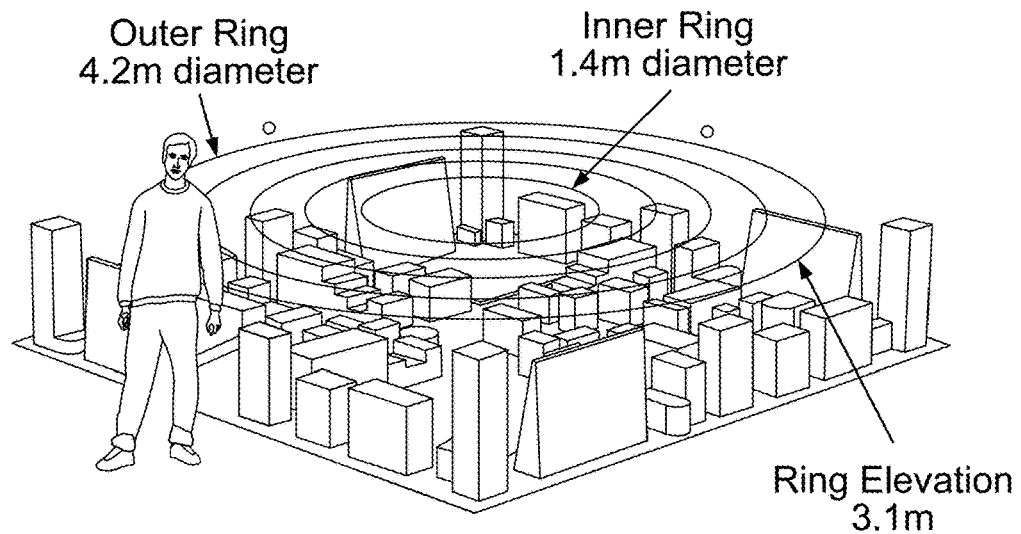
Figure 22:
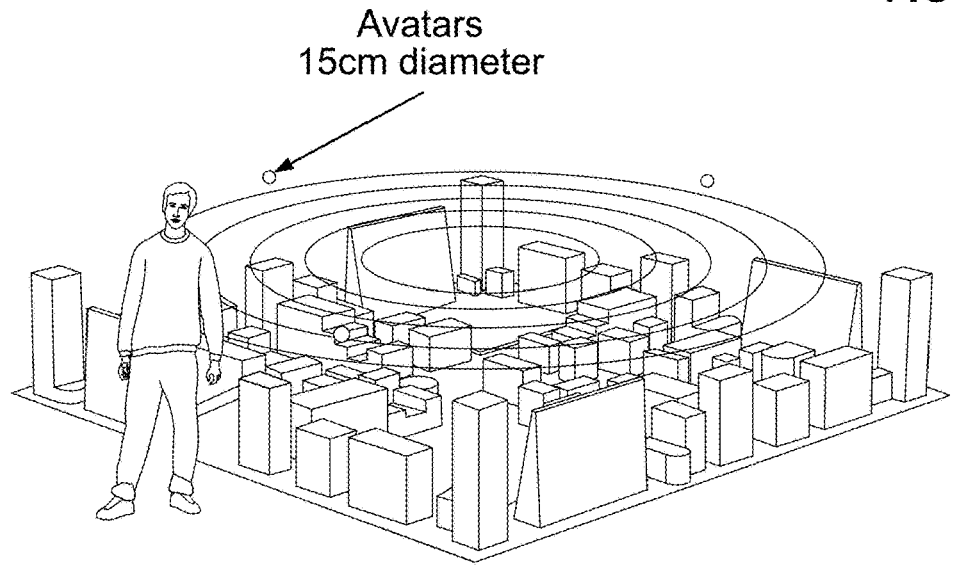
Figure 23:
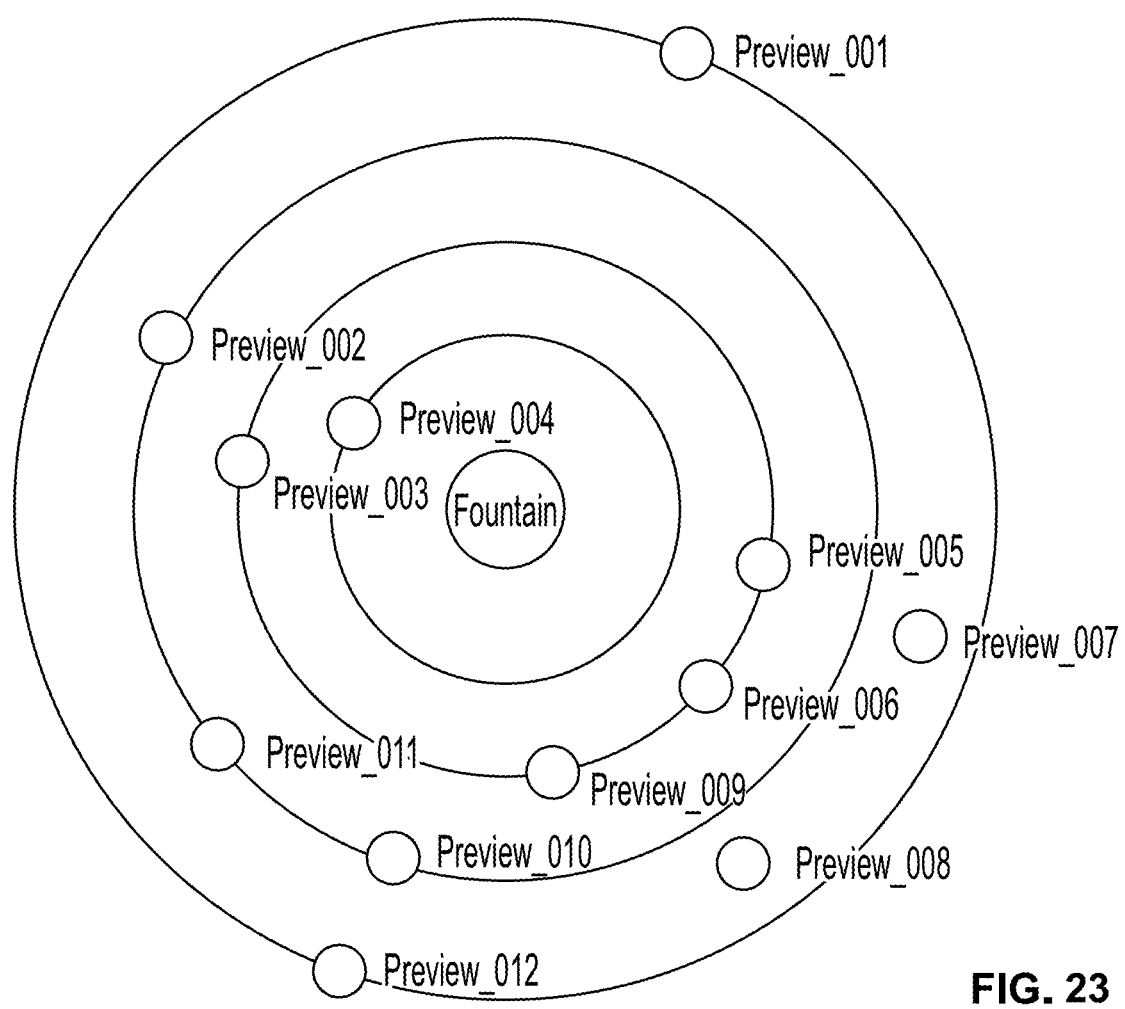
Figure 24:
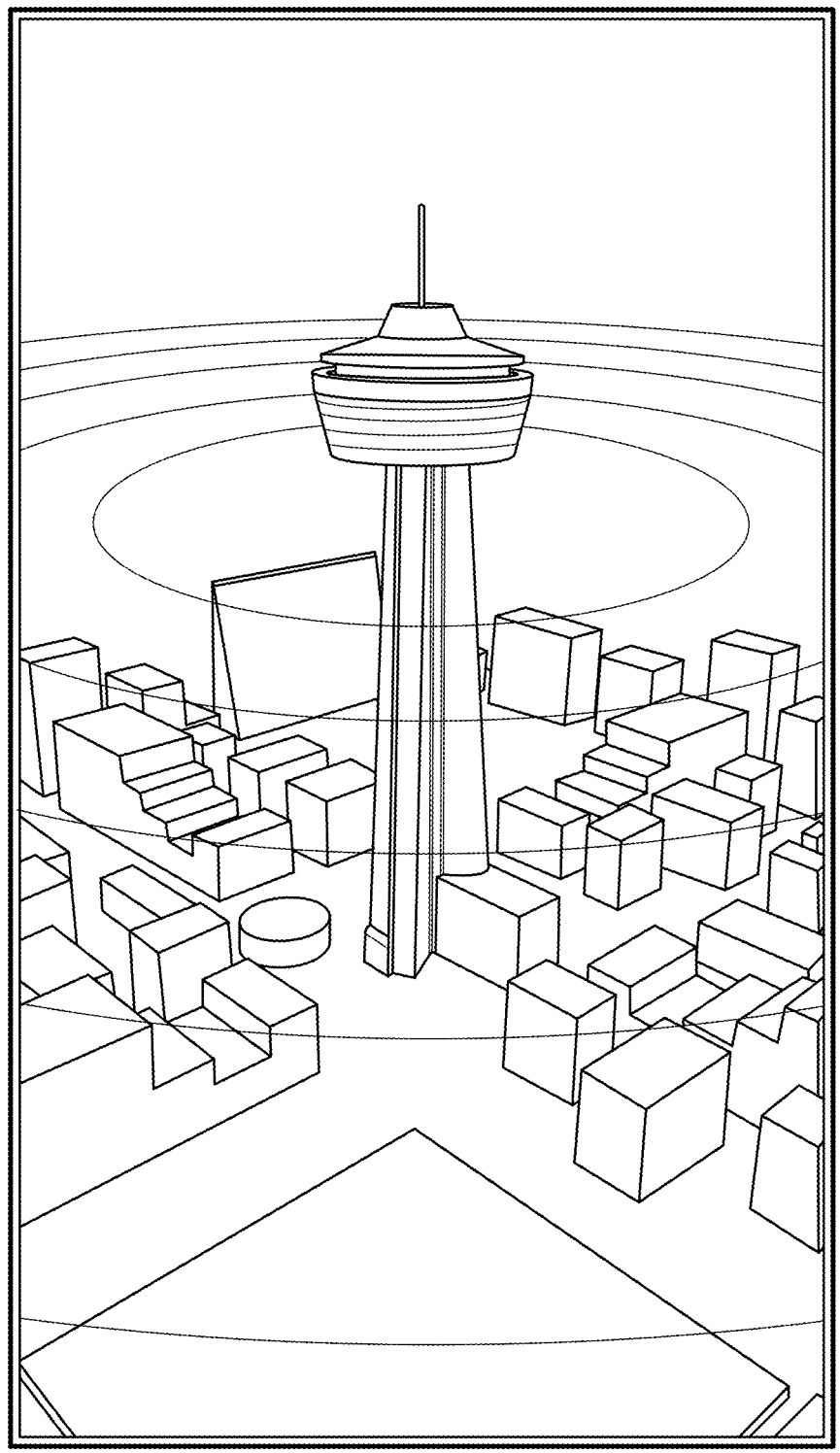
Figure 25:
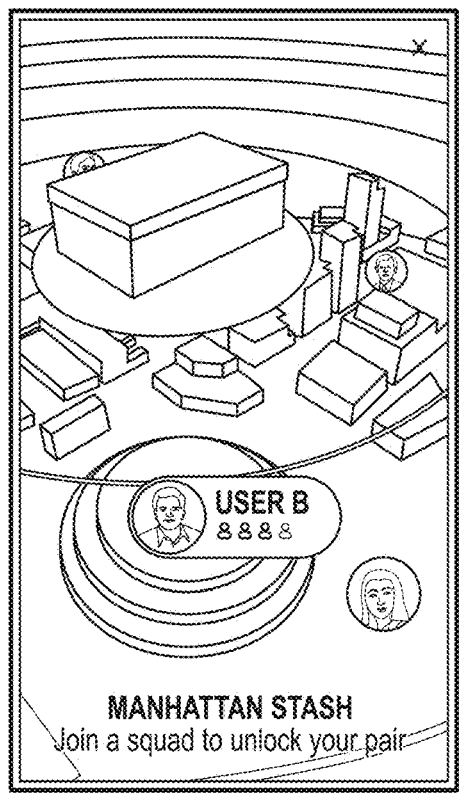
Figure 26:
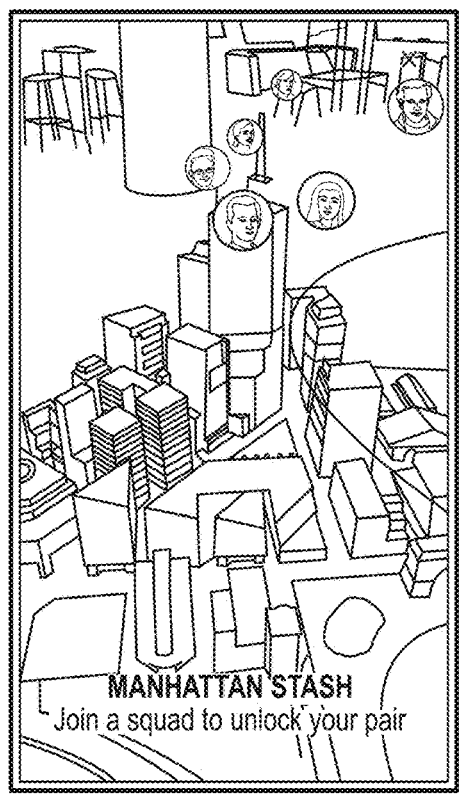

The information provided to the secondary users when selecting a group may illustrate the proximity of each primary user to the object location or, for a multi-segment search, how many segments the primary user has already completed. This information may be enhanced by augmented reality in one embodiment, and these augmented reality images may be provided to the primary device 1301 for use or viewing by the primary user as well. For example, item 1902 in FIG. 19 illustrates a virtual 3-D city, with avatars of different primary users, proximity indicators for determining proximity to the object location, and an image of the object at the object location. The user may view different portions of the virtual city by changing the orientation or perspective of the device 1301, 1302, which changes the virtual display accordingly. Brief information about each user may be obtained by selection, such as shown in FIG. 25, where selection of one primary user illustrates the number of members currently in the group and the number of available group slots. FIGS. 20-22 illustrate another embodiment of a virtual 3-D city that may be provided, with example virtual size dimensions. The augmented reality images may further be made relative to real objects. For example, as shown in FIG. 26, the virtual city may be a virtual reproduction of an actual city, with various architectural and land features depicted. As another example, as shown in FIG. 23, when the object location coincides with the location of a real object (e.g., a fountain in a park), primary user proximity to the fountain is indicated. The augmented reality images may further incorporate other artwork or styling, such as shown in FIG. 25, which depicts the object location with a tower that rises above all other virtual buildings in the area.

In one embodiment, the group is open to any secondary users who wish to join the group until the maximum number is reached, i.e., the group is full. The secondary users may be provided the option to select among a number of different groups, and may be provided information related to the session, such as information regarding the primary user, the primary user's location, the location of the object, details of the reward, the composition of the group, etc. Items 1901-1904 in FIG. 19 illustrate information provided to the secondary user and the process of joining a group. At item 1901, the secondary user is provided with the option for selection of the reward, and at item 1902, the secondary user is provided with an AR depiction of primary users conducting searches for the same reward, including a depiction of a virtual city, the location of the object, and avatars and locations of the primary users. The secondary user may be able to select different primary users and groups to view additional details. For example, at item 1903, the secondary user has selected a primary user who has a full group that cannot be joined, and at item 1904, the secondary user has selected a primary user who has a group with an open slot, allowing the secondary user to join.

In another embodiment, personal relationships may influence group forming, and various social media platforms and networks may be used for this purpose. Integration with such platforms and networks may be used as well. For example, users may be incentivized or required to join groups that include other users on their friend list. As another example, users may be prohibited from joining groups that include others on their friend list, or limits on the number of connected users in a single group may be applied.

In another embodiment, secondary users may be open to select from one or more groups freely, but may be restricted from joining certain groups based on certain criteria, such as characteristics of the secondary user or the primary user, location of the object, nature of the reward, previous participation, etc. In another embodiment, the primary user may be provided some input or authority over which secondary user(s) join the group, such as requiring primary user approval or by selection of the secondary user(s) by the primary user. In this embodiment, information regarding a prospective secondary user would be made available to the primary user. Secondary users already in the group may be provided similar input or authority over joining by additional secondary users. In a further embodiment, secondary users may be automatically assigned to various groups, either randomly or based on various characteristics. Examples of such characteristics include information about the primary user or secondary user as described herein, group makeup and characteristics, status of the search (e.g., progress or distance from the object location), etc. The automatic group assignment may be made with objectives such as group diversity or group strength as also described herein.

In another embodiment, group capacity may change based on various conditions. For example, group capacity may depend on the characteristics of the primary user and/or secondary users already in the group, such as brand loyalty, knowledge, experience, participation, application usage, activity level, etc. As another example, group capacity may increase as the primary user approaches the object location. As a further example, additional group participation may be prevented when the primary user is proximate to the object location, in order to encourage effort and participation in the search by secondary users.

The group matching process may be configured to incentivize a particular group makeup, such as group diversity, group completeness, contributions from all group members, user satisfaction, brand loyalty, and other goals. Incentives may be positive or negative in nature. Group diversity may incorporate geographic diversity (i.e., users from diverse locations throughout the country or world). For example, secondary users in different locations may be provided with different clues for assistance, such that a geographically diverse team will possess more clues. Geographic diversity may be enforced by requirement in another example, such that users from one location are prohibited from joining a group with users from the same location. Group diversity may also incorporate diversity of knowledge and experience. For example, if quiz questions are presented to progress the search, having a team with a diverse knowledge base may improve the ability to answer such questions. As another example, groups may be incentivized or required to include users with both high and low levels of knowledge or experience. Brand loyalty may be incentivized by granting brand-loyal users greater choice in joining groups or granting improved group rewards based on brand loyalty. Group completeness may be incentivized by requiring a certain number of group members in order to locate and/or activate the object or increasing the ease or time limit for doing so with an increased number of group members.

Each user may be provided with a profile that includes information such as location, preferences, participation in sports or other activities, usage of specific product-related or fitness-related applications, personal product inventory (e.g., a listing of all of the shoes owned by the user), areas of specific knowledge or experience, brand-loyal (i.e., "VIP") status, etc. This profile information is made available to other users when forming the group, to enhance group selection and differentiate users. For example, if a diverse team improves the available assistance or ease of object location, users may wish to know the information necessary to form a diverse group. Such profile information may be searchable by other users in forming a group in one embodiment. Various indicators may also be used to convey profile information to other users in one embodiment, for example, "skill points" or other point-based systems, colors or icons to signify particular information such as status, location, knowledge, experience, etc. Such indicators may be icons, colors, highlighting, or other visual indicators.

Scavenger Hunt

In another embodiment, the primary user may be required to take a specific route to the location of the virtual object or other target, which may be accomplished using a "checkpoint" system as described herein, by a GPS guidance system, or other techniques, similar to a scavenger hunt. Additionally, the system may require specific athletic activities to be performed along the route, or along certain segments of the route, such as running, jumping, climbing, or other activities. Specific performance objectives may also be incorporated into such activities, such as maximum times, number of steps or jumps, etc. The system may further be configured such that meeting such performance objectives affects the progress or results of the search, for example, by having performance requirements for locating or activating the object, providing additional (or fewer) clues or opportunities for secondary user assistance, altering the quality of secondary user assistance, increasing or decreasing the reward, etc. Secondary users may be encouraged or required to perform athletic activities as well, which may involve performance objectives. The routes and/or performance objectives may be created based on characteristics of the user, such as profile information regarding skills, capabilities, and experience, past athletic performance data, preferences (e.g., incorporating favorite activities or designing the route to pass by favorite landmarks), and other information. This route customization may make the search process more entertaining or challenging for the user(s) and/or may level the playing field by presenting more difficult routes to more capable or experienced users and less difficult routes to less capable or experienced users.

Figure 52:
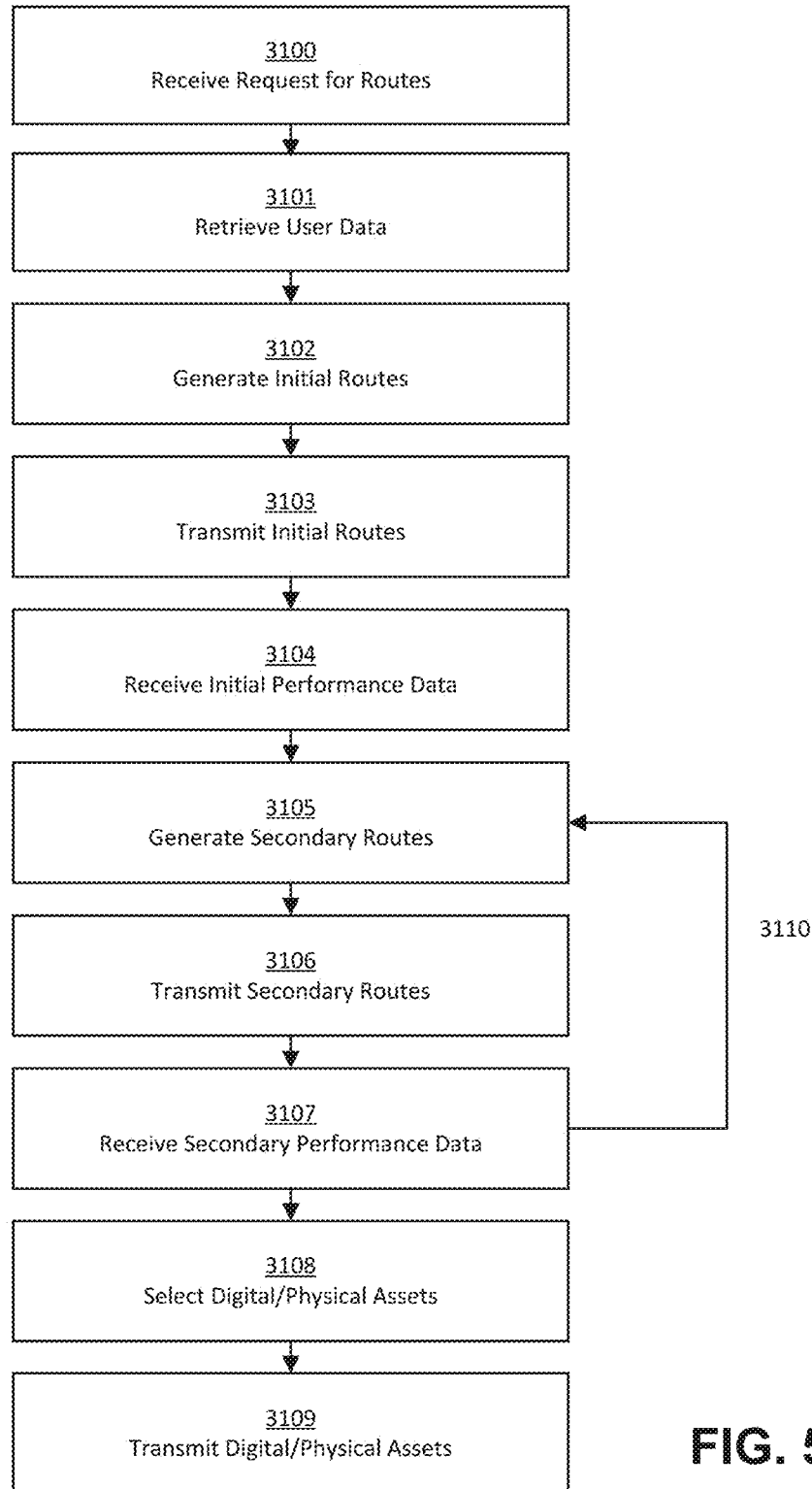
FIG. 52 illustrates a flowchart showing examples of performing steps discussed in the present disclosure.

FIG. 52 an exemplary flowchart of steps that certain embodiments may take. The steps shown in FIG. 52 may be performed by a computing system, such as server 111. At step 3100, processor 202 of server 111 may receive a request to generate a plurality of routes for a plurality of users. The request may identify each of the plurality of users, and may further identify an end-user computing device 1301, 1302 associated with each of the users. The request may include one or more constraints from the plurality of routes, such as location constraints, length constraints, geographical constraints (for example, peak altitude, and the like), difficulty level, and the like. The constraints may be applicable to all of the routes to be generated, or may be applicable to a subset of routes to be generated. The plurality of routes may be generated for a scavenger hunt that the plurality of users are participating in.

At step 3101, processor 202 may retrieve user data from memory 212 of system 111. Processor 202 may retrieve separate user data for each of the plurality of users. The user data may comprise athletic data including, but not limited to: motion parameters, such as speed, acceleration, distance, steps taken, direction, relative movement of certain body portions or objects to others, or other motion parameters which may be expressed as angular rates, rectilinear rates or combinations thereof, physiological parameters, such as calories, heart rate, sweat detection, effort, oxygen consumed, oxygen kinetics, and other metrics which may fall within one or more categories, such as: pressure, impact forces, information regarding the athlete, such as height, weight, age, demographic information and combinations thereof.

At step 3102, processor 202 may generate a plurality of initial routes for the plurality of users. Processor 202 may generate a customized initial route for each user, and one or more users may have the same customized initial routes. The plurality of initial routes may be generated based on the constraints included in the request received at step 3100 and the user data retrieved at step 3101. For example, the constraints may specify a plurality of potential starting locations for the initial routes, and maximum distance or completion time for the initial routes. Processor 202 may generate a plurality of routes that each begin at one of the potential starting locations, and that each meet the maximum distance and/or completion time requirements. The route generated for each user may be customized in terms of starting location, completion time, distance, difficulty, and the like, based on the user data retrieved for that user. That is, the user's individual route may be handicapped based on the user's prior athletic data. For example, each initial route may require special athletic moves or abilities, such as jumping, running, climbing, etc. Users who have demonstrated a high level of athletic ability (based on their user data) may be expected to traverse a longer distance, and/or a more difficult topography (for example, uphill routes), and/or complete the routes in a shorter amount of time. Each of the plurality of users must complete their customized route within a specified time period, or reach a specified location by a specified time. In one instance, the plurality of users may be given different start times based on an expected completion time for each user, such that the users each complete their customized initial route at a same completion time, or within a same completion time window.

At step 3103, processor 202 may transmit the plurality of routes to the plurality of users. As noted above, the request received at step 3100 may identify end-user computing devices associated with the plurality of users. Accordingly, processor 202 may send, to each user, via their identify end-user computing device, the customized route generated for that user. Processor 202 may further send a start time to each user. At step 3104, processor 202 may receive performance results for each of the plurality of users. The performance result for each user may indicate whether the user completed the initial route, a completion time, and the user's performance data for the initial route. The performance data for the initial route may include information similar to the athletic data retrieved at step 3101.

At step 3105, processor 202 may generate secondary routes. In one instance, secondary routes may be generated for each of the plurality of users, regardless of whether each user completed their customized initial route. In another instance, secondary routes may be generated for only a subset of users. The subset of users may be those users that completed their initial routes. The secondary routes may be generated based on the constraints received at step 3100, the user data retrieved at step 3101, the initial routes generated at 3102, and the initial performance data received at step 3104. For example, the secondary routes may begin where the initial routes ended. The customary routes may include activities that are similar to those included in the initial route, and/or may include different activities. For example, if the initial route for a first user included a plurality of hills, the secondary route generated for that user may include only a few hills, or no hills.

The secondary routes may be customized for each user based on the user data retrieved for the users at step 3102, and the initial performance data received for the users at step 3104. For example, first user data for a first user may indicate that the first user excels at uphill climbs. First initial performance data for the first user may further indicate that the first user had a strong running pace. Second user data for a second user may indicate that the second user has limited experience with uphill climbs, and second initial performance data for the second user may further indicate that the second user had a slow running pace compared to the first user. Processor 202 may utilize these factors when generating the secondary route for the first user and the second user. A first secondary route generated for the first user may include a first number of uphill climbs, and the first user may be required to set a first running pace for particular portions of the first secondary route. A second secondary route generated for the second user may include a second number of uphill climbs, and the second user may be required to set a second running pace for particular portions of the second secondary route. As the first user historically excels at uphill climbs and had a fast running rate during the initial route, the first number of uphill climbs may be greater than the second number of uphill climbs, and the first running pace may be greater than the second running pace.

The use of two users is exemplary, and more than two customized running routes may be generated. By generating different customized secondary routes for each user, and setting different requirements for the users during portions of the secondary routes, processor 212 may handicap each user based on their athletic data and their performance during their initial routes. This helps to create a level playing field among all participants of the scavenger hunt.

The secondary routes may further be customized based on user preferences. For example, the first user may have indicated that they are working on improving their running pace, and the second user may have indicated that they are working on improving their uphill climbs. A first customized secondary route generated for the first user may include long stretches of flat roads, thereby allowing the first user the opportunity to improve their running pace. Similarly, a second customized secondary route generated for the second user may include multiple hills, thereby allowing the second user the opportunity to improve their uphill climbs.

At step 3106, processor 202 may transmit the customized secondary routes to their corresponding user via end-user computing devices associated with the user. At step 3107, processor 202 may receive performance data for each user. The performance data for each user may include athletic data indicating the user's performance on the customized secondary route. In one instance (shown at element 3110), the steps of receiving performance data, generating additional routes, and transmitting the additional routes to the user may be repeated one or more times. The number of cycles may depend on how long the scavenger hunt is to continue. Once the hunt is complete, at step 3108, processor 202 may select one or more digital and/or physical assets as rewards for the users. The selection of the assets may be based on the performance data received for the users during completion of the routes of the hunt. In one instance, processor 202 may award a digital asset to all participants. In another example, users who achieved a first performance level may be awarded a first digital and/or physical asset, users who achieved a second performance level may be awarded a second digital and/or physical asset, and so on. In another example, top performers may be awarded physical asset(s), and the remaining users may be awarded digital asset(s). At step 3109, processor 202 may transmit information regarding the rewarded digital and/or physical assets to the users via their end-user computing device. If a user has been rewarded a physical asset, the information sent to their end-user computing device may include an image of the asset, and instructions on how the physical asset may be collected by the user.

Locating and Activating the Object

When the primary user reaches the location of the virtual object, the location of the object can be identified and the object can be activated. The location may be determined and confirmed by the primary device 1301 and/or an external device (such as server 1307). As described herein, some assistance by the secondary user(s) may improve the ability to locate the object, or may be required to locate the object. Location of the object may require a given proximity to the object, which range may be enhanced based on the number, participation, or characteristics of the secondary users. Transmission of image data from the primary device 1301 may also be required for location in one embodiment, as the location is indicated using augmented reality. Items 1806-1810 in FIG. 18 illustrate location of the object from the perspective of the display of the primary device 1301. As the user approaches the object location, live video is displayed and transmitted by the primary device 1301 at 1806 and 1807, and a ping by a secondary user reveals the location of the object at 1808. The primary user approaches the object at 1809, reaching the object at 1810. Once located, the object may be activated automatically once the user is in close proximity in one embodiment, such as at item 1811 in FIG. 18. Items 1906-1907 illustrate the location and activation of the object from the perspective of the secondary device 1302, which also displays the live video from the primary device 1301 with augmented reality. Items 1812 and 1908 illustrate the reward being made available to the primary and secondary user, respectively.

Figure 27:
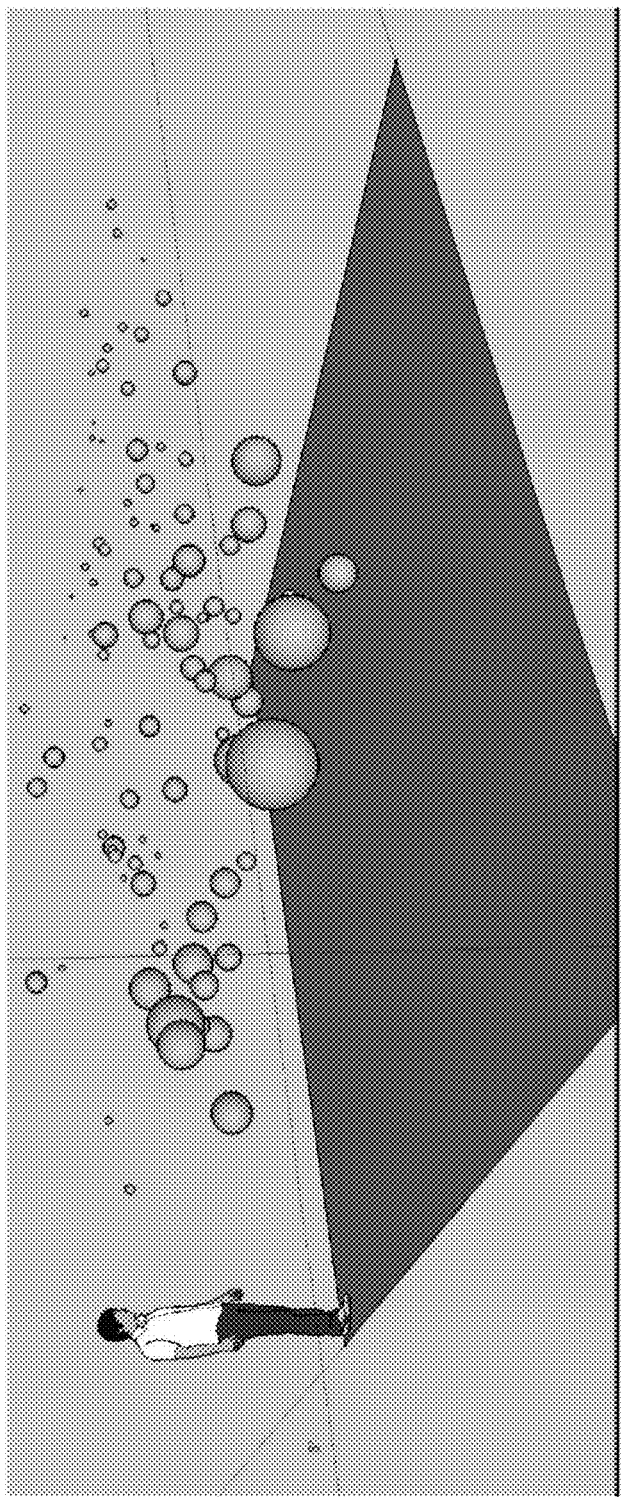
FIG. 27 illustrates a puzzle for completion by one or more users in a system and method of virtual searching, in accordance with example embodiments.
Figure 28:
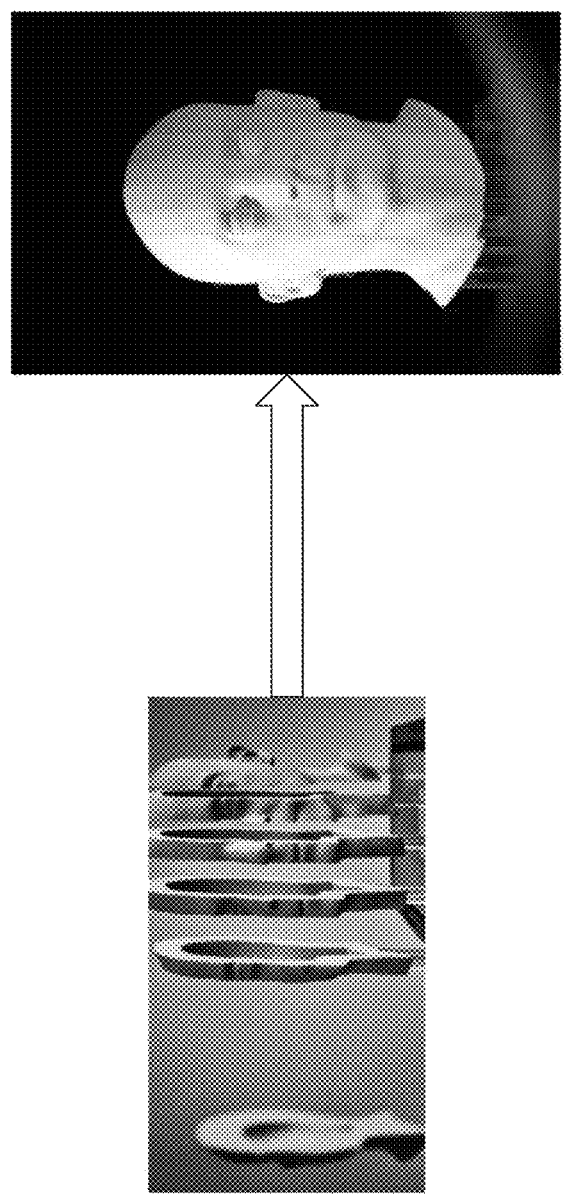
FIGS. 28-30 illustrate an arrangement that is properly viewable from a single perspective, in a system and method of virtual searching, in accordance with example embodiments
Figure 29:
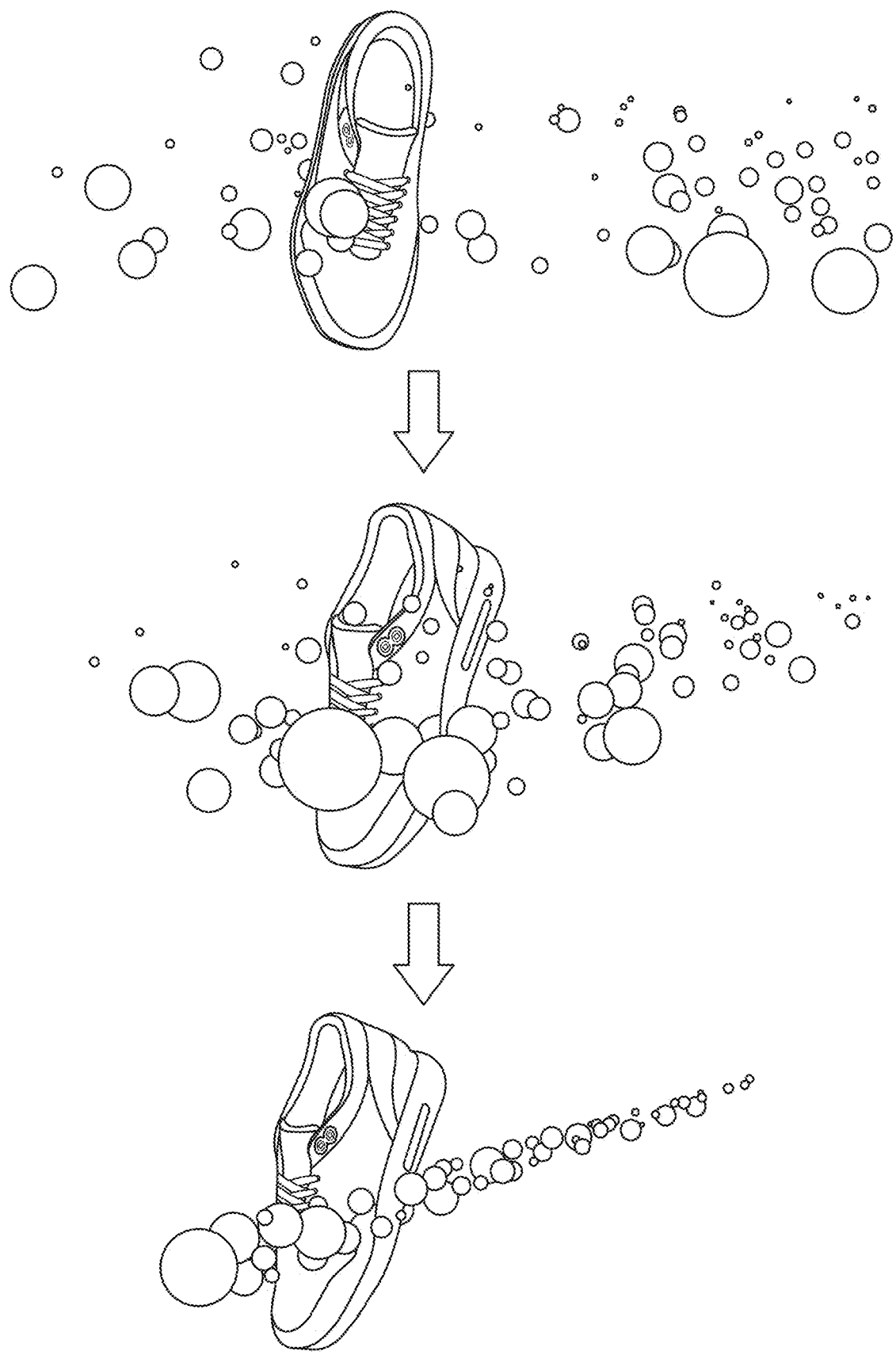
Figure 30:
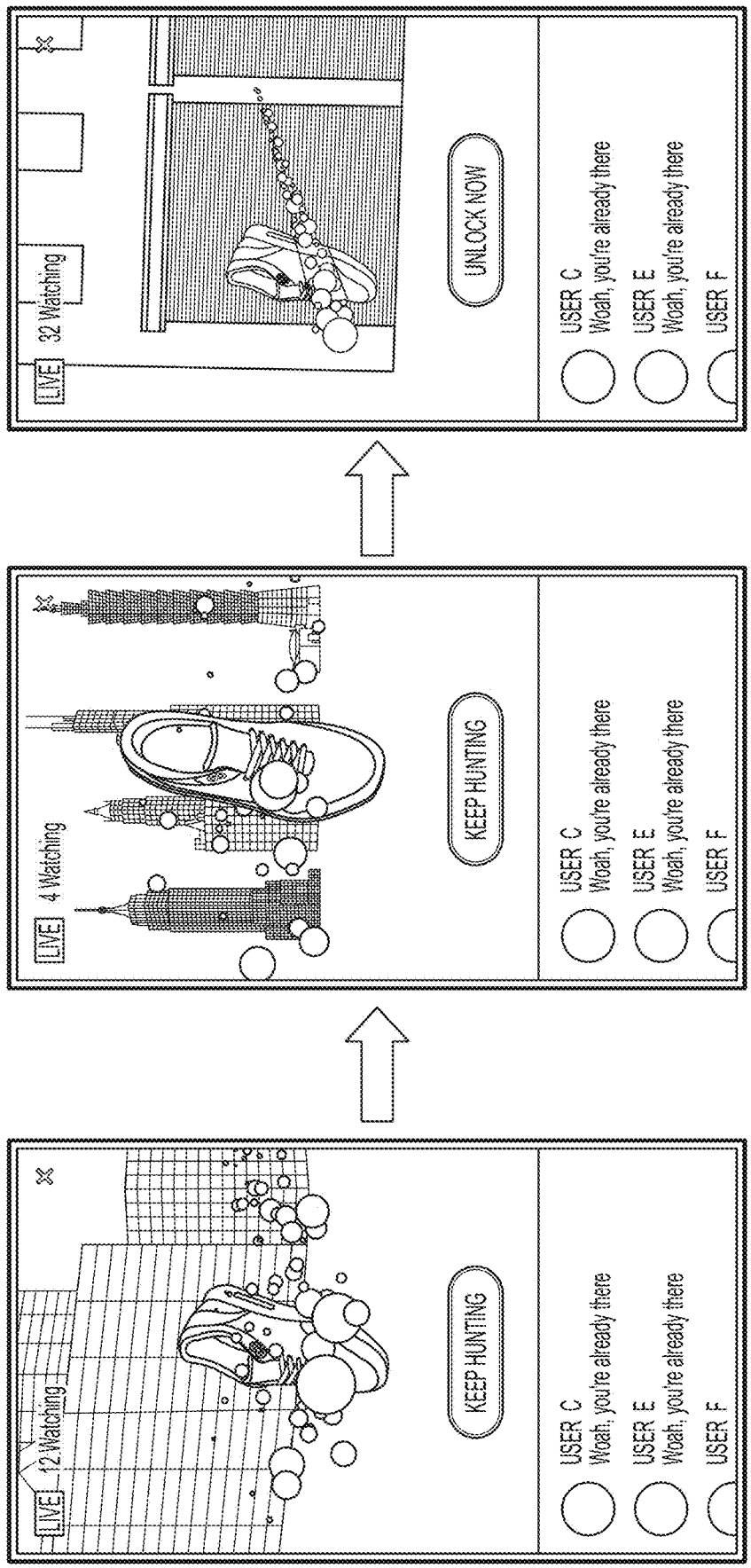
Figure 31:
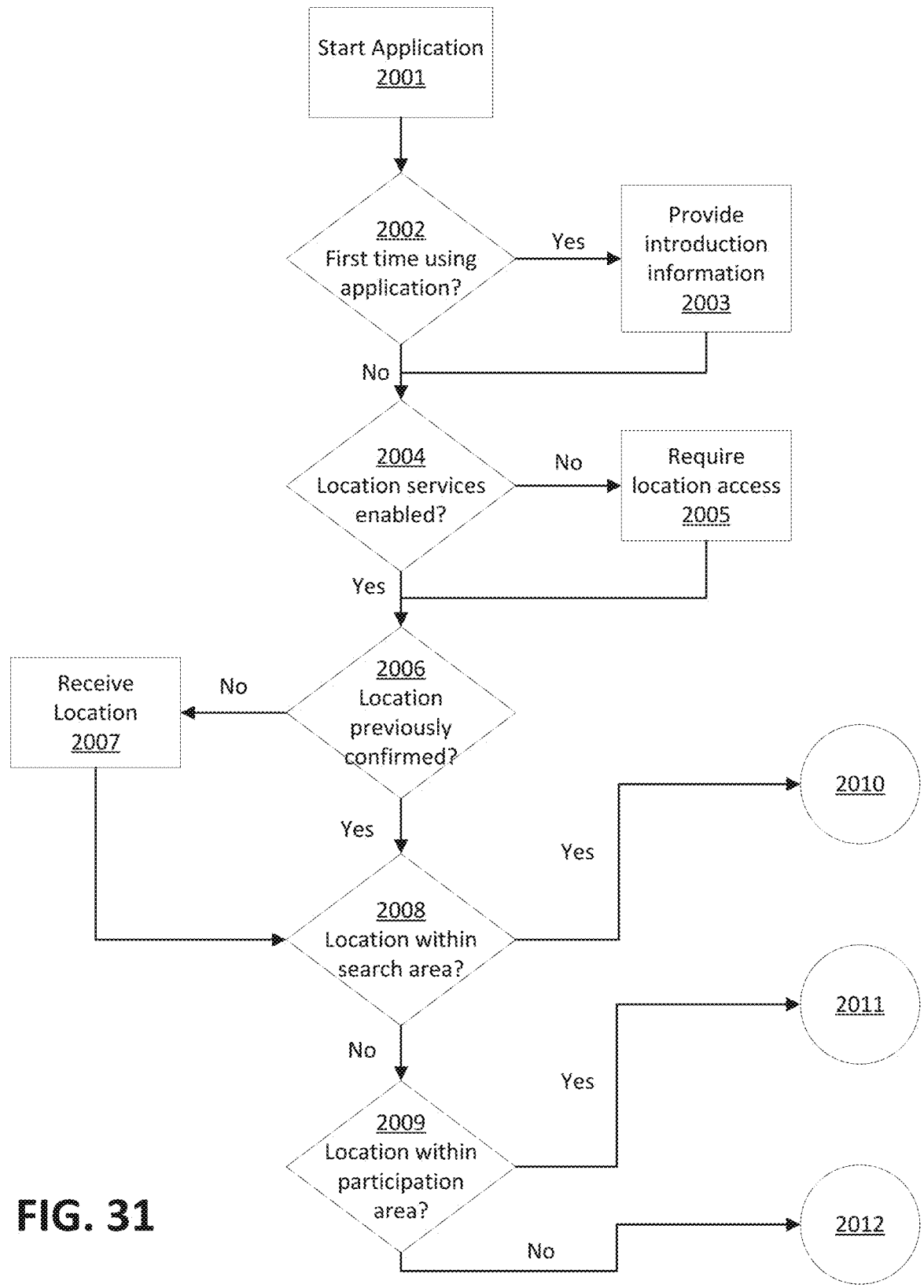
FIGS. 31-36 illustrate an example embodiment of a method for virtual searching that may use augmented reality, in accordance with example embodiments.

In another embodiment, some additional action may need to be taken by one or more users to activate the object. For example, the user(s) may need to answer quiz questions or assemble a virtual puzzle in one embodiment. FIG. 27 illustrates augmented reality depicting a number of virtual items (orbs) that must be arranged to form a specific shape or virtually "moved" to a specific location in order to activate the object. The primary user may be required to virtually interact with the orbs by physical movement in order to relocate the orbs. Not all orbs may be displayed to all users in one embodiment, such that cooperation and coordination of all users is required to relocate all of the orbs as required. In another embodiment, the primary device 1301 must view the virtual object (using the capture device) from a specific perspective in order to activate the object. FIGS. 28-30 illustrate augmented reality 3-D images that are visible in a specific configuration when viewed from the correct perspective. FIG. 28 illustrates a sculpture that is properly viewable from only a single perspective. As shown in FIGS. 29 and 30, an arrangement of orbs appears randomly arranged when viewed from incorrect angles, but as the perspective changes, the orbs are seen to form a brand logo, thereby activating the object. In a further embodiment, one or more users may need to engage in some activity, detected by activity monitoring equipment, in order to activate the object. Other conditions may be required, including a combination of conditions described herein. For example, a full group may be required to activate the object, either as a sole condition or in combination with other requirements.

In other embodiments, the target may not be a virtual object, and may be a physical/tangible object or a geographic location. In these embodiments, the target may still require a specific user action for activation. For example, the target may be physical object such as a building, monument or other structure, a piece of art, a vehicle, or other object, and activation of the target may require photography or other image capture of the object. Such image capture may require the image to be captured from a specific location or orientation, or for the image to be captured of a specific portion of the object. As another example, the target may require user presence in a specific location, and activation may be required once the user reaches the location. As a further example, some or all of the activation techniques described above with respect to a virtual object may be used in connection with a target in the form of an actual object or a specific location.

Search Method with Participating and/or Observing Secondary Users

FIGS. 31-36 illustrate one embodiment of a method for searching for a target within a geographical space and unlocking a reward using the system 1300 of FIG. 13. FIGS. 31-36 illustrate this method from the perspective of a device provided with a computer program enabling the device to function as the primary device 1301 or the secondary device 1302, depending on the location of the device and/or user selections. In one example, the computer program may be in the form of an application provided for download to and/or storage on a mobile device and configured for causing the device to perform the method of FIGS. 31-36 or specific portions thereof. FIGS. 42-51 illustrate display screens that may be displayed by the device 1301, 1302 in connection with the method of FIGS. 31-36, including displays of user selection options. FIGS. 37-40 illustrate another embodiment of a method for searching for a target within a geographical space and unlocking a reward using the system 1300 of FIG. 13. FIGS. 37-40 also illustrate this method from the perspective of a device provided with a computer program enabling the device to function as the primary device 1301 or the secondary device 1302, depending on the location of the device and/or user selections. The methods in FIGS. 31-40 are shown from the perspective of the user device, and in one embodiment, the user device performs all steps of the method and may utilize information from one or more external devices in doing so. However, it is understood that some or all of the actions described herein may be performed partially or fully by an external device in communication with the device, such as an external server or database, or may involve exchange of information with such an external device. It is contemplated that information may be transmitted to, from, and between the external device and the user device, in the course of actions performed by or in conjunction with such an external device. It is also understood that the methods of FIGS. 31-40 may include portions of the methods described herein with respect to FIGS. 14-19 and 31 and/or features described herein with respect to FIGS. 20-30. While not specifically described in FIGS. 31-40, these methods may utilize augmented reality features as described herein in connection with searching for and/or activating the target, and the target may be a virtual object that is provided using the augmented reality features.

The method of FIGS. 31-36 is configured to perform searching for a target and may utilize one or more different geographical areas to define user roles. FIG. 41 illustrates an example of this configuration. For example, the method may utilize a search area 1308 with defined boundaries such that a user inside the search area 1308 is eligible for (or required to be, in one embodiment) a primary user or "searcher," i.e., making the user's device a primary device 1301. The search area 1308 may be defined such that users outside the search area are only eligible to be a secondary user, i.e., making the user's device a secondary device 1302. Additionally, in one embodiment, multiple targets 1310 may be provided for searching, and such multiple targets 1310 may be provided at different locations within a single search area 1308 as shown in FIG. 41, or within multiple different search areas 1308. The method of FIGS. 31-36 may utilize multiple different classes of secondary users, including "squad mate" or participating secondary users that use participating secondary devices 1302A and can interact with searchers and potentially achieve a reward upon success of a searcher, and "watcher" or observing secondary users that use observing secondary devices 1302B and can observe the progress of the search but do not benefit from success of the search. In this embodiment, the method may further use a participation area 1309 with defined boundaries such that a user inside the participation area 1309 is eligible to be a participating secondary user. In this configuration, a user outside the search area 1308 and the participation area 1309 may only be eligible to be an observing secondary user. Multiple participation areas 1309 may be provided in one embodiment. FIG. 41 illustrates the search area 1308 and the participation area 1309 as a virtual boundary defined by a radius from a designated center point, and the center point of the search area 1308 may be at or near the location of a target 1310 in one embodiment. In other embodiments, the areas 1308, 1309 may be defined using different criteria, such as city limits, state or international lines, neighborhood boundaries, street-based boundaries, natural boundaries such as rivers or mountains, virtual boundaries with square or other simple or complex shapes, or other criteria, including arbitrary or irregular boundaries. In a further embodiment, the method may use only primary and observing secondary users, such as in FIGS. 37-40, or the method may use only primary and participating secondary users, without observing secondary users.

In the example embodiment of FIGS. 31-36, a search area 1308 is defined by or within a designated city, and multiple targets 1310 are able to be located within the search area 1308, such as in different neighborhoods within the city. In this embodiment, a participation area 1309 is defined by or within a second designated city, such that participating users in one city may join a team or "squad" with searchers in the city having the search area 1308 to locate the target 1310 and/or receive a reward from locating or activating the target. This configuration provides the ability for users in both the search area 1308 and the participation area 1309 to potentially receive the benefits from locating or activating the target 1310. Additionally, the method of FIGS. 31-36 provides for creation of a team by participating users selecting searchers by choice, as described herein. In other embodiments, the teams may be created using other techniques described herein, including various matching and selection methods.

In the example embodiment of FIGS. 31-36, the search may further have other limitations in addition to geographic limitations, including at least temporal limitations and inventory limitations. The temporal limitations may include a defined start time, such that the system does not permit locating or activating the target or provide any information enabling users to do so prior to the defined start time. In this configurations, users may commence the search at any time after the defined start time. The ending of the search in the embodiment of FIGS. 31-36 is governed by inventory limitations, i.e., the search ends after a designated number of searchers have located or activated the target and/or after a designated number of rewards have been provided. In an embodiment where multiple targets are provided for searching, each target may be provided with an individual inventory limit, or a collective inventory limit may be provided for all targets combined. In another embodiment, the search may have a temporally-limited end time rather than an inventory-limited end time, or the search may have both temporal and inventory limits, with the search ending when either limit is reached.

In one embodiment, the method of FIGS. 31-36 may provide rewards to the searcher and potentially some or all participating users upon locating or activating the target, in the form of access to a consumer product. The consumer product may be a product that has otherwise limited public access or is not publicly accessible through other channels. For example, the consumer product may be a new product that has not yet been publicly released, and the reward includes access to this product before the public release date. In the example screen shots shown in FIGS. 42-51, the consumer product is a pair of shoes. The access may be in one or more different forms, including exclusive access to purchase, a voucher for purchase, a gifted or complementary product, or other types of access. In one embodiment, the access or other reward may be provided in a single form, and in another embodiment, the user may select the reward from multiple forms, such as choosing between exclusive access or a voucher. In a further embodiment, the reward for the searchers may be provided in one form, and the reward for the participating users may be provided in a different form. If the reward is in a form that permits purchase of the item, the method may further include order and/or payment screens that are accessible after the reward has been granted. The inventory of rewards may be maintained on a central server or system database 1307, and rewards may be granted through various devices 1301, 1302 in communication with the server or database 1307.

As described herein, the method of FIGS. 31-36 may be performed by the user device 1301, 1302, including the processor 202 and other components, in conjunction with a server 111 and/or other external devices. In the embodiment of FIGS. 31-36, the method begins by the user first starting the application at 2001 on the device. A determination is made whether the user has used the application previously at 2002, and such a determination may include receiving credentials or identifying information by the user, e.g., a login ID and password, which may be entered into the user device. The information can be checked against information on the server 111. If the user has not previously used the application, the device displays introduction information at 2003, which may include, without limitation, welcome information, instruction on using the application, promotional information, and/or requests for the user to provide information, such as identification or credentials for future use, payment information, etc. The application may require location information for the user device, and in this embodiment, the method includes determining whether the user has granted permission to access the user device's location, at 2004. If the user has not granted such permission, the method may require access to the location information for the device at 2005, and the application may be configured not to proceed without such access. In one embodiment, the user may be able to provide such access by altering privacy settings on the user device. Once location information is accessible, a determination is then made whether the location of the user device has already been confirmed, at 2006, and if not, then location information is received and the location is confirmed at 2007.

After the user location is confirmed, the system determines whether the user is within the search area, at 2008, or within the participation area, at 2009. This determination may be performed by the mobile device in conjunction with the server 111. If the location of the user device is within the search area 1308, then the user is eligible to be a primary user or searcher. In the embodiment of FIGS. 31-36, a user within the search area 1308 is defaulted to be a searcher and a user within the participation area is defaulted to be a participating user. In another embodiment, a user within the search area 1308 can select to be a searcher or an observing user, and/or a user within the participation area 1309 can select to be a participating user or an observing user. If the search area 1308 and the participation area 1309 overlap, then a the user may default to being a searcher in one embodiment, or may be able to select between being a searcher or a participating user (or potentially an observing user) in another embodiment. It is understood that if options for user type selection are presented to the user, the device may receive user input for selection of user type. Once the user type is determined, whether through default or selection, the process proceeds to FIG. 32 at a searcher path 2010 if the user is a searcher, to FIG. 34 at a participating path 2011 if the user is a participating user, or to FIG. 36 at an observing path 2012 if the user is an observing user.

If the user is assigned to be a searcher and the method proceeds via the searcher path 2010, the system may require or permit the user to provide a profile picture, as well as potentially additional identifying information. For example, the system may determine whether the user has previously provided a profile picture at 2013, and if not, then the system may prompt the user to upload a profile picture at 2014. The method of FIGS. 31-36 uses a temporal beginning limitation, and in this embodiment, the system determines whether the search has begun at 2015. If the start time of the search has not yet been reached, the system requires the user to wait until the start time, and the primary device 1301 may display a waiting screen, at 2016. In one embodiment, the waiting screen may include a countdown, such as a constant countdown or a countdown that begins at a specific time in advance of the start time (e.g., 1 minute or 10 seconds).

Figure 42:
FIGS. 42-51 illustrate examples of display screens that may be provided on a mobile device in connection with the method of FIGS. 31-36.

Once the search start time has been reached, the device displays the status and other information about the search, at 2017. FIG. 42 illustrates an example display screen that may be displayed by the primary device 1301 that includes various search information, including the potential reward (in this case, access to purchase a specific pair of shoes and a price of purchase), the location of the search area 1308, the location areas of each target, inventory of each target, and instructions how to locate and/or activate the target, among other information. Some or all information displayed may be obtained from the server 111. In the embodiment shown in FIG. 42, the search information screen includes location areas for three different targets, identifying a general location area (in this case, a neighborhood) in which each target is located, and inventory information associated with each target, which is displayed in FIG. 42 as a percentage of the original inventory of rewards that remains for each target. In this embodiment, each target is associated with the same reward, but in another embodiment, different potential rewards may also be displayed for each virtual item. Additionally, in the embodiment of FIG. 42, the search information screen also functions as a selection screen for selecting among the multiple targets for which the search can be conducted. The user may select one of the targets by tapping on the appropriate target on the selection screen in FIG. 42, and the system thereby receives a selection of a target for search, at 2018. Once the target is selected, the system checks whether the target has already been unlocked by the particular searcher, at 2019, and if so, then the method proceeds to step 2030. If the target has not been unlocked already, the system also determines whether inventory is still available for the object selected, at 2020. In one embodiment, the inventory is maintained on a server 111, and the device 1301 communicates with the server to check the inventory status. If no inventory remains for the selected object, the method returns to the search status screen at 2017, and the primary device 1301 may display a message to the user indicating that inventory is not available, e.g., "Sold Out." If inventory still exists, then the search begins, and the method proceeds through 2010A. It is understood that if inventory runs out before the searcher locates the target, the server 111 may notify the device 1301 that no inventory remains, and the process may be modified accordingly. In one embodiment, the device 1301 displays a notice to the user that the inventory associated with the target is depleted, and the process may be returned to step 2017.

Figure 45:
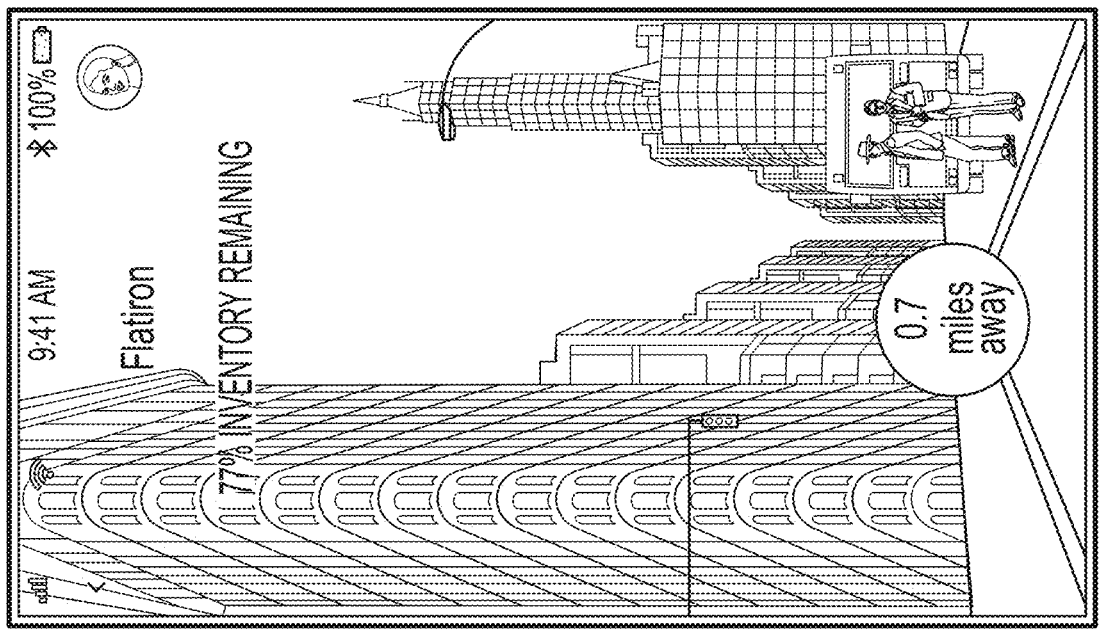
Figure 44:
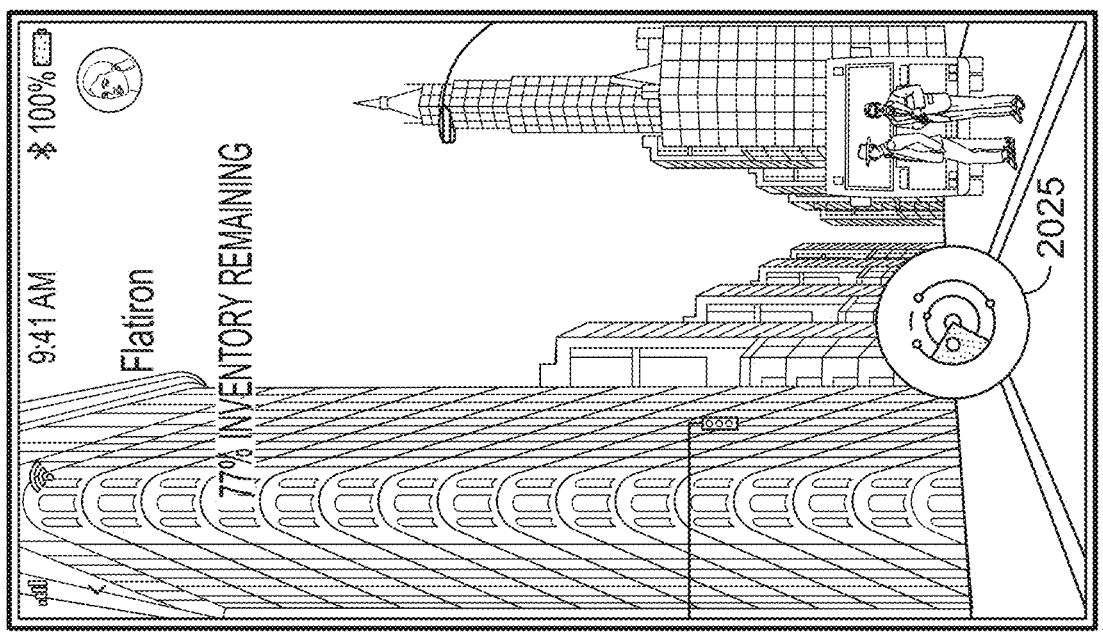

In one embodiment, the system may use one or more beacons near the location of a target to aid in location, such that the beacon(s) are configured to transmit information to the primary user device 1301. Such beacons may use short range communication technologies such as WiFi®, Bluetooth®, Near-Field Communication (NFC) and/or ANT technologies, and if the method uses such beacons, the device 1301 may be required to detect and enable use of such technologies. If the method proceeds through 2010A, the system determines whether such beacons are used (or required, in one embodiment) for location of the target, at 2021, and if so, may require activation of features on the device 1301 to use such short range communication, at 2022. In the example embodiment of FIGS. 31-36, the technology used is Bluetooth®. The user is then free to search for and/or attempt to reach the location of the target, and the system monitors the user's location, at 2023, and may provide assistance and/or information to the user in connection with the search, as described herein. In the embodiment of FIGS. 31-36, the user may request one or more periodic location checks, at 2024, which are received through the device 1301. FIG. 44 illustrates an example of a display screen that provides a button 2025 for a user to request a location check, and it is understood that location checks may be limited in some way as described herein, such as by number or frequency of checks permitted. The button 2025 in FIG. 44 provides distance information when pressed, as shown in FIG. 45, and also provides directional information for the target location. The system may check to determine whether the user has reached the target location at 2026, and if not, provides location information to assist the user in locating the target as described herein, at 2027. FIG. 45 illustrates an example of a display screen that provides location information to the user in response to the location check, in the form of a distance to the target location. Additional location information may be provided as well, such as the direction of the target or a route to the target. It is understood that any location information may be provided from the server 111 to the device 1301 in one embodiment. Additionally, in one embodiment, other users (such as participating users 1309) may assist the searcher with providing location information, as described herein.

Figure 46:
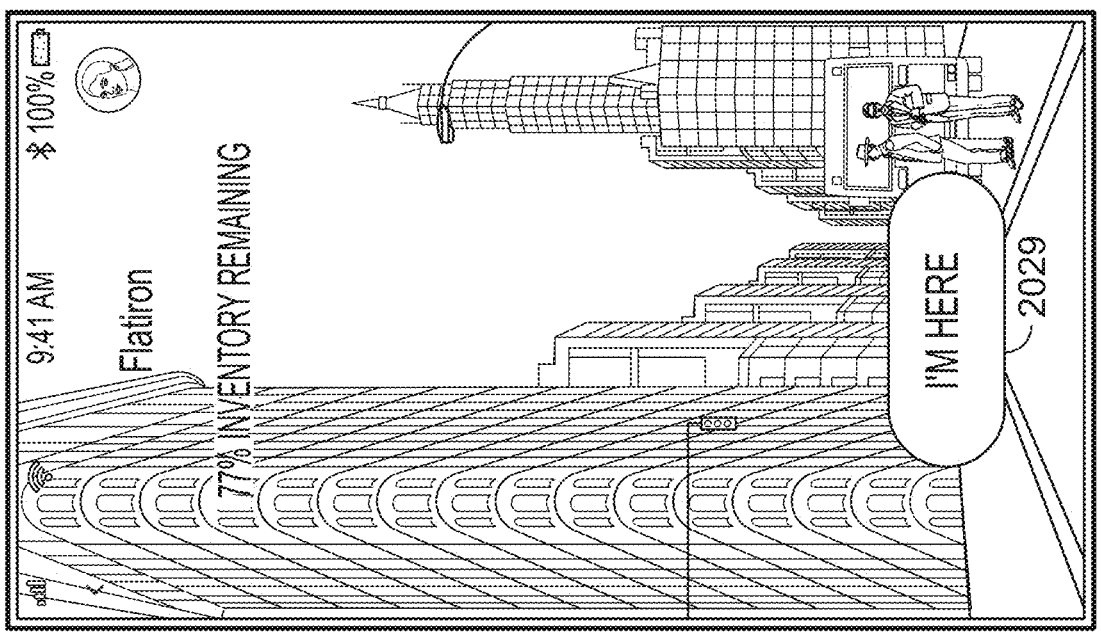

If the user has reached the object location, the system may require activation of the target by the user, at 2028, such as through the various activation techniques described herein. FIG. 46 illustrates an example of a display screen that permits the user to indicate that he/she has reached the target, by tapping a button 2029 that reads, "I'm Here." In one embodiment, this action may initiate activation procedures that may be required, as described herein, and in another embodiment, activation may be accomplished simply by reaching the location and tapping the button 2029. Various activation techniques described herein may be required, including those that make use of image capture and/or augmented reality features. For example, in one embodiment, a user may be required to photograph or otherwise image capture a specific actual or virtual object (e.g., by bringing the object within the camera's field of view) to activate the target and the reward. In another embodiment, augmented reality and image capture may not be used, and a user may simply need to reach the target to activate the reward.

Figure 47:
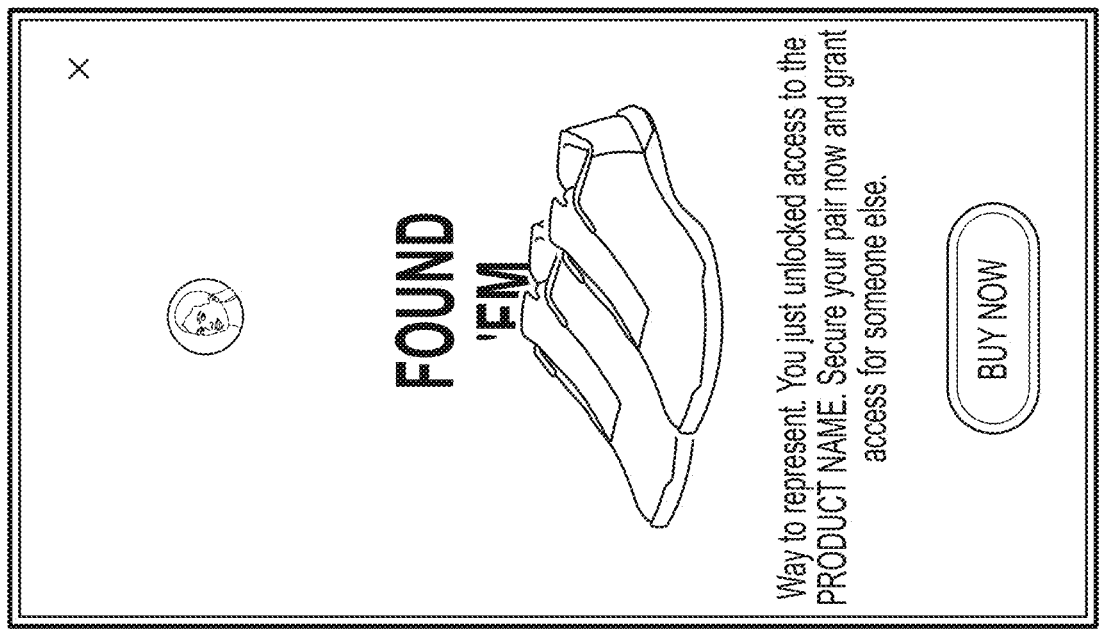

Once the user has located or activated the target, the system may provide a reward to the user, at 2030, as described herein, such as by confirmation transmitted from the server 111 and received by the device 1301. The reward in one embodiment may be exclusive access to buy a consumer product or a voucher for such a product. The device 1301 may display a notice to the user that the award has been received. FIG. 47 illustrates an example of a display screen that provides notice of the reward in the form of exclusive access to buy a commercial product (in this case, a pair of shoes), with an option for the user to be taken to a purchase screen or site, e.g., for entry of payment information and delivery or in-store pickup information. If any participating users are given rewards based on the searcher locating or activating the target, the system also notifies and/or provides the reward to such participating users at 2031. The participating user(s) may transmit messages to the primary user in one embodiment, as described herein. The method may also compile and display information regarding the search, at 2032, such as the first user to locate or activate the target, the user with the fastest time between beginning the search and locating or activating the object, the user who traveled the farthest distance to locate the object, the last user to locate or activate the target, etc. In one embodiment, the system does not compile or display this information until all targets have been located or activated, and this information may be compiled and displayed for each individual object and/or for all objects collectively.

If the user is assigned to be a participating user and the method proceeds via the participation path 2011, the system may require or permit the user to provide a profile picture, as well as potentially additional identifying information. For example, the system may determine whether the user has previously provided a profile picture at 2033, and if not, then the system may prompt the user to upload a profile picture at 2034. The method of FIGS. 31-36 uses a temporal beginning limitation, and in this embodiment, the system determines whether the search has begun at 2035. If the start time of the search has not yet been reached, the system requires the user to wait until the start time, and the participating secondary device 1302A may display a waiting screen, at 2036. In one embodiment, the waiting screen may include a countdown, such as a constant countdown or a countdown that begins at a specific time in advance of the start time (e.g., 1 minute or 10 seconds). It is noted that the system may also provide additional instructions for proceeding as a participating user. For example, in one embodiment, the device 1302A may inform the user that the user is eligible for a reward once 100% of the inventory has been unlocked for all targets.

Figure 43:
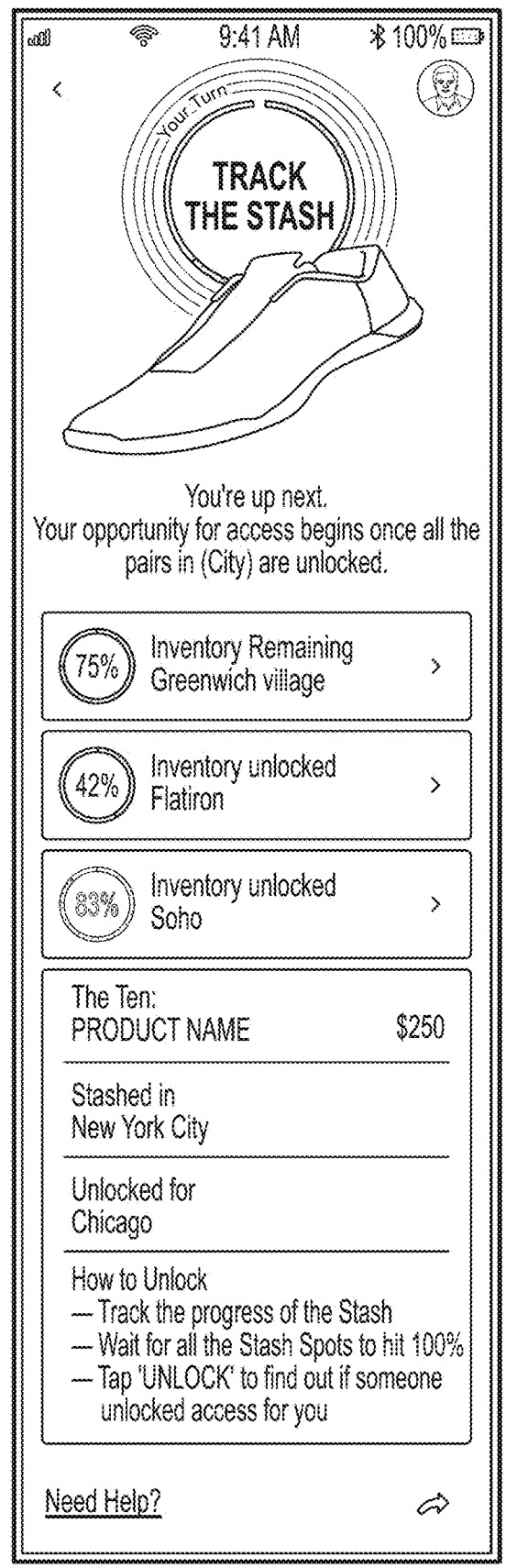

Once the search start time has been reached, the device displays the status and other information about the search, at 2037. FIG. 43 illustrates an example display screen that may be displayed by the participating secondary device 1302A that includes various search information, including the potential reward (in this case, access to purchase a specific pair of shoes and a price of purchase), the location of the search area 1308, the location of the participation area 1309, the location areas of each target, and the inventory of each target, among other information. In the embodiment shown in FIG. 43, the search information screen includes location areas for three different targets, identifying a general location area (in this case, a neighborhood) in which each target is located, and inventory information associated with each target, which is displayed in FIG. 43 as a percentage of the total inventory of rewards that have been unlocked or granted for each target. As described herein, some or all of this information may be provided to the device 1302 from the server 111. In this embodiment, each target is associated with the same reward, but in another embodiment, different potential rewards may also be displayed for each virtual item. Additionally, in the embodiment of FIG. 43, the search information screen also functions as a selection screen for selecting among the multiple targets for which the search is being conducted. The user may select to view information about one of the targets, including information about the searchers who are searching for the respective target in one embodiment, by tapping on the appropriate object on the selection screen in FIG. 43. The system thereby receives a selection of one of the targets, at 2038. Once the target is selected, the method proceeds to step 2039 in FIG. 35 via 2011A.

Figure 48:
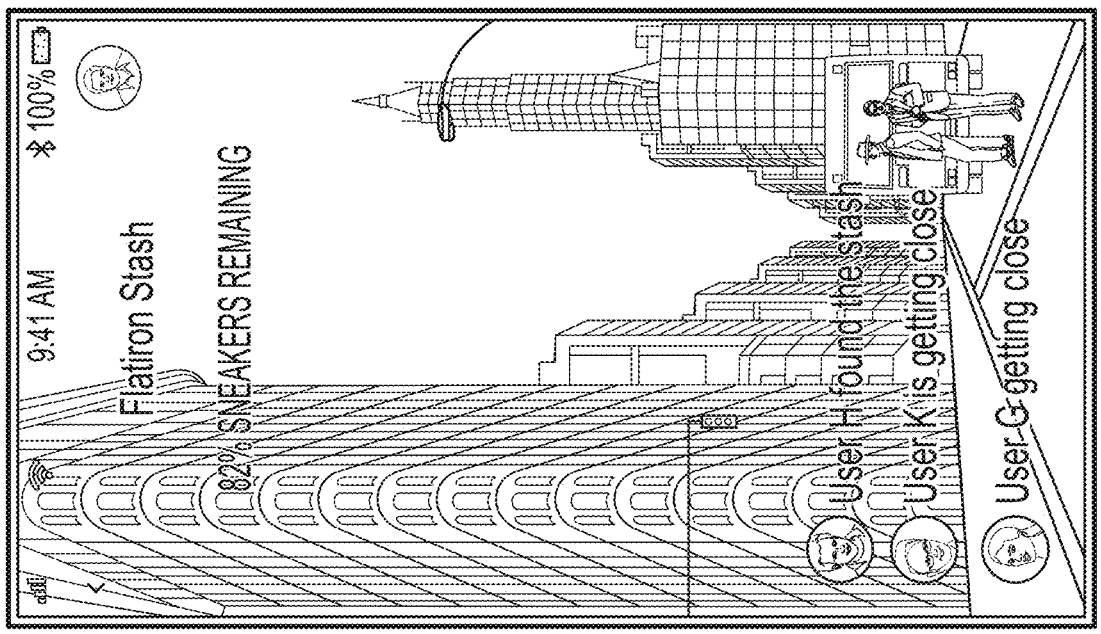
Figure 51:
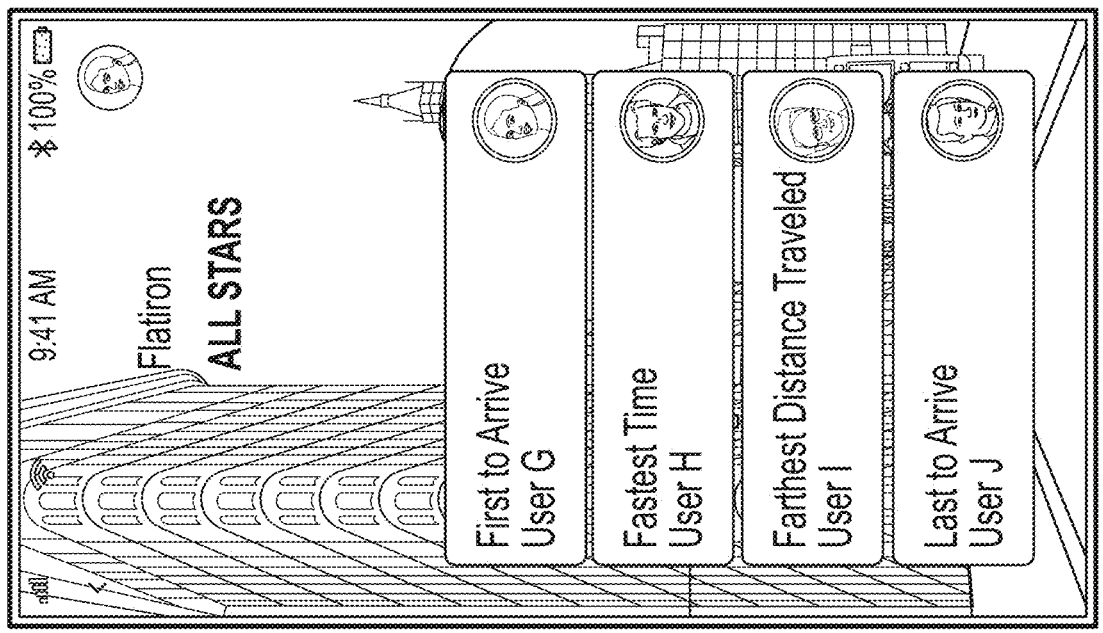
Figure 50:
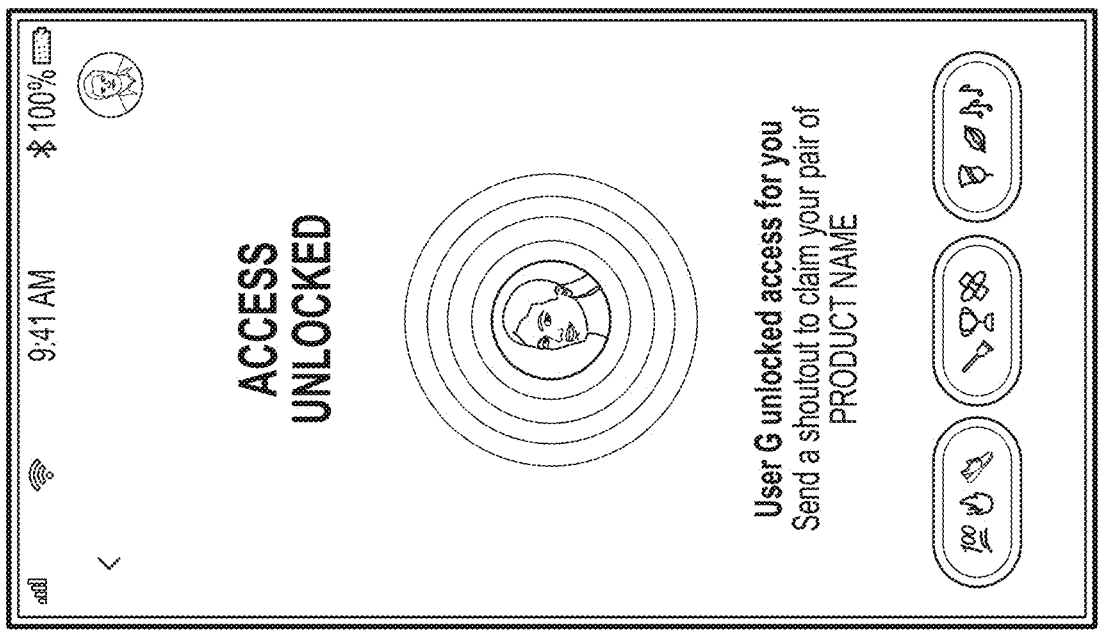

After the target is selected at 2038, the device 1302A displays information about the selected target, at 2039, such as the general location of the target, inventory information, and other such information. In one embodiment, this information includes a complete or partial list of all searchers who have designated that they are searching for the selected target, as well as additional information about each searcher, such as a photo, status information for the searchers, recent actions by the searchers, and/or proximity of the searcher to the target, which may be qualitative (e.g., close or far) or quantitative (e.g., 0.3 miles away). The information display screen may also double as a searcher selection screen in one embodiment, providing options for the participating user to select a searcher to team with. FIG. 48 illustrates an example display screen that may be displayed by the participating secondary device 1302A that includes target information, inventory information, and a scrolling list of potential searchers for selection, along with qualitative proximity information for each searcher. In the embodiment of FIGS. 31-36, only searchers who have not yet located or activated the target are eligible for selection. The system then receives a selection of a searcher from the participating user through the device 1302A, at 2040, and returns to the search status screen (FIG. 43) at 2041. In one embodiment, the system may include requirements that must be met for the reward to be available to the participating user, and the system determines whether these requirements are met and whether the reward is available, at 2042. These requirements may include at least that the selected searcher has located or activated the target, and in one embodiment, no participating users are eligible for the reward until the search has ended, i.e., through temporal or inventory limitations being met.

Figure 35:
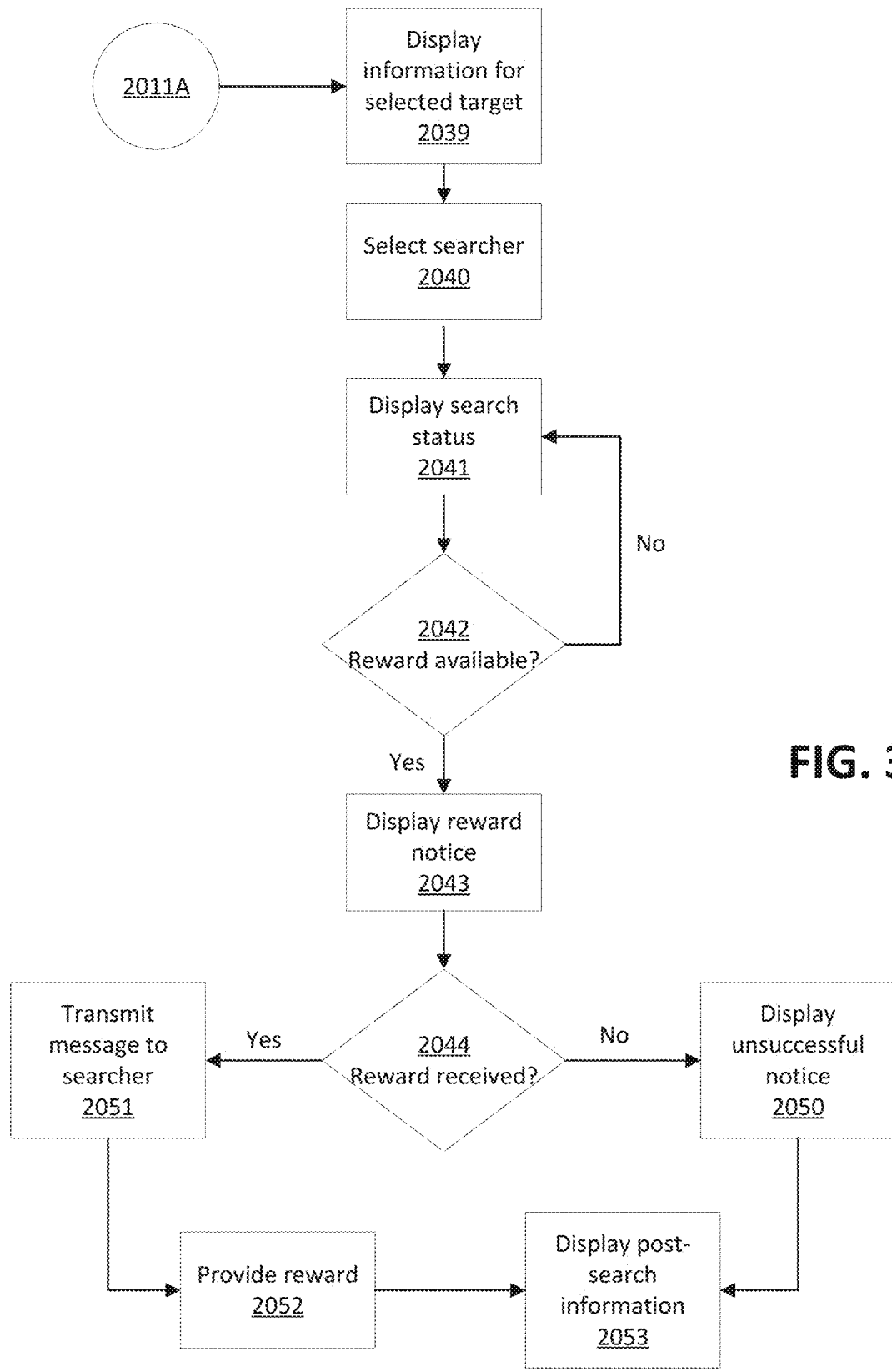
Figure 35A:
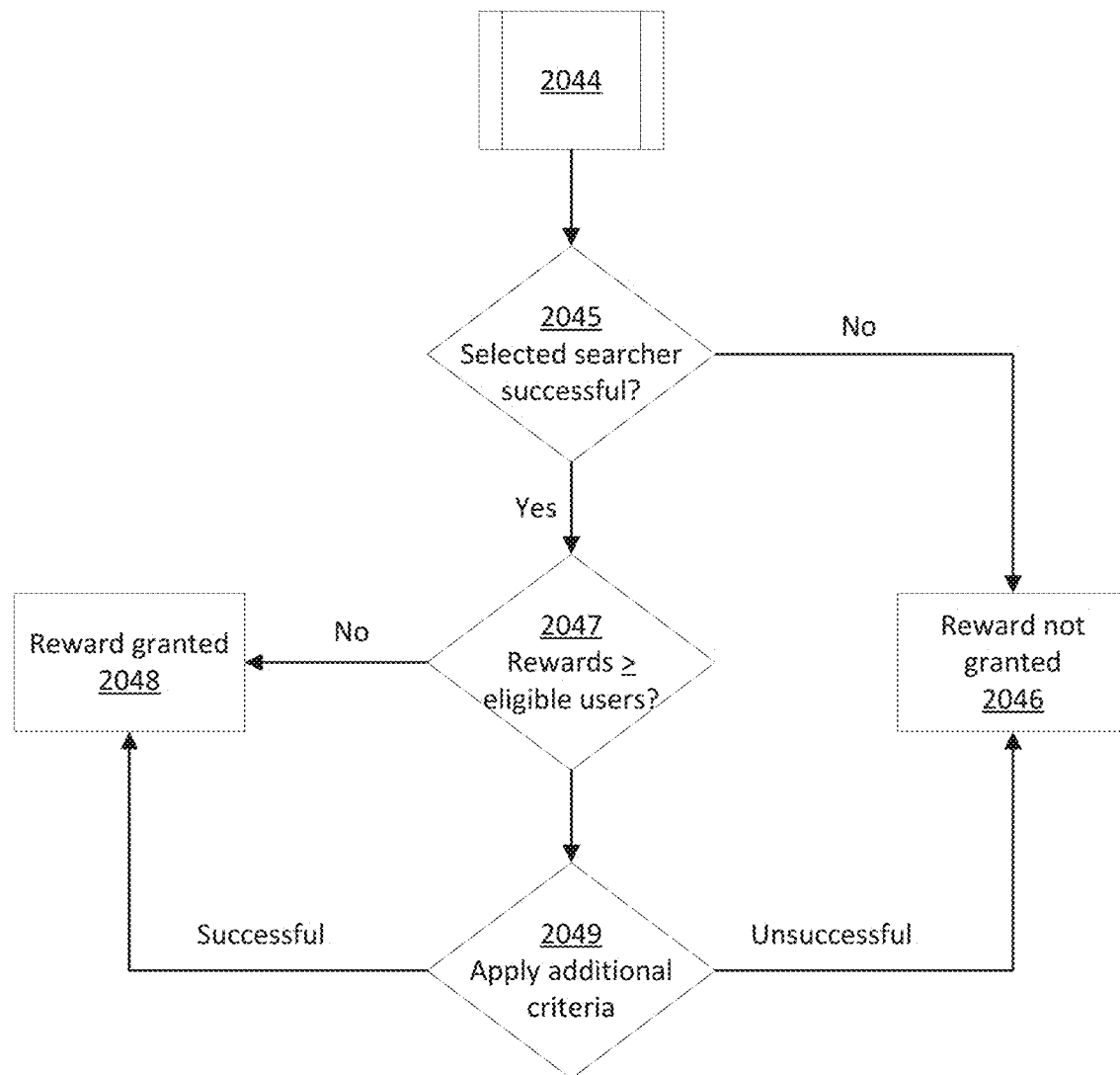
Figure 49:
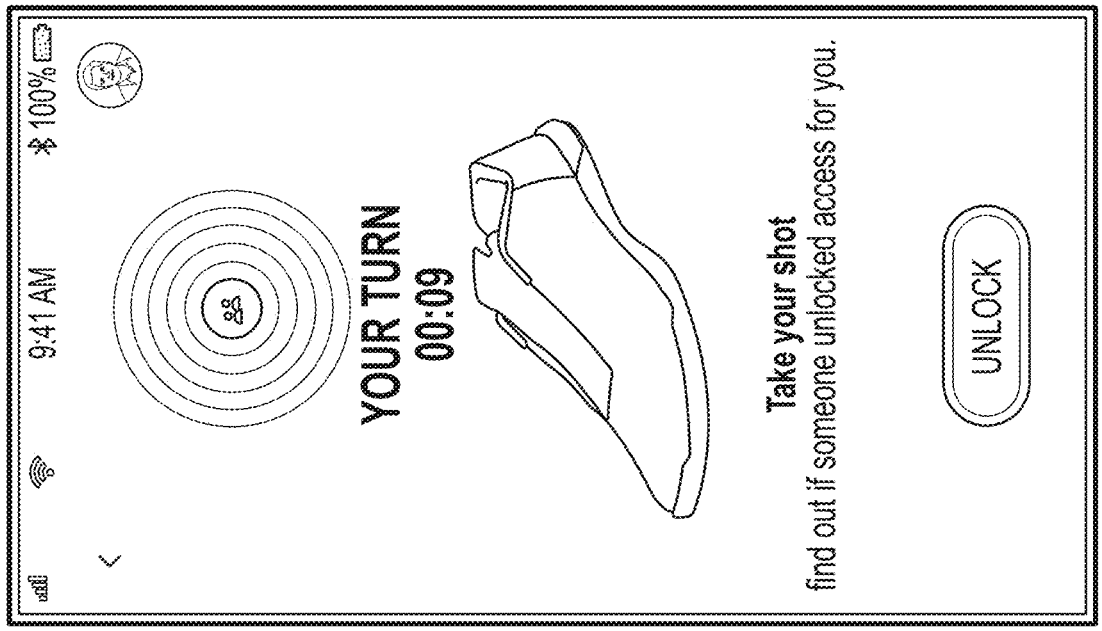

Once the reward is available, the device 1302A displays a reward notice, at 2043, indicating that the participating user is eligible for the reward, which may require action on the part of the participating user to receive the reward. FIG. 49 illustrates an example display screen for a reward notice that may be displayed by the participating secondary device 1302A, which requires the user to attempt to receive the reward by pressing the "Unlock" button within a time limit. In the example of FIG. 49, if the user does not attempt to secure the reward within the time limit, the reward is not granted, and the device 1302A displays an "unsuccessful" notice indicating that the reward was not received. If the user does attempt to secure the reward, the system then determines whether the reward is granted to the participating user, at 2044. This determination may depend on multiple factors, including whether the searcher selected by the participating user was successful in finding or activating the target, the number of rewards available, the number of participating users that qualify for the reward, and potentially other considerations. In one embodiment, any participating users who selected a successful searcher (i.e., a searcher who located or activated the target) are eligible to receive the reward. FIG. 35A illustrates one subprocess for determining whether the reward is granted at 2044. The system first determines whether the participating user selected a successful searcher at 2045. If not, then the reward is not granted at 2046. If so, then the participating user qualifies for the reward, and the system next determines whether the number of rewards available equals or exceeds the number of qualified participating users at 2047. If so, then all qualifying participating users receive the reward at 2048. If not, then additional criteria are applied to choose which qualified users receive the reward at 2049. In one embodiment, the reward recipients are selected at random from the pool of qualified participating users. In other embodiments, other criteria may be applied, such as giving precedence to participating users who began the process earlier, granting rewards based on the performance of the searcher teamed with each participating user (i.e., speed, distance traveled, etc.), consideration of brand loyalty or other user history, etc. If the reward is not granted to the participating user, the device 1302A displays an "unsuccessful" notice that the reward was not received at 2050. If the reward is granted, the user may need to perform additional actions in order to receive the reward, such as transmitting a message to the searcher with whom the participating user was teamed (e.g., a message of credit or gratitude) at 2051. The reward is then provided at 2052. Whether or not the reward was granted, post-search information as described herein may be compiled and provided at 2053. The server 111 may send a confirmation that the reward is secured, and/or determine whether the reward is granted, in one embodiment.

If the user is assigned to be an observing user, the method proceeds via the observation path 2012. In one embodiment, the system may require or permit the observing user to provide a profile picture, as well as potentially additional identifying information, as described herein. The method of FIGS. 31-36 uses a temporal beginning limitation, and in this embodiment, the system determines whether the search has begun at 2054. If the start time of the search has not yet been reached, the system requires the user to wait until the start time, and the observing secondary device 1302B may display a waiting screen, at 2055. In one embodiment, the waiting screen may include a countdown, such as a constant countdown or a countdown that begins at a specific time in advance of the start time (e.g., 1 minute or 10 seconds). It is noted that the system may also provide additional instructions for proceeding as an observing user.

Once the search start time has been reached, the device displays the status and other information about the search, at 2056. The display screen that may be displayed by the observing secondary device 1302B may be similar to the search information screen displayed by the participating secondary device 1302A, such as in FIG. 43, and may include the same or similar information. In one embodiment, the search information screen for the observation path includes the same information and layout as FIG. 43, but with instructions for proceeding as an observing user rather than as a participating user. Additionally, the search information screen may also function as a selection screen for selecting among the multiple targets for which the search is being conducted, also similar to the method for the participating device 1302A. The observing user may select to view information about one of the targets, including information about the searchers who are searching for the respective target in one embodiment, by tapping on the appropriate object on the selection screen. The system thereby receives a selection of one of the targets, at 2057, and the device 1302B displays information about the selected target, at 2058. This information may include the information displayed by the participating secondary device 1302A, including (among other information) a complete or partial list of all searchers who have designated that they are searching for the selected target, as well as additional information about each searcher, similar to that illustrated in FIG. 48. Further information about each searcher may be available by selecting a specific searcher. The observing user may observe status about the search, each target, and various users throughout the course of the search. Once the search is complete, as determined at 2059, the system may compile and display post-search information as described herein, at 2060.

Figure 36:
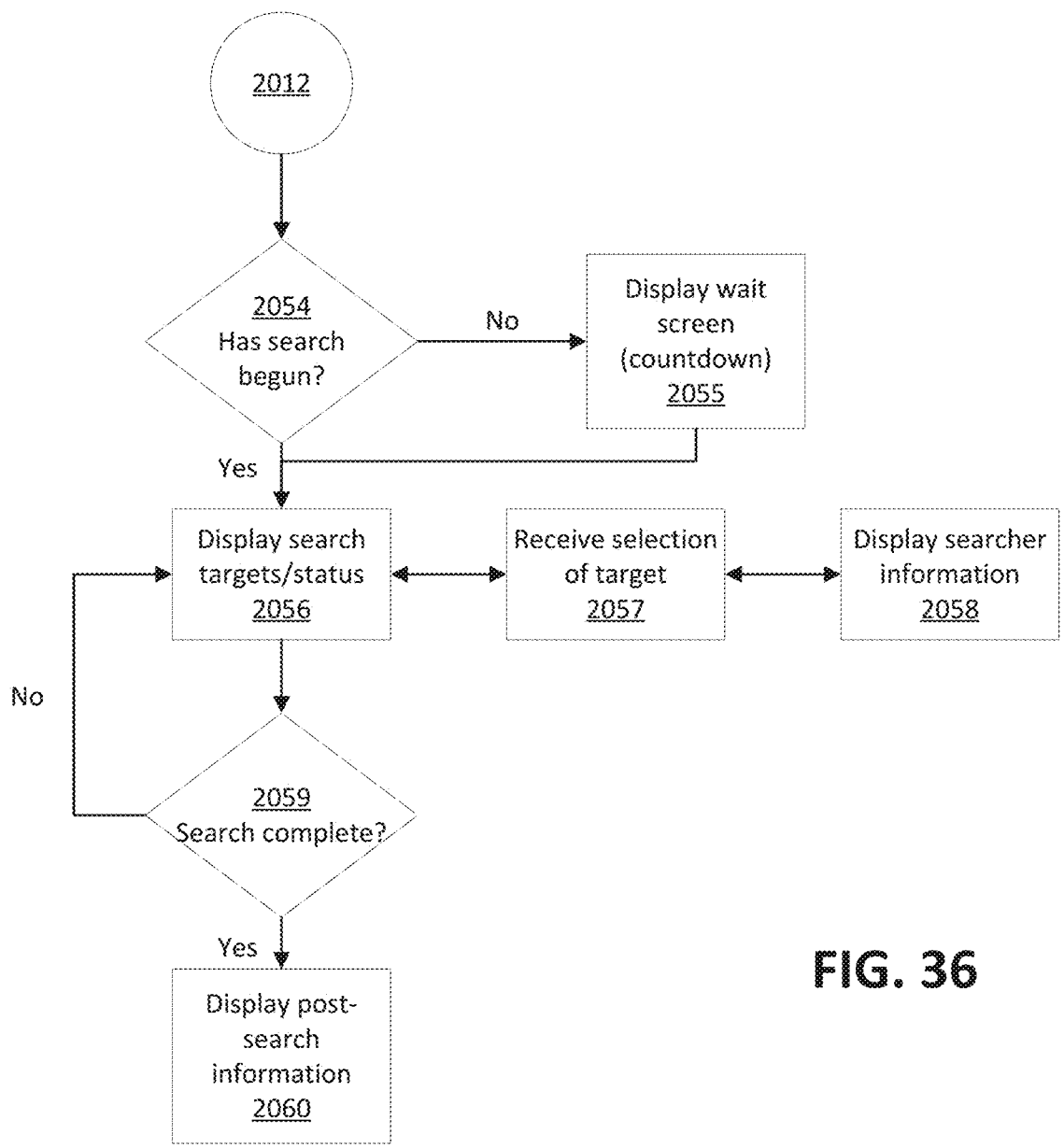
Figure 37:
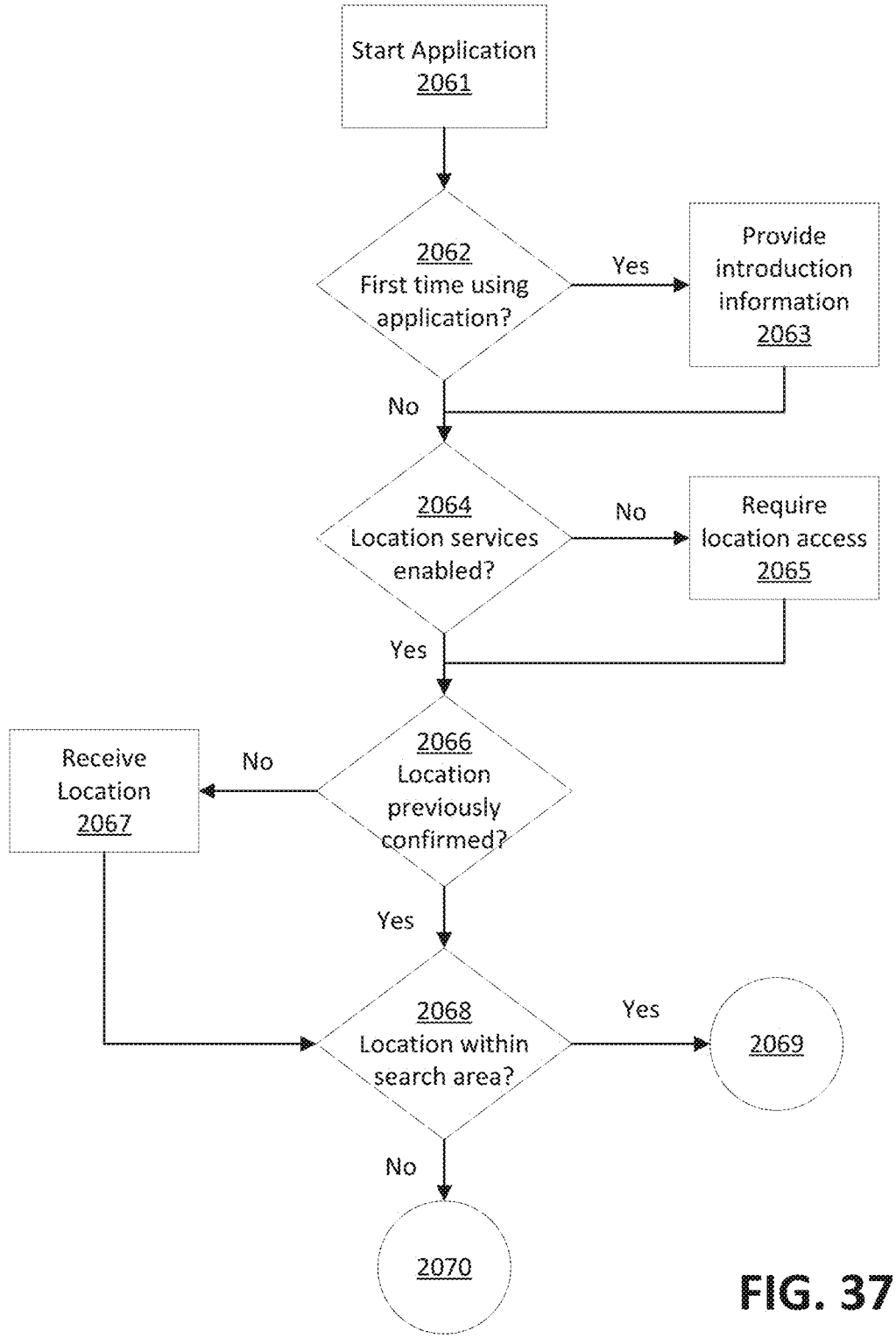
FIGS. 37-40 illustrate another example embodiment of a method for virtual searching that may use augmented reality, in accordance with example embodiments.

FIGS. 37-40 illustrate another embodiment of a method that uses many of the features as the method of FIGS. 31-36, without the incorporation of participating secondary users or a participation area 1309. In other words, the users in the method of FIGS. 37-40 are assigned as either searchers or observing secondary users as described herein. As described herein, the method of FIGS. 37-40 may be performed by the user device 1301, 1302, including the processor 202 and other components, in conjunction with a server 111 and/or other external devices. Steps 2061-2068 in FIG. 37 are the same as steps 2001-2008 in FIG. 31 as described herein, and the same variations and alternate embodiments may be used. At step 2068, if the system determines that the user is within the search area 1308, then the user is assigned to be a searcher or primary user and proceeds according to the searching path at 2069. If the system determines that the user is not within the search area 1308, then the user is assigned to be an observing secondary user and proceeds according to the observation path at 2070.

Figure 32:
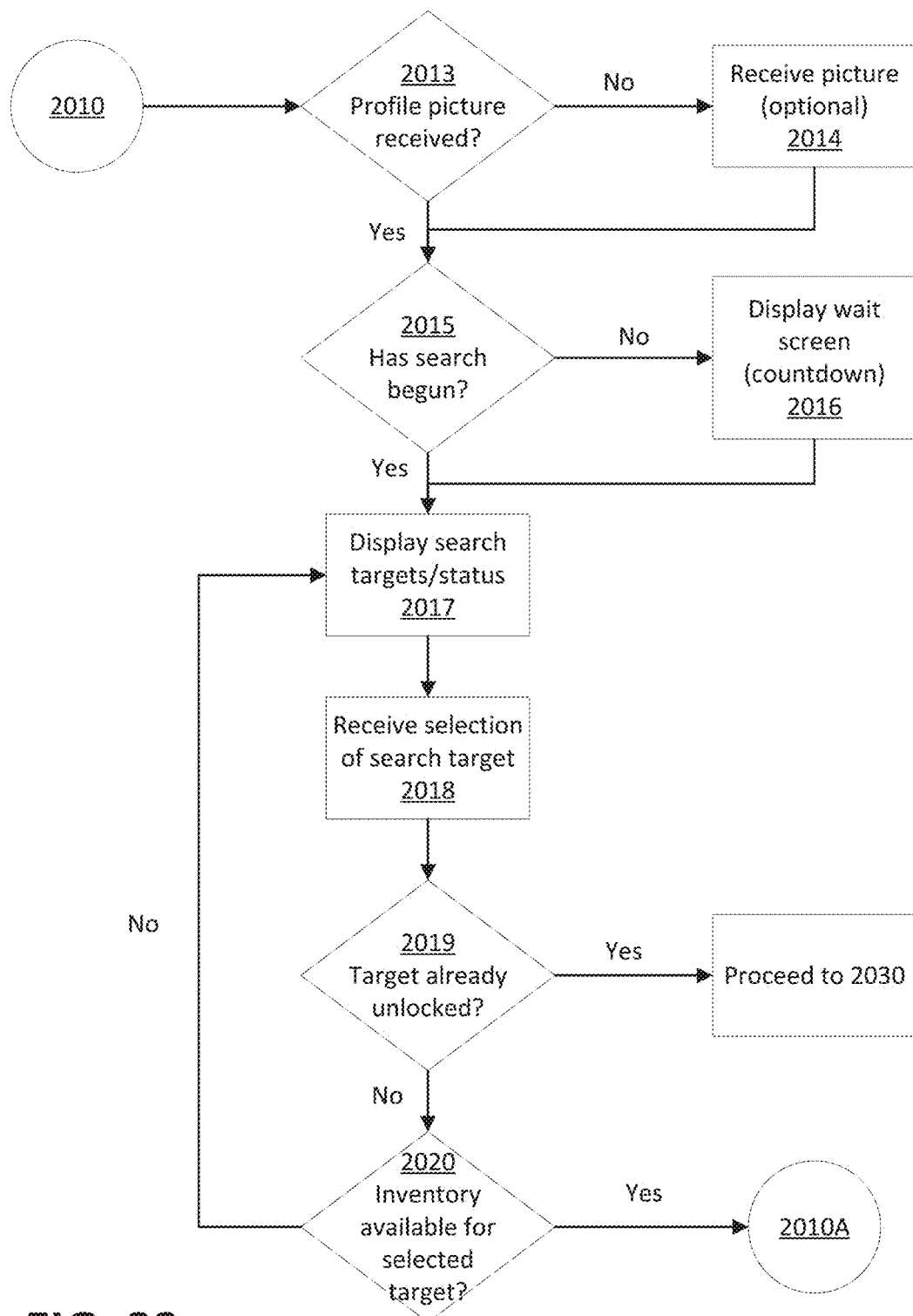
Figure 33:
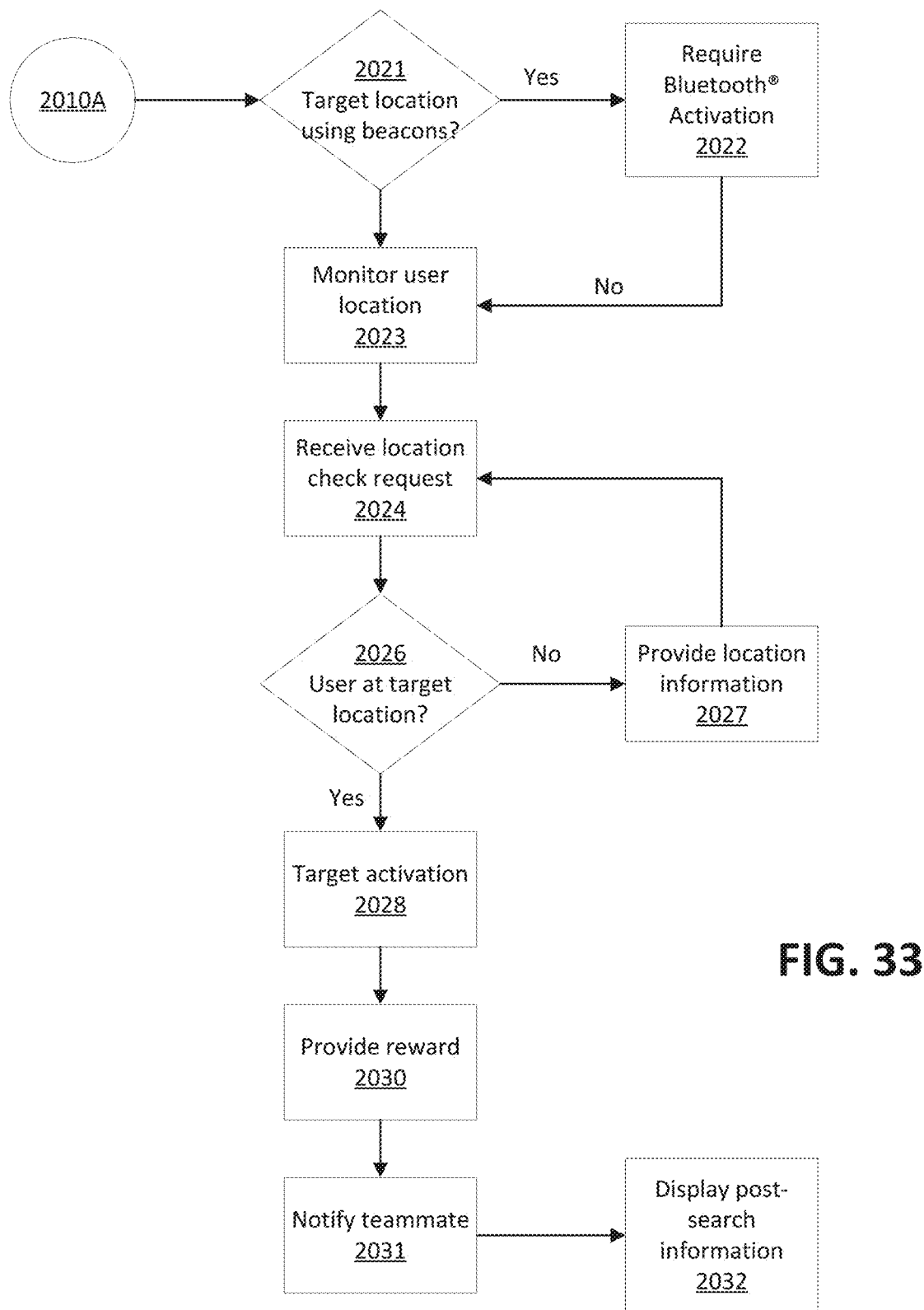
Figure 34:
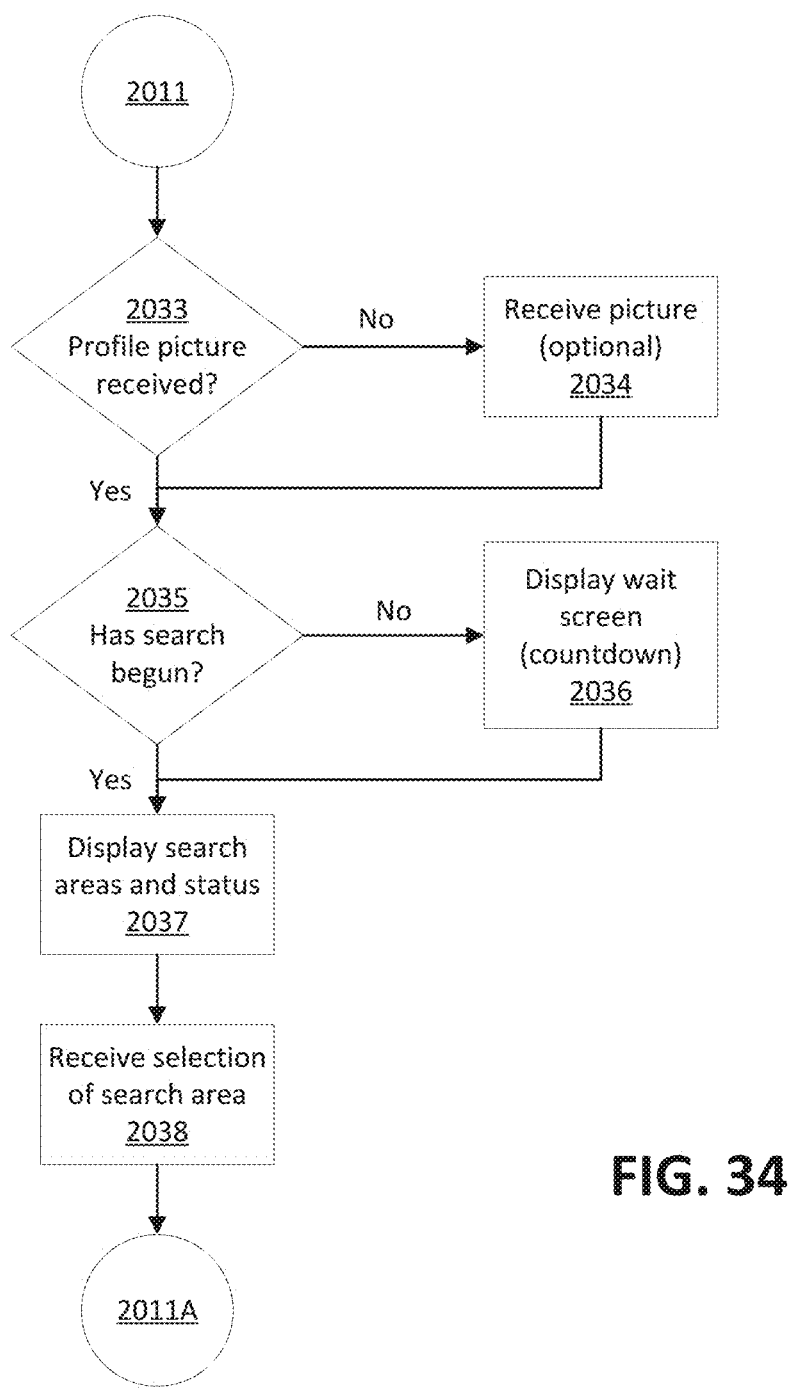
Figure 38:
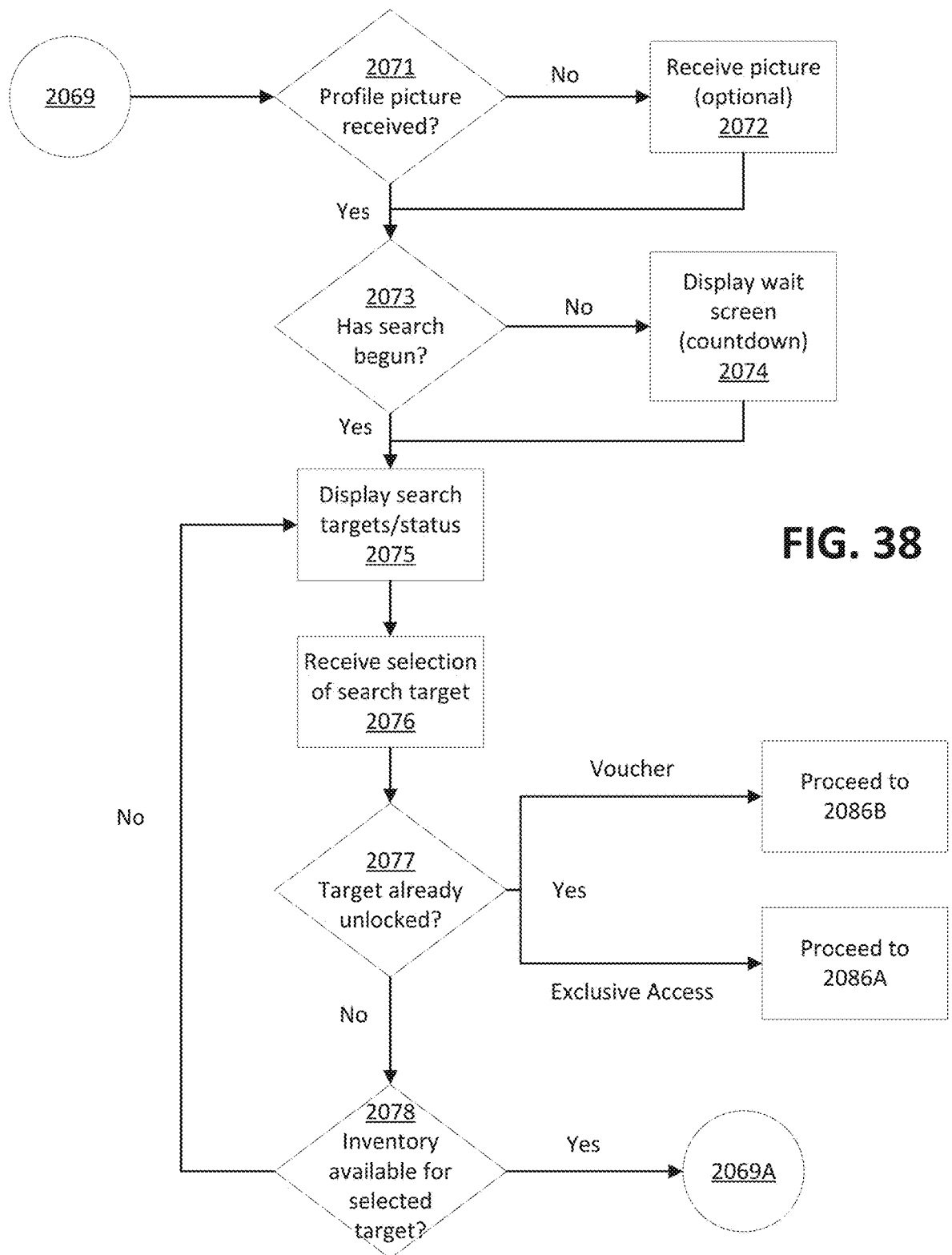
Figure 39:
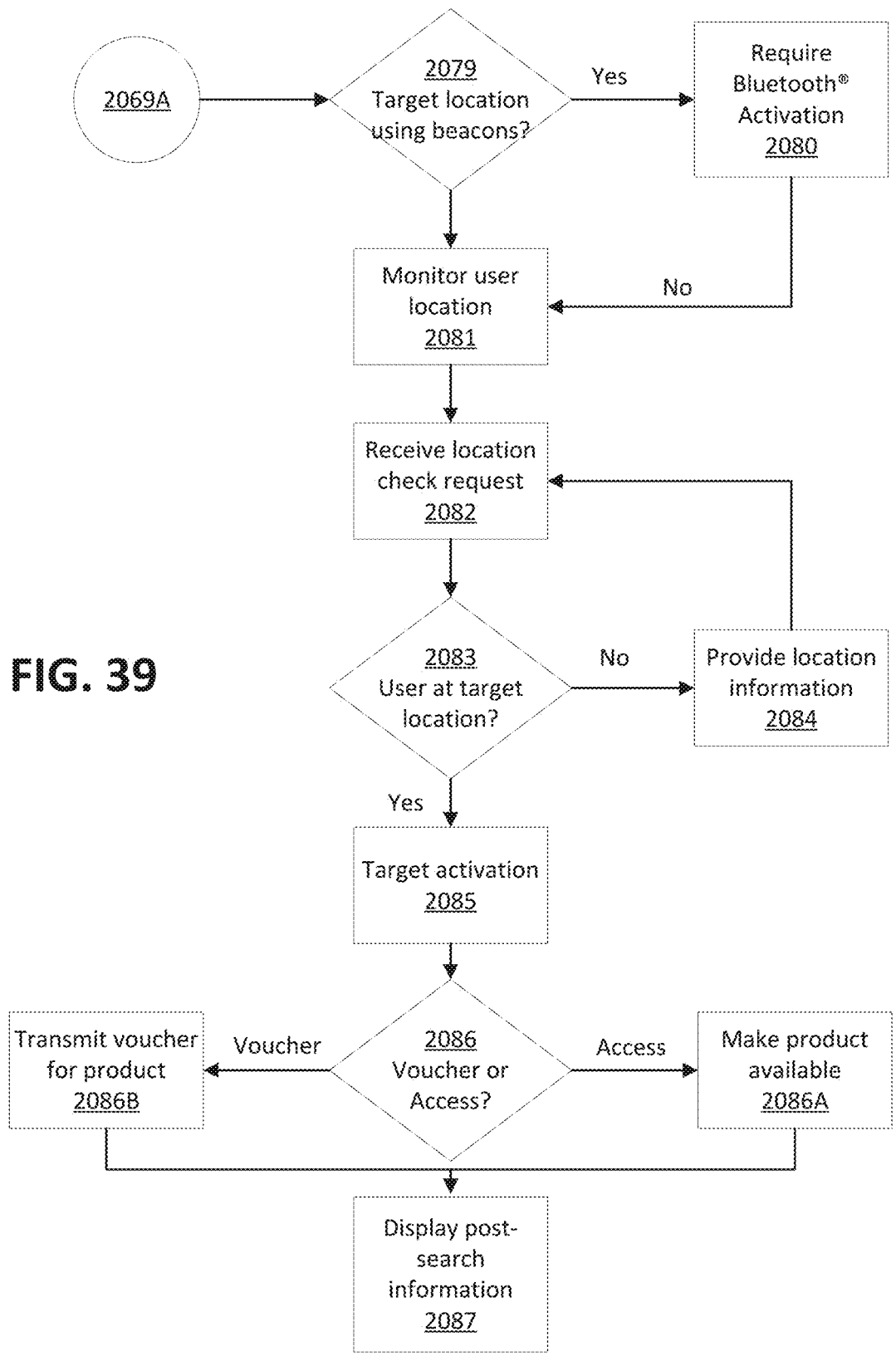

If the user is assigned to be a searcher and the method proceeds via the searcher path 2069, steps 2071-2078 in FIG. 38 are the same as steps 2013-2020 in FIG. 32 as described herein, and the same variations and alternate embodiments may be used. The reward offered for the searcher in the embodiment of FIGS. 37-40 may be in the form of exclusive access to the consumer product or as a voucher for the consumer product. In this embodiment, if the system determines at step 2077 that the user has already located or activated the target, the procedure depends on whether the reward was in the form of exclusive access (proceeding to 2086A) or a voucher (proceeding to 2086B). If the user has not previously located or activated the target, and inventory is determined to be available for the selected target at 2078, the method proceeds to FIG. 39 via 2069A. If the method proceeds via 2069A, steps 2079-2085 are the same as steps 2021-2024 and 2026-2028 in FIG. 33 as described herein. The system determines whether the reward is provided as exclusive access or as a voucher at 2086, and the appropriate reward is made available at 2086A for exclusive access or 2086B for a voucher. In either event, the system may compile and display post-search information at 2087 as discussed herein, which may not be done until the search is complete.

Figure 40:
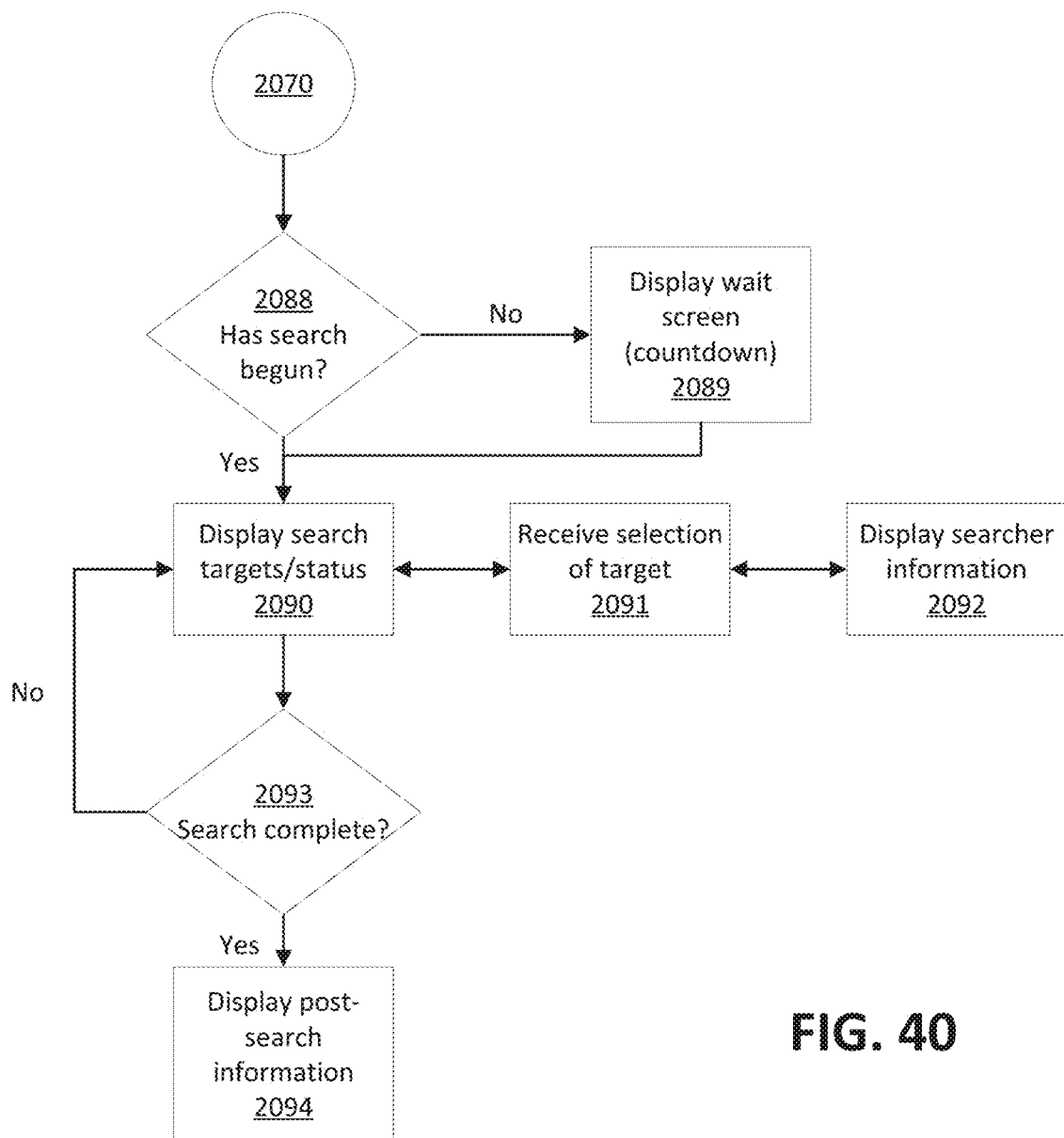
Figure 41:
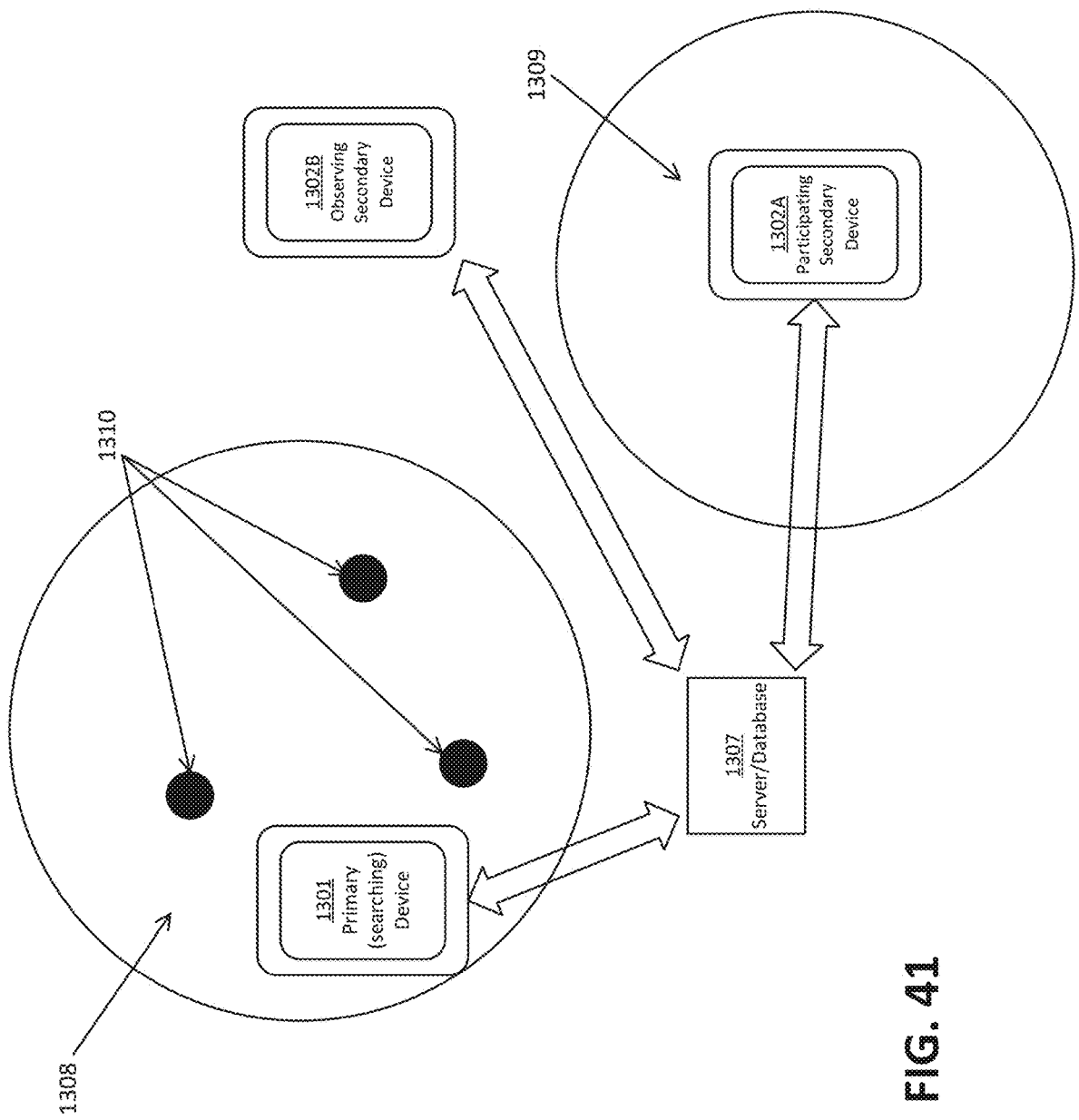
FIG. 41 illustrates an example of a system for virtual searching in accordance with example embodiments that may be used in connection with the method of FIGS. 31-36.

If the user is assigned to be an observing user and the method proceeds via the observation path 2070, the steps (2088-2094) of the observation path in FIG. 40 are the same as the steps (2054-2060) of the observation path of FIG. 36 described herein, and the same variations and alternate embodiments may be used.

It is understood that all methods described herein may be performed by a single device 200 or system that includes a combination of devices 200, including a mobile device 1301, 1302 (which may be a computer device 114 or a portable electronic device 112), a server 111, or other computing devices described herein. In one embodiment, a mobile device 1301, 1302 may communicate with a server 111 through a network, e.g., as the mobile device 112 and computer device 114 function in FIG. 1. In another embodiment, one device may communicate with a second device through one network, and the second device may communicate with the server 111 through a different network, e.g., such as the mobile device 112 communicating through the computer device 114 in FIG. 1. Any or all such devices may be provided with a computer program containing program code which, when executed by a computing device, causes the device to perform the method and/or to communicate with other devices in performing the method. The program may be stored in a (non-transitory) computer-readable recording medium (e.g., memory 212).

Aspects discussed in the present disclosure enhance and facilitate cooperation and social interaction between users with similar interests, including similar brand interest and loyalty. Aspects discussed in the present disclosure also provide the ability for remote users to virtually explore areas of a city or other area in which they do not live and encourage users to explore their own city as well. Aspects discussed in the present disclosure further enable users who cannot be physically present at new or limited product releases to still obtain the ability to purchase such products, through cooperation with other such users. Still further, aspects discussed in the present disclosure provide for release and sale of new consumer products, particularly high-demand products, in ways that are unique and engaging for the consumer. Additional benefits and advantages of aspects discussed herein are recognizable to those skilled in the art.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The term "plurality," as used herein, indicates any number greater than one, either disjunctively or conjunctively, as necessary, up to an infinite number. Accordingly, while the specific embodiments have been illustrated and described, numerous modifications come to mind without significantly departing from the spirit of the invention and the scope of protection is only limited by the scope of the accompanying claims.

What is claimed is:

1. A method comprising:
   determining using a location-determining device of a mobile device of a user, that a geographic position of the mobile device is not located within a search area and that the geographic position of the mobile device is located within a participation area, wherein the search area and the participation area are separate geographic areas;
   receiving, by the mobile device from a server through a network, information regarding a plurality of primary users located within the search area who are searching for a first target located at a first target location within the search area;
   receiving, by the mobile device, a user selection of a first primary user from the plurality of primary users;
   receiving, by the mobile device from the server, information about the first primary user;
   transmitting, by the mobile device through the network and to a secondary device of the first primary user, direction information to get the first primary user to the first target location;
   receiving, by the mobile device of the user and from the secondary device of the first primary user, data indicating that the first primary user has reached the first target location; and
   causing, by the mobile device, a reward to be provided to the user, in response to receiving the data indicating that the first primary user reached the first target location, wherein the reward comprises access to purchase a tangible consumer product or a voucher to purchase the tangible consumer product.

2. The method of claim 1, wherein the tangible consumer product is an article of apparel.

3. The method of claim 1, further comprising:
   receiving, by the mobile device, user input to provide assistance to the first primary user in searching for the first target.

4. The method of claim 1, further comprising:
   displaying, by the mobile device, images captured the secondary device of the first primary user during searching for the first target.

5. The method of claim 1, further comprising:
   providing, by the mobile device, information regarding a plurality of targets, including the first target, located at a plurality of different target locations within the search area;
   receiving, by the mobile device, a user selection of the first target from the plurality of targets;
   providing, by the mobile device, information regarding a plurality of primary users, including the first primary user, searching for the first target; and
   receiving, by the mobile device, a user selection of the first primary user from the plurality of primary users.

6. The method of claim 5, wherein a limited inventory of the tangible consumer product is associated with each of the plurality of targets, and wherein the information regarding the plurality of targets includes information indicating an amount of the limited inventory available for each of the plurality of targets.

7. The method of claim 6, wherein the information regarding the plurality of primary users includes information indicating a proximity of each of the primary users to the first target.

8. The method of claim 7, further comprising receiving, by the mobile device, an indication that the limited inventory for all of the plurality of targets has been exhausted, and the reward is provided to the user after all of the limited inventory for all of the plurality of targets has been exhausted.

9. An apparatus comprising:
   one or more processors;
   memory storing computer-readable instructions that, when executed by the one or more processors, cause the apparatus to perform:
      determining using a location-determining device of a mobile device of a user, that a geographic position of the user is not located within a search area and that the geographic position of the user is located within a participation area, wherein the search area and the participation area are separate geographic areas;
      receiving, from a server through a network, information regarding a plurality of primary users located within the search area who are searching for a first target located at a first target location within the search area;
      receiving a user selection of a first primary user from the plurality of primary users;
      receiving, from the server, information about the first primary user; and
      transmitting, by the mobile device through the network and to a secondary device of the first primary user, direction information to get the first primary user to the first target location;
      receiving, by the mobile device of the user and from the secondary device of the first primary user, data indicating that the first primary user has reached the first target location; and
      causing, a reward to be provided to the user in response to receiving the data indicating that the first primary user has reached the first target location, wherein the reward comprises access to purchase a tangible consumer product or a voucher to purchase the tangible consumer product.

10. The apparatus of claim 9, wherein the tangible consumer product is an article of apparel.

11. The apparatus of claim 9, wherein the instructions, when executed by the one or more processors, cause the apparatus to further perform:
   receiving user input to provide assistance to the first primary user in searching for the first target.

12. The apparatus of claim 9, wherein the instructions, when executed by the one or more processors, cause the apparatus to further perform:
   displaying images captured by the secondary device of the first primary user during searching for the first target.

13. The apparatus of claim 9, wherein the instructions, when executed by the one or more processors, cause the apparatus to further perform:
   providing information regarding a plurality of targets, including the first target, located at a plurality of different target locations within the search area;
   receiving a user selection of the first target from the plurality of targets;
   providing information regarding a plurality of primary users, including the first primary user, searching for the first target; and
   receiving a user selection of the first primary user from the plurality of primary users.

14. The apparatus of claim 13, wherein a limited inventory of the tangible consumer product is associated with each of the plurality of targets, and wherein the information regarding the plurality of targets includes information indicating an amount of the limited inventory available for each of the plurality of targets.

15. The apparatus of claim 14, wherein the information regarding the plurality of primary users includes information indicating a proximity of each of the primary users to the first target.

16. The apparatus of claim 14, wherein the instructions, when executed by the one or more processors, cause the apparatus to further perform receiving an indication that the limited inventory for all of the plurality of targets has been exhausted, and the reward is provided to the user after all of the limited inventory for all of the plurality of targets has been exhausted.

* * * * *